US012810874B2

(12) United States Patent
Disch et al.

(10) Patent No.: US 12,810,874 B2
(45) Date of Patent: Nov. 24, 2026

(54) AUDIO DECODER, AUDIO ENCODER, METHOD FOR DECODING, METHOD FOR ENCODING AND BITSTREAM, USING A PLURALITY OF PACKETS, THE PACKETS COMPRISING ONE OR MORE SCENE CONFIGURATION PACKETS DEFINING A TEMPORAL EVOLUTION OF A RENDERING SCENARIO AND COMPRISING A TIMESTAMP INFORMATION

(71) Applicant: Fraunhofer-Gesellschaft zur Förderung der angewandten Forschung e.V., Munich (DE)

(72) Inventors: Sascha Disch, Erlangen (DE); Simon Schwär, Erlangen (DE); Kahleel Porter Hassan, Erlangen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 252 days.

(21) Appl. No.: 18/659,966

(22) Filed: May 9, 2024

(65) Prior Publication Data

US 2024/0420706 A1 Dec. 19, 2024

Related U.S. Application Data

(63) Continuation of application No. PCT/EP2022/081372, filed on Nov. 9, 2022.

(30) Foreign Application Priority Data

Nov. 9, 2021 (EP) .................................... 21207342

(51) Int. Cl.
*G10L 19/008* (2013.01)
*G10L 19/005* (2013.01)

(52) U.S. Cl.
CPC .......... *G10L 19/008* (2013.01); *G10L 19/005* (2013.01)

(58) Field of Classification Search
CPC ... G10L 19/008; G10L 19/005; G10L 19/167; H04S 7/302; H04S 3/008
See application file for complete search history.

(56) References Cited

U.S. PATENT DOCUMENTS

| | | | |
|---|---|---|---|
| 7,020,119 | B2 | 3/2006 | Goodings et al. |
| 10,743,125 | B2 | 8/2020 | Crockett et al. |

(Continued)

FOREIGN PATENT DOCUMENTS

| | | | |
|---|---|---|---|
| CN | 102625106 | A | 8/2012 |
| CN | 106257958 | A | 12/2016 |

(Continued)

OTHER PUBLICATIONS

Office Action issued in Russian Application No. 2024115657, dated Sep. 16, 2024, 12 pages.

(Continued)

*Primary Examiner* — Daniel C Washburn
*Assistant Examiner* — Penny L Caudle
(74) *Attorney, Agent, or Firm* — ARENTFOX SCHIFF LLP

(57) ABSTRACT

Embodiments create an audio decoder which spatially renders one or more audio signals. The audio decoder receives a plurality of packets of different packet types, comprising one or more scene configuration packets providing a renderer configuration information defining a usage of scene objects and/or a usage of scene characteristics, and comprising one or more scene update packets defining a update of scene metadata for the rendering, and comprising one or more scene payload packets comprising definitions of one or more of the scene objects and/or definitions of one or more (Continued)

of the scene characteristics. The audio decoder selects definitions of one or more scene objects and/or definitions of one or more scene characteristics, which are in included in the scene payload packets, for the rendering in dependence on the renderer configuration information. The audio decoder updates one or more scene metadata in dependence on a content of the one or more scene update packets. Further embodiments are related to encoders, methods and bitstreams.

Further embodiments create decoders, encoders, methods and bitstreams with scene update packets with update conditions, with scene configuration packets providing a renderer configuration information defining a temporal evolution of a rendering scenario and with a timestamp information and/or with subscene cell information, wherein the cell information defines an association between the one or more cells and respective one or more data structures.

30 Claims, 17 Drawing Sheets

(56) References Cited

U.S. PATENT DOCUMENTS

| | | | |
|---|---|---|---|
| 2007/0005795 | A1 | 1/2007 | Gonzalez |
| 2008/0275711 | A1 | 11/2008 | Oh et al. |
| 2009/0003611 | A1 | 1/2009 | Oh et al. |
| 2009/0216541 | A1 | 8/2009 | Oh et al. |
| 2014/0086416 | A1 | 3/2014 | Sen |
| 2014/0226823 | A1 | 8/2014 | Sen et al. |
| 2015/0088530 | A1 | 3/2015 | Oh et al. |
| 2017/0034639 | A1 | 2/2017 | Chon |
| 2020/0105282 | A1 | 4/2020 | Kim et al. |
| 2021/0006922 | A1 | 1/2021 | Swaminathan et al. |

FOREIGN PATENT DOCUMENTS

| | | | |
|---|---|---|---|
| DE | 69907829 | T2 | 4/2004 |
| GB | 2589603 | A | 6/2021 |
| JP | 2001-189713 | A | 7/2001 |
| JP | 4099973 | B2 | 6/2008 |
| RU | 2439719 | C2 | 1/2012 |
| RU | 2602346 | C2 | 11/2016 |
| RU | 2646320 | C1 | 3/2018 |
| WO | 2008/084965 | A1 | 7/2008 |
| WO | 2009/051988 | A1 | 4/2009 |
| WO | 2021/067593 | A1 | 4/2021 |
| WO | 2021/144308 | A1 | 7/2021 |
| WO | 2021/186104 | A1 | 9/2021 |

OTHER PUBLICATIONS

International Search Report and Written Opinion issued in International Application No. PCT/EP2022/081372, mailed Mar. 20, 2023, 10 pages.

"IEEE Standard for Floating-Point Arithmetic", IEEE Computer Society, IEEE Std 754™—2019, 84 pages.

"ISO/IEC 14496-3: 2009(E) Information technology—Coding of audio-visual objects—Part 3: Audio", Fourth edition, Sep. 1, 2009, 18 pages.

"ISO/IEC 23003-3: 2020(E) Information technology—MPEG audio technologies—Part 3: Unified speech and audio coding", Second edition, Jun. 2020, 348 pages.

"ISO/IEC ISO/IEC 23008-3 Information technology—High efficiency coding and media delivery in heterogeneous environments—Part 3: 3D audio", (MPEG-H Part 3) Clause 5, 2015, 438 pages.

"MPEG-I Immersive Audio Encoder Input Format", International Organization for Standardization, 134 ISO/IEC JTC1/ SC29/ WVG6, N0054, No. n20446, Apr. 26, 2021-Apr. 30, 2021; Available online at: <https://dms.mpeg. expert/doc_end_user/documents/134_OnLine/wg11/MDS20446_WG06_N00054.zip, XP030294726, May 4, 2021, 35 pages.

"MPEG-I Immersive Audio Encoder Input Format", ISO/IEC JTC 1/SC 29/WG 6, N0029, No. n20144, (Jan. 19, 2021), 133. MPEG Meeting, Jan. 11, 2021-Jan. 15, 2021; Available online at: <https://dms.mpeg.expert/doc_end_user/documents/133_OnLine/wg11/MDS20144_WG06_N00029.zip>, XP030290174, Jan. 19, 2021, 17 pages.

"Draft of ISO/IEC 23008-3:201x 3D Audio, Second Edition", No. n16391, (Oct. 31, 2016), 116. MPEG Meeting, Oct. 14, 2016-Oct. 21, 2016; Chengdu; (Motion Picture Expert Group or ISO/IEC JTC1/SC29/WG11), XP030257847 [X], Available online at: <http://phenix.int-evry.fr/mpeg/doc_end_user/documents/116_Chengdu/wg11/w16391-v2-w16391.zip >, ISO_IEC_23008-3_201X(E)_(MPEG-H_3DA_2nd_ed)_draft.pdf, Oct. 31, 2016, 799 pages.

ATSC Organization, "A/342:2021-A/342:2021 Part 3, MPEG-H System", (Mar. 11, 2021), ATSC, Advanced Television Systems Committee, 1776 K Street N.W., Washington, D.C. 20006, USA, URL: https://www.atsc.org/wp-content/uploads/2021/03/A342-2021-Part-3-MPEG-H.pdf, (Mar. 22, 2021), XP017860383, 22 pages.

Bleidt et al., "Development of the MPEG-H TV Audio System for ATSC 3.0", IEEE Transactions on Broadcasting, US, XP055545453, vol. 63, No. 1, ISSN 0018-9316, Mar. 2017, pp. 202-236.

Wefers et al., "Scene Decomposition and Sound Transmission Concepts for MPEG-I 6DoF Audio", International Organisation for Standardisation ISO/IEC JTC1/SC29/WG11, No. m49091, (Jul. 3, 2019), 127. MPEG Meeting, Jul. 8, 2019-Jul. 12, 2019; Gothenburg, Available online at: <http://phenix.int-evry.fr/mpeg/doc_end_user/documents/127_Gothenburg/wg11/m49091-v1-m49091.zip>, XP030207270 [A], Jul. 3, 2019, 8 pages.

Office Action received for European Patent Application No. 22814086.9, mailed on Oct. 6, 2025, 6 pages.

Unknown, "ATSC Standard: A/342 Part 3, MPEG-H System", Advanced Television Systems Committee, A/342-3:2017, Mar. 3, 2017, 20 pages.

Office Action received for Korean Patent Application No. 10-2024-7018960, mailed on Apr. 17, 2025, 15 pages (7 pages of English Translation and 8 pages of Original Document).

Office Action received for Russian Patent Application No. 2024115658, mailed on Nov. 2, 2024, 12 pages (5 pages of English Translation and 7 pages of Original Document).

Office Action received for Indian Patent Application No. 202417036454, mailed on May 6, 2026, 8 pages.

Herre et al., "MPEG-H 3D Audio—The New Standard for Coding of Immersive Spatial Audio", IEEE Journal of Selected Topics in Signal Processing, vol. 9, No. 5, Aug. 2015, pp. 770-779.

International Search Report and Written Opinion received for PCT Patent Application No. PCT/EP2022/081340, mailed on Apr. 28, 2023, 24 pages.

International Search Report and Written Opinion received for PCT Patent Application No. PCT/EP2022/081370, mailed on Jan. 30, 2023, 14 pages.

International Search Report and Written Opinion received for PCT Patent Application No. PCT/EP2022/081373, mailed on Feb. 8, 2023, 9 pages.

Office Action received for Indian Patent Application No. 202417036361, mailed on Jun. 11, 2026, 9 pages.

AUDIO DECODER, AUDIO ENCODER, METHOD FOR DECODING, METHOD FOR ENCODING AND BITSTREAM, USING A PLURALITY OF PACKETS, THE PACKETS COMPRISING ONE OR MORE SCENE CONFIGURATION PACKETS DEFINING A TEMPORAL EVOLUTION OF A RENDERING SCENARIO AND COMPRISING A TIMESTAMP INFORMATION

CROSS-REFERENCE TO RELATED APPLICATIONS

This application is a continuation of copending International Application No. PCT/EP2022/081372, filed Nov. 9, 2022, which is incorporated herein by reference in its entirety, and additionally claims priority from European Application No. 21207342.3, filed Nov. 9, 2021, which is also incorporated herein by reference in its entirety.

Embodiments according to the invention are related to dynamic VR (virtual reality)/AR (augmented reality) bitstreams, for example using three packet types, using scene update packets with update condition, using a time stamp and/or using cell information.

BACKGROUND OF THE INVENTION

In order to provide an immersive experience for VR and/or AR applications it is not sufficient to provide a spatial viewing experience but also a spatial hearing experience. As an example, to fulfill such a need, six degrees of freedom (6DoF) audio techniques are developed. In this regard, it is challenging to develop bitstreams and corresponding encoders and decoders that enable a high definition, immersive hearing experience, whilst also being usable with feasible bandwidths.

Therefore, it is desired to get a concept which makes a better compromise between an achievable hearing impression of a rendered audio scene, an efficiency of a transmission of data used for the rendering of the audio scene and an efficiency of a decoding and/or rendering of the data.

SUMMARY

An embodiment may have an audio decoder, for providing a decoded audio representation on the basis of an encoded audio representation, wherein the audio decoder is configured to spatially render one or more audio signals; wherein the audio decoder is configured to receive a plurality of packets of different packet types, the packets including a plurality of scene configuration packets and a timestamp information, wherein the scene configuration packets provide a renderer configuration information, wherein the renderer configuration information defines a temporal evolution of a rendering scenario, and wherein the renderer configuration information provides all relevant information for a renderer to configure itself, wherein the audio decoder is configured to evaluate the timestamp information and to set a rendering configuration to a rendering scenario corresponding to the time stamp using the renderer configuration information.

Another embodiment may have an apparatus for providing an encoded audio representation, wherein the apparatus is configured to provide an information for a spatial rendering of one or more audio signals; wherein the apparatus is configured to provide a plurality of packets of different packet types, the packets including a plurality of scene configuration packets and a timestamp information, wherein the scene configuration packets provide a renderer configuration information, wherein the renderer configuration information defines a temporal evolution of a rendering scenario, and wherein the renderer configuration information provides all relevant information for a renderer to configure itself.

Another embodiment may have a method for providing a decoded audio representation on the basis of an encoded audio representation, wherein the method includes spatially rendering one or more audio signals; wherein the method includes receiving a plurality of packets of different packet types, the packets including a plurality of scene configuration packets and a timestamp information, wherein the scene configuration packets provide a renderer configuration information wherein the renderer configuration information defines a temporal evolution of a rendering scenario, and wherein the renderer configuration information provide all relevant information for a renderer to configure itself, wherein the method includes evaluating the timestamp information and setting a rendering configuration to a rendering scenario corresponding to the time stamp using the renderer configuration information.

Another embodiment may have a method for providing an encoded audio representation, wherein the method includes providing an information for a spatial rendering of one or more audio signals; wherein the method includes providing a plurality of packets of different packet types, the packets including a plurality of scene configuration packets and a timestamp information, wherein the scene configuration packets provide a renderer configuration information, wherein the renderer configuration information defines a temporal evolution of a rendering scenario, and wherein the renderer configuration information provides all relevant information for the renderer to configure itself for initialization.

Another embodiment may have a non-transitory digital storage medium having a computer program stored thereon to perform any of the inventive methods when said computer program is run by a computer.

Another embodiment may have a bitstream representing an audio content, the bitstream including a plurality of packets of different packet types, the packets including a plurality of scene configuration packets and a timestamp information, wherein the scene configuration packets provide a renderer configuration information, wherein the renderer configuration information defines a temporal evolution of a rendering scenario, and wherein the renderer configuration information provides all relevant information for a renderer to configure itself.

In the following embodiments according to a first aspect of the invention are discussed. Embodiments according to the first aspect of the invention may be based on using three packet types. Embodiments according to the first aspect of the invention may, for example, comprise Scene update Packets and/or Scene Payload Packets. Embodiments according to the first aspect of the invention may comprise MPEG-H compatible packets or may provide or comprise MPEG-H compatible decoders, encoders and/or bitstreams.

Embodiments according to the invention comprise an audio decoder, for providing a decoded, and optionally rendered, audio representation on the basis of an encoded audio representation. The audio decoder is configured to spatially render one or more audio signals and to receive a plurality of packets of different packet types, e.g. having packet types which are conformant to a MPEG-H MHAS packet definition, the packets comprising one or more scene configuration packets, e.g. Scene ConfigPacket, e.g.

mpegiSceneConfig[ ] (sometimes also designated as "mpeghiSceneConfig[ ]"), providing a renderer configuration information defining a usage of scene objects and/or a usage of scene characteristics, e.g. defining when or under which condition different scene objects and/or scene characteristics should be used in a rendering process, e.g. using a definition of cells. The concept of cells is, for example, especially important to practically implement subscene support. Subscenes are, for example, parts of a scene that are relevant at a certain point in scene time or in a certain vicinity/proximity to predefined scene locations. In cases, the term cell and subscene might be used synonymously.

Optionally, the scene configuration packet may, for example, define which scene payload packets are required at a given point in space and time. As another optional feature, the scene configuration packet may, for example, define where scene payload packets can be retrieved from.

Furthermore, the packets comprise one or more scene update packets, e.g. mpegiSceneUpdate[ ] (sometimes also designated as "mpeghiSceneUpdate[ ]"), defining an update, e.g. change, of scene metadata for the rendering, (e.g. a change of one or more metadata values; e.g. a change of a parameter of a scene object or a change of a scene characteristic; e.g. a change of scene metadata that occurs during playback). Optionally, the one or more scene update packets may, for example, define one or more conditions for a scene update.

Moreover, the packets comprise one or more scene payload packets (e.g. mpegiScenePayload, sometimes also designated as "mpeghiScenePayload") comprising definitions of one or more of the scene objects and/or definitions of one or more of the scene characteristics (e.g. bulk metadata; e.g. metadata that is required for the rendering of one or more audio scenes; e.g. geometry metadata describing an audio scene for the rendering, and/or parametric rendering instructions for the rendering, and/or audio element metadata describing one or more audio elements in the audio scene for the rendering; e.g. directives and/or geometries and/or audio effect metadata; e.g. reverberation metadata and/or early reflection metadata and/or diffraction metadata; e.g. mpegiScenePayload (sometimes also designated as "mpeghiScenePayload"), for example in the MHASPacketPayload( )).

In addition, the audio decoder is configured to select definitions of one or more scene objects and/or definitions of one or more scene characteristics, which are in included in the scene payload packets, for the rendering in dependence on the renderer configuration information, which may optionally be included in the scene configuration packets. As another optional feature, the cells may be used to select which scene objects and/or scene characteristics should be used—

Moreover, the audio decoder is configured to update one or more scene metadata (e.g. one or more rendering parameters designated by a "targetId", wherein new values of the one or more rendering parameters may be designated by an "attribute") in dependence on a content of the one or more scene update packets.

As an example, the audio decoder may additionally comprise a functionality of a renderer, or may comprise a renderer or a rendering unit. Hence, in the context of some embodiments the audio decoder may be synonymous to a renderer, e.g. a renderer with a decoding functionality.

The inventors recognized that using at least three distinct packet types, namely scene configuration packets, scene update packets and scene payload packets, may allow to efficiently provide, transmit, store and/or update metadata for complex and dynamic audio coding applications, for example for dynamic 6DoF audio scenes.

As an example, the scene configuration packets may comprise or provide relevant information for the decoder (or renderer) to configure itself. In particular, it may, for example, comprise instructions, which scene payload packets are required at any given point in space (e.g. a spatial position in the audio scene or rendering scenario) and/or time and optionally where they can be retrieved from, e.g. from a dedicated client-server back-channel.

The scene payload packets on the other hand may, for example, be a container for bulk metadata, which may be metadata that cannot directly be related to the timeline of an audio stream, but is required or useful for the rendering, for example, of complex and dynamic audio scenes, such as 6 DoF audio scenes. The payload packets may comprise, for example, geometry information of acoustically relevant objects present in the audio scene, parametric rendering instructions and/or further audio element metadata, e.g. reflection or diffraction properties. In other words, the payload packets can, for example, comprise directivities, geometries and special metadata for individual audio effects like reverberation, early reflections or diffraction.

Furthermore, the inventors recognized that it may be advantageous to define a third class of packets, namely scene update packets, in order to update the above explained scene metadata. It may, for example, allow to specify a condition at which the update is executed (e.g. time-based, and/or location-based and/or based on interactive triggers) and the change(s) made to the scene.

In simple words and as an example, embodiments according to the invention may be based on the idea to provide scene metadata for defining acoustically relevant elements and/or attributes of a scene in scene payload packets. In order to provide an information on how respective payload information is to be processed and/or when and/or where (e.g. in the audio scene or rendering scenario) respective payload information is to be used, scene configuration packets may be used to set a renderer or decoder in a corresponding configuration. To be able to update such metadata, scene update packets may be used, in order to provide an information about the update and optionally an update condition.

Hence, a "measured" (e.g. real) audio scene may be precisely reconstructed or a virtual audio scene may be rendered realistically using the payload information, wherein decoder or renderer configuration, as well as transmission, storing, distribution and updating of the information may be performed efficiently based on the above explained separation into the different packet types.

In other words, the usage of three different packet types, including scene configuration packets, scene payload packets and scene update packets, allows for a particularly efficient transmission and evaluation of scene information (e.g. scene object information and scene characteristics information) since the audio decoder can determine on the basis of the one or more scene configuration packets which scene payload packets or which information from the scene payload packets is required. Accordingly, the audio decoder may, for example, use the information of the scene configuration packets to decide which scene payload packets to store and/or to evaluate and the audio decoder may, for example, in some cases also use the scene configuration packets to determine which scene payload packets to request from a scene payload packet provider (e.g. from a server). In addition, the scene update packets may allow for an efficient signaling of changes of the scene information and thereby contribute to a high efficiency of the transmission and processing of scene information.

According to further embodiments of the invention, the audio decoder is configured to determine a rendering configuration on the basis of a scene configuration packet. Optionally, the scene configuration packet may, for example, make reference to a global payload packet using a global-PayloadId, and the scene configuration packet may, for example, make reference to individual payloads (or individual payload packets) using a cell concept which associates payloadIds with cells. Furthermore, the audio decoder is configured to determine an update of the rendering configuration on the basis of one or more scene update packets.

The cells may provide a spatial and/or temporal segmentation of the audio scene, wherein a current position of a listener for which the audio scene is rendered may trigger a requesting or using of respective payload packets, e.g. defining metadata about acoustically relevant objects in the scene, e.g. spatially located in an area associated with the cell, e.g. active at a current playout time.

According to further embodiments of the invention, the one or more scene update packets, e.g. mpegiSceneUpdate( ) (sometimes also designated as "mpeghiSceneUpdate( )"), comprise an enumeration of scene metadata items to be changed, e.g. an enumeration having a variable number of scene metadata items to be changed and a variable ordering of the scene metadata items to be changed. In addition, the enumeration comprises, for one or more metadata items to be changed, a metadata identifier, e.g. targetId, and a metadata update value, e.g. attribute. Optionally, the audio decoder may be configured to selectively update scene metadata included in the enumeration.

The inventors recognized that this may allow to efficiently indicate which metadata items are to be updated and to update the same.

According to further embodiments of the invention, the audio decoder is configured to obtain definitions of one or more of the scene objects and/or definitions of one or more of the scene characteristics from the one or more scene payload packets.

As explained before, the inventors recognized that scene payload packets may allow to efficiently define acoustically relevant scene objects and/or scene characteristics. Based on these elements and/or characteristics, a realistic sound environment rendering may be performed.

According to further embodiments of the invention, the one or more scene payload packets comprise an enumeration of payloads defining scene objects and/or scene characteristics, e.g. an enumeration having a variable number of payloads and a variable ordering of payloads. Furthermore, the audio decoder is configured to evaluate the enumeration of payloads defining scene objects and/or scene characteristics.

The enumeration of the payloads may allow a simple selection of which payload, e.g. payload element, to currently consider. Furthermore, an enumeration used by a scene update packet may correspond the enumeration of a scene payload packet, for a simple selection of which payload element to update.

According to further embodiments of the invention, a payload identifier, e.g. ID, is associated with the payloads within a scene payload packet and the audio decoder is configured to evaluate the payload identifier of a given payload in order to decide whether the given payload, e.g. a definition of certain given scene object and/or certain scene characteristics, should be used for the rendering, e.g. using the a renderer configuration information defining a usage of scene objects and/or a usage of scene characteristics.

The inventors recognized that using a payload identifier may allow to efficiently select which payloads to consider for a rendering.

According to further embodiments of the invention, one or more of the scene update packets define a condition for a scene update and the audio decoder is configured to evaluate whether the condition for the scene update defined in a scene update packet is fulfilled, to decide whether the scene update should be made.

Hence, efficient scene updates may be performed. Usage of conditional updates may allow to perform said updates quickly, after the condition is fulfilled, e.g. not requiring to first request a respective update information when the condition is met. Hence, such updates comprising an information about the update itself and a trigger condition may be transmitted to the decoder before they are required, such that the decoder may be able to simply "wait" until the criterion is met.

According to further embodiments of the invention, one or more of the scene update packets define an interactive trigger condition, e.g. a condition that a user takes a certain action which goes beyond a mere movement within a scene; e.g. a condition that a user gives a predetermined command or activates a predetermined button. Furthermore, the audio decoder is configured to evaluate whether the interactive trigger condition is fulfilled, to decide whether the scene update should be made.

Hence, a realistic audio environment rendering may be provided, wherein even real timer user interaction, for example with the environment (e.g. pressing a button, e.g. starting a virtually simulated machine which causes a change in the acoustic properties of the scene), may be taken into account.

According to further embodiments of the invention, the one or more scene configuration packets and the one or more scene update packets and the one or more scene payload packets are conformant to a MPEG-H MHAS packet definition. Optionally, the audio decoder may be configured identify the one or more scene configuration packets and the one or more scene update packets and the one or more scene payload packets within a stream of packets, e.g. using a bitstream parsing adapted to the MPEG-H MHAS packet definition.

This may allow a simple integration in existing coding frameworks.

According to further embodiments of the invention, the one or more scene configuration packets and the one or more scene update packets and the one or more scene payload packets each comprise a packet type identifier, e.g. MHAS-PacketType, a packet label, e.g. MHASPacketLabel, a packet length information, e.g. MHASPacketLength, and a packet payload, e.g. MHASPAcketPayload. Optionally, the audio decoder may be configured to evaluate the packet type identifier, in order to distinguish packets of different packet types.

As an example, the packet label may provide an indication of which packets belong together. For example, with using different labels, different MPEG-H 3D audio configuration structures may be assigned to particular sequences of MPEG-H 3D audio access units. The packet length information may indicate a length of the packet payload. The inventors recognized that usage of such a data structure may allow an efficient processing of the packets.

According to further embodiments of the invention, the audio decoder is configured to extract the one or more scene configuration packets, the one or more scene update packets and the one or more scene payload packets from a bitstream comprising a plurality of MPEG-H packets, including packets representing one or more audio channels to be rendered.

Optionally, the audio decoder may, for example, be configured to extract the one or more scene configuration packets, the one or more scene update packets and the one or more scene payload packets from an interleaved sequence of packets (e.g. from an interleaved sequence of MHAS packets) comprising packets of different types, e.g. making use of packet type identifiers and/or packet labels included within the packets.

Embodiments according to the invention may be used in the context of MPEG-H audio steams. Hence, embodiments according to the invention may be compatible with existing audio streaming frameworks. Furthermore, embodiments may, for example, support a plurality of different options to provide the packets (e.g. interleaved). As an example, a provision in an interleaved manner may allow to keep a size of respective packets low, which may be advantageous for some, e.g. broadcast, channels.

According to further embodiments of the invention, the audio decoder is configured to receive the one or more scene configurations packets via a broadcast stream, e.g. via a low bitrate broadcast stream. The inventors recognized that, for example, for applications with many users, scene configuration packets may be provided efficiently via a broadcast stream.

According to further embodiments of the invention, the audio decoder is configured to request the one or more scene payload packets from a packet provider, e.g. using a back-channel to a packet provider, e.g. in response to a determination, by the audio decoder, that one or more scene payload packets, or a content of one or more scene payload packets, is required for a rendering.

For example, based on scene configuration packets, the decoder may determine which payload packets are needed (e.g. by first determining a renderer configuration which may indicate which metadata elements are needed or which payloads are needed), and may hence request the same. This may, for example, allow to disburden a broadcast channel and reallocate individually relevant (e.g. for a specific decoder or listener for which a decoder is rendering an audio scene) information transmission to a unicast and/or multicast channel.

According to further embodiments of the invention, the audio decoder is configured to request the one or more scene payload packets from the packet provider using a payload ID, e.g. using an ID associated with a payload element. Alternatively, the audio decoder is configured to request the one or more scene payload packets from the packet provider using a packet ID, e.g. using an ID associated with a scene payload packet.

Hence, according to embodiments, scene payload packets may be identified using a payload ID, e.g. representing a payload of a respective payload packet, or using a packet ID. This may allow an efficient requesting of information.

According to further embodiments of the invention, the audio decoder is configured to anticipate, e.g. using a prediction, which one or more data structures, e.g. which one or more PayloadElements, will be required, or are expected to be required, e.g. using a prediction which cell will become active next, or has a defined likelihood to become active next, and to request the one or more data structures, or one or more scene payload packets comprising said one or more data structures, before the data structures are actually required.

The inventors recognized that such a prediction may, for example, be performed in order to enable a fluent or smooth audio scene reconstruction, for example to make sure no buffering times are needed. For example, unexpected bandwidth drops may be mitigated based on a timely anticipation of needed data structures and hence transmission thereof before they are required.

According to further embodiments of the invention, the audio decoder is configured to provide an information, e.g. a position information, or a playback time information, or a scene time, indicating, at least implicitly, which one or more scene payload packets are required, or will be required within a predetermined period of time to a packet provider, for example, to thereby allow the packet provider to selectively provide, e.g. using a point-to-point transmission, packets that are required by the audio decoder or that will be required by the audio decoder within the predetermined period of time, to the audio decoder.

Hence, an in the following provided bitstream may be optimized, in order to take the transmission of the requested scene payload packets into account. Furthermore, this way a scheduling may be determined that allows to robustly meet timing constraints, e.g. such that it is assured or at least very likely that information needed is present at the decoder when it is needed.

In general, it is to be noted that the packet provider may, for example, be an encoder according to any of the embodiments as disclosed herein.

According to further embodiments of the invention, the one or more scene update packets, e.g. mpegiSceneUpdate[ ] (sometimes also designated as "mpeghiSceneUpdate[ ]"), define an update of scene metadata for the rendering, e.g. a change of a parameter of a scene object or a change of a scene characteristic, and comprise a representation of one or more update conditions. Furthermore, the audio decoder is configured to evaluate whether the one or more update conditions are fulfilled and to selectively update one or more scene metadata in dependence on a content of the one or more scene update packets if the one or more update conditions are fulfilled, e.g. to thereby determine the rendering scenario corresponding to the time stamp.

Hence, the scene update packets may not only provide the update itself, but also a condition, when and/or where (e.g. spatially in an acoustic scene and/or which payloads respectively) to update. Therefore, the update information may be provided before the update is needed, hence allowing to prevent buffering times, and allow for a real time audio scene adaptation. As an example, a condition may be an opening of a door, such that when a user in a VR surrounding opens the door, the scene may be immediately updated with respect to the acoustically changed characteristics.

In the following embodiments related to an apparatus for providing an encoded audio representation, e.g. an encoder, are discussed. It is to be noted that such embodiments may be based on the same or similar or corresponding considerations as the above embodiments related to a decoder. Hence, the following embodiments may comprise same, similar or corresponding features, functionalities and details as the above disclosed embodiments, both individually and taken in combination.

Hence, further embodiments according to the invention comprise an apparatus, e.g. an audio encoder or an audio server, for providing an encoded audio representation, wherein the apparatus is configured to provide an information for a spatial rendering of one or more audio signals and wherein the apparatus is configured to provide a plurality of packets of different packet types, e.g. having packet types which are conformant to a MPEG-H MHAS packet definition.

Furthermore, the packets comprise one or more scene configuration packets, e.g. Scene ConfigPacket, e.g. mpegiSceneConfig[ ] (sometimes also designated as "mpeghiSceneConfig"), providing a renderer configuration information defining a usage of scene objects and/or a usage of scene characteristics, e.g. defining when or under which condition different scene objects and/or scene characteristics should be used in a rendering process, e.g. using a definition of cells.

Moreover, the packets comprise one or more scene update packets, e.g. mpegiSceneUpdate[ ] (sometimes also designated as "mpeghiSceneUpdate"), defining an update of scene metadata for the rendering, e.g. a change of one or more metadata values; e.g. a change of a parameter of a scene object or a change of a scene characteristic, e.g. a change of one or more metadata values.

In addition, the packets comprise one or more scene payload packets comprising definitions of one or more of the scene objects and/or definitions of one or more of the scene characteristics, e.g. bulk metadata; e.g. metadata that is required for the rendering of one or more audio scenes; e.g. geometry metadata describing an audio scene for the rendering, and/or parametric rendering instructions for the rendering, and/or audio element metadata describing one or more audio elements in the audio scene for the rendering.

According to further embodiments of the invention, the apparatus is configured to provide the renderer configuration information, which is included in the scene configuration packets, such that the renderer configuration information defines a selection of definitions of one or more scene objects and/or of definitions of one or more scene characteristics, which are in included in the scene payload packets, for the rendering.

Hence, the audio scene may be or rendered in an immersive manner and/or a high level of detail.

According to further embodiments of the invention, the apparatus is configured to provide the one or more scene update packets such that a content of the one or more scene update packets defines an update of one or more scene metadata.

According to further embodiments of the invention, the apparatus is configured to provide the scene configuration packet, such that the scene configuration packet determines a rendering configuration, and the apparatus is configured to provide the scene update packets, such that the scene update packets define an update of the rendering configuration.

According to further embodiments of the invention, the apparatus is configured to provide the one or more scene configuration packets and the one or more scene update packets and the one or more scene payload packets such that the one or more scene configuration packets and the one or more scene update packets and the one or more scene payload packets are conformant to a MPEG-H MHAS packet definition.

According to further embodiments of the invention, the apparatus is configured to provide the one or more scene configuration packets and the one or more scene update packets and the one or more scene payload packets, such that the one or more scene configuration packets and the one or more scene update packets and the one or more scene payload packets each comprise a packet type identifier, e.g. MHASPacketType, a packet label, e.g. MHASPacketLabel, a packet length information, e.g. MHASPacketLength, and a packet payload, e.g. MHASPAcketPayload.

According to further embodiments of the invention, the apparatus is configured to provide the one or more scene configuration packets and the one or more scene update packets and the one or more scene payload packets within a bitstream comprising a plurality of MPEG-H packets, e.g. in an interleaved manner, including packets representing one or more audio channels to be rendered.

Optionally, the audio decoder may, for example, be configured to extract the one or more scene configuration packets, the one or more scene update packets and the one or more scene payload packets from an interleaved sequence of packets (e.g. from an interleaved sequence of MHAS packets) comprising packets of different types, e.g. making use of packet type identifiers and/or packet labels included within the packets.

Hence, smaller data portions may, for example, be transmitted in the interleaved manner. For example, in a broadcast scenario, this may allow to keep the broadcast bitstream data rate low. In such a case, as an example, the payload packets may optionally be provided using a separate client-server channel.

According to further embodiments of the invention, the apparatus is configured to provide the scene configurations packets via a broadcast stream, e.g. via a low bitrate broadcast stream, and optionally to provide the scene payload packets dependent on a scene time and/or dependent on a user position.

According to further embodiments of the invention, the apparatus is configured to provide the one or more scene payload packets in response to a request from an audio decoder, e.g. in response to a determination, by the audio decoder, that one or more scene payload packets, or a content of one or more scene payload packets, is required for a rendering, e.g. "on demand". This may allow an efficient provision of the payload packets.

According to further embodiments of the invention, the apparatus is configured to provide the one or more scene payload packets in response to a request from an audio decoder comprising a payload ID, e.g. using an ID associated with a payload element. Alternatively, the apparatus is configured to provide the one or more scene payload packets in response to a request from an audio decoder comprising a packet ID, e.g. using an ID associated with a scene payload packet.

According to further embodiments of the invention, the apparatus is configured to provide the one or more scene payload packets in response to an information, e.g. a position information, or a playback time information, or a scene time, indicating, for example at least implicitly, which one or more scene payload packets are required, or will be required within a predetermined period of time, for example, such that the apparatus may selectively provide, e.g. using a point-to-point transmission, packets that are required by the audio decoder or that will be required by the audio decoder within the predetermined period of time, to the audio decoder.

According to further embodiments of the invention, the apparatus is configured to provide the one or more scene update packets such that the one or more scene update packets, e.g. mpegiSceneUpdate[ ] (sometimes also designated as "mpeghiSceneUpdate"), define an update of scene metadata for the rendering, e.g. a change of a parameter of a scene object or a change of a scene characteristic, and comprise a representation of one or more update conditions.

According to further embodiments of the invention, the apparatus is configured to repeat a provision of the scene configuration packet or even of a sequence of a scene configuration packet and one or more scene payload packets and optionally also one or more scene update packets) periodically. This may allow a simple tune in for a respective decoder or renderer.

According to further embodiments of the invention, the apparatus is configured to provide the scene configuration packet, such that the scene configuration packet defines which scene payload packets are required at a given point in space and time.

According to further embodiments of the invention, the apparatus is configured to provide the scene configuration packet, such that the scene configuration packet defines where scene payload packets can be retrieved from. Hence, respective decoders or renderers may individually request respective needed payload packets.

According to further embodiments of the invention, the apparatus is configured to provide the scene update packets, such that the scene update packets define a condition for a scene update.

According to further embodiments of the invention, the apparatus is configured to provide the scene update packets such that the scene update packets define an interactive trigger condition (e.g. a condition that a user takes a certain action which goes beyond a mere movement within a scene; e.g. a condition that a user gives a predetermined command or activates a predetermined button) for a scene update.

According to further embodiments of the invention, the apparatus is configured to adapt an ordering of definitions of one or more of the scene objects and/or of definitions of one or more of the scene characteristics in the scene payload packets in dependence on when and/or where the definitions of one or more of the scene objects and/or the definitions of one or more of the scene characteristics are needed by a renderer.

This may allow to schedule a transmission of payloads describing scene objects or characteristics efficiently. As an example, based on a scene time or play time, a relevance of acoustically relevant objects may be determined and hence an order of transmission may be set. As another example, based on a position of a listener in a virtual acoustic scene, acoustically relevant objects close to this position may be transmitted earlier, based on a reordering thereof, such that for example, in case a spatial trigger condition of the listener is fulfilled, the scene may be rendered in high detail without interruption (In simple words: In case a listener moves to another position nearby to their actual location, respective information for acoustic characteristics of the new position may, for example, be immediately available).

According to further embodiments of the invention, the apparatus is configured to adapt an ordering of definitions of one or more of the scene objects and/or of definitions of one or more of the scene characteristics in the scene payload packets in dependence on an importance of the definitions of one or more of the scene objects and/or of the definitions of one or more of the scene characteristics for a renderer.

Hence, the ordering may, for example, be chosen according to an acoustic impact of a respective object or characteristic. This may further allow to incorporate a level of detail concept according to embodiments.

According to further embodiments of the invention, the apparatus is configured to adapt an ordering of definitions of one or more of the scene objects and/or of definitions of one or more of the scene characteristics in the scene payload packets in dependence on a packet size limitation.

Hence, embodiments may allow to distribute definitions of scene objects and/or of scene characteristics in order to provide desired packet sizes for a transmission thereof, e.g. allowing to realize small packet sizes to efficiently provide the same in an interleaved manner with other packets.

According to further embodiments of the invention, the apparatus is configured to provide payload packets comprising a comparatively low level of detail first and to provide payload packets comprising a comparatively higher level of detail later on.

This may allow to first provide a minimal amount of information for a rendering of the scene that may be refined later, e.g. given a good enough communication channel. Therefore, the audio scene may be provided in a robust manner.

According to further embodiments of the invention, the apparatus is configured to separate definitions of one or more of the scene objects and/or definitions of one or more of the scene characteristics (e.g. bulk metadata; e.g. metadata that is required for the rendering of one or more audio scenes; e.g. geometry metadata describing an audio scene for the rendering, and/or parametric rendering instructions for the rendering, and/or audio element metadata describing one or more audio elements in the audio scene for the rendering) into a plurality of scene payload packets, e.g. into scene payload packets which are relevant at different points in time (e.g. at different playout times) and/or at different locations in space of the scene.

Furthermore, the apparatus is configured to provide the different scene payload packets at different times, e.g. at different times in accordance with a determination at which playout time and/or at which position within the scene the scene characteristics contained in the respective scene payload packets are required.

Accordingly, the inventors recognized that, in simple words, a spreading of smaller payload packets, may allow to provide an efficient bitstream.

According to further embodiments of the invention, the apparatus is configured to provide the scene configuration packets in order to decompose a scene into a plurality of spatial regions, e.g. areas or volumes; e.g. spatial regions comprising a shape which is defined by a geometry object, in which different rendering metadata is valid.

The inventors recognized that a scene decomposition in a plurality of spatial regions may allow to efficiently orchestrate or schedule or manipulate an activation of acoustically relevant elements, for example, represented in payloads, for example with regard to time and/or space, in order to provide a realistic acoustic scene. As an example, cells, e.g. as explained in the context of further embodiments may be used for such a scene decomposition, as well as for a level of detail concept, hence, as an example, separating the audio scene in space and/or time in different cells, which may, for example overlap, such that one cell may provide refining information for acoustic elements associated with another cell.

In the following embodiments related to methods for providing a decoded and encoded audio representation are discussed. It is to be noted that such embodiments may be based on the same or similar or corresponding considerations as the above embodiments related to apparatuses. Hence, the following embodiments may comprise same, similar or corresponding features, functionalities and details as the above disclosed embodiments, both individually and taken in combination.

Further embodiments according to the invention comprise a method for providing a decoded, and optionally rendered, audio representation on the basis of an encoded audio representation. The method comprises spatially rendering one or more audio signals and receiving a plurality of packets of different packet types, e.g. having packet types which are conformant to a MPEG-H MHAS packet definition.

Furthermore, the packets comprise one or more scene configuration packets, e.g. Scene ConfigPacket, e.g. mpegiSceneConfig[ ] (sometimes also designated as “mpeghiSceneConfig”), providing a renderer configuration information defining a usage of scene objects and/or a usage of scene characteristics, e.g. defining when or under which condition different scene objects and/or scene characteristics should be used in a rendering process, e.g. using a definition of cells.

Optionally, the scene configuration packet may, for example, define which scene payload packets are required at a given point in space and time, and the scene configuration packet may, for example, define where scene payload packets can be retrieved from.

In addition, the packets comprise one or more scene update packets, e.g. mpegiSceneUpdate[ ] (sometimes also designated as “mpeghiSceneUpdate”), defining an update, e.g. change, of scene metadata for the rendering, e.g. a change of one or more metadata values; e.g. a change of a parameter of a scene object or a change of a scene characteristic; e.g. a change of scene metadata that occurs during playback. Optionally, the one or more scene update packets may, for example, define one or more conditions for a scene update, Moreover, the packets comprise one or more scene payload packets comprising definitions of one or more of the scene objects and/or definitions of one or more of the scene characteristics, e.g. bulk metadata; e.g. metadata that is required for the rendering of one or more audio scenes; e.g. geometry metadata describing an audio scene for the rendering, and/or parametric rendering instructions for the rendering, and/or audio element metadata describing one or more audio elements in the audio scene for the rendering; e.g. directives and/or geometries and/or audio effect metadata; e.g. reverberation metadata and/or early reflection metadata and/or diffraction metadata.

Moreover, the method comprises selecting definitions of one or more scene objects and/or definitions of one or more scene characteristics, which are in included in the scene payload packets, for the rendering in dependence on the renderer configuration information, which may, for example, be included in the scene configuration packets, wherein, for example, the cells may be used to select which scene objects and/or scene characteristics should be used.

Furthermore, the method comprises updating one or more scene metadata, e.g. one or more rendering parameters designated by a “targetId”, wherein new values of the one or more rendering parameters are designated by an “attribute”, in dependence on a content of the one or more scene update packets.

Further embodiments according to the invention comprise a method for providing an encoded audio representation, wherein the method comprises providing an information for a spatial rendering of one or more audio signals and providing a plurality of packets of different packet types, e.g. having packet types which are conformant to a MPEG-H MHAS packet definition.

The packets comprise one or more scene configuration packets, e.g. Scene ConfigPacket, e.g. mpegiSceneConfig[ ] (sometimes also designated as “mpeghiSceneConfig”), providing a renderer configuration information defining a usage of scene objects and/or a usage of scene characteristics, e.g. defining when or under which condition different scene objects and/or scene characteristics should be used in a rendering process, e.g. using a definition of cells.

Furthermore, the packets comprise one or more scene update packets, e.g. mpegiSceneUpdate[ ] (sometimes also designated as “mpeghiSceneUpdate”), defining an update of scene metadata for the rendering, e.g. a change of one or more metadata values; e.g. a change of a parameter of a scene object or a change of a scene characteristic.

Moreover, the packets comprise one or more scene payload packets comprising definitions of one or more of the scene objects and/or definitions of one or more of the scene characteristics, e.g. bulk metadata; e.g. metadata that is required for the rendering of one or more audio scenes; e.g. geometry metadata describing an audio scene for the rendering, and/or parametric rendering instructions for the rendering, and/or audio element metadata describing one or more audio elements in the audio scene for the rendering.

Further embodiments according to the invention comprise a computer program for performing a method according to any of the embodiments as disclosed herein, when the computer program runs on a computer.

In the following, embodiments related to bitstreams are discussed. It is to be noted that such embodiments may be based on the same or similar or corresponding considerations as the above embodiments related to apparatuses and/or methods. Hence, the following embodiments may comprise same, similar or corresponding features, functionalities and details as the above disclosed embodiments, both individually and taken in combination.

Further embodiments according to the invention comprise a bitstream representing an audio content, the bitstream comprising a plurality of packets of different packet types, e.g. having packet types which are conformant to a MPEG-H MHAS packet definition.

The packets comprise one or more scene configuration packets, e.g. Scene ConfigPacket, e.g. mpegiSceneConfig[ ] (sometimes also designated as “mpeghiSceneConfig”), providing a renderer configuration information defining a usage of scene objects and/or a usage of scene characteristics, e.g. defining when or under which condition different scene objects and/or scene characteristics should be used in a rendering process, e.g. using a definition of cells.

Optionally, the scene configuration packet may, for example, define which scene payload packets are required at a given point in space and time and the scene configuration packet may, for example, define where scene payload packets can be retrieved from.

Furthermore, the packets comprise one or more scene update packets, e.g. mpegiSceneUpdate[ ] (sometimes also designated as “mpeghiSceneUpdate”), defining an update, e.g. change, of scene metadata for the rendering, e.g. a change of one or more metadata values; e.g. a change of a parameter of a scene object or a change of a scene characteristic; e.g. a change of scene metadata that occurs during playback. Optionally, the one or more scene update packets may, for example, define one or more conditions for a scene update.

Moreover, the packets comprise one or more scene payload packets comprising definitions of one or more of the scene objects and/or definitions of one or more of the scene characteristics, e.g. bulk metadata; e.g. metadata that is required for the rendering of one or more audio scenes; e.g. geometry metadata describing an audio scene for the rendering, and/or parametric rendering instructions for the rendering, and/or audio element metadata describing one or more audio elements in the audio scene for the rendering; e.g. directives and/or geometries and/or audio effect metadata; e.g. reverberation metadata and/or early reflection metadata and/or diffraction metadata.

In addition, the bitstream may optionally be supplemented by any bitstream elements disclosed herein, both individually and taken in combination.

Further embodiments comprise an audio decoder, for providing a decoded audio representation on the basis of an encoded audio representation, wherein the audio decoder is configured to spatially render one or more audio signals and to receive a plurality of packets of different packet types, the packets comprising one or more scene configuration packets providing a renderer configuration information defining scene objects and/or scene characteristics, the packets comprising one or more scene update packets defining a update of scene metadata for the rendering, the packets comprising one or more scene payload packets comprising definitions of one or more of the scene objects and/or definitions of one or more of the scene characteristics.

Furthermore, the audio decoder is configured to select definitions of one or more scene objects and/or definitions of one or more scene characteristics, which are in included in the scene payload packets, for the rendering and to update one or more scene metadata in dependence on a content of the one or more scene update packets.

It is to be noted that such an inventive decoder may comprise same, similar or corresponding features, functionalities and details as any of the above disclosed embodiments or as any of the other embodiments disclosed herein, both individually and taken in combination.

In the following embodiments according to a second aspect of the invention are discussed. Embodiments according to the second aspect of the invention may be based on using scene update packets with update condition and/or based on using scene update packets with update condition, and other features.

Embodiments according to the second aspect may comprise features functionalities and details of embodiments of the first aspect of the invention and vice versa, both individually or taken in combination.

Embodiments according to the invention comprise an audio decoder, for providing a decoded, and optionally rendered, audio representation on the basis of an encoded audio representation, wherein the audio decoder is configured to spatially render one or more audio signals. The audio decoder is configured to receive a plurality of packets of different packet types, e.g. having packet types which are conformant to a MPEG-H MHAS packet definition.

Furthermore, the packets comprise one or more scene configuration packets, e.g. Scene ConfigPacket, e.g. mpegiSceneConfig[ ] (sometimes also designated as "mpeghiSceneConfig"), providing a renderer configuration information, e.g. defining a usage of scene objects and/or a usage of scene characteristics, e.g. defining when or under which condition different scene objects and/or scene characteristics should be used in a rendering process.

Moreover, the packets comprise one or more scene update packets, e.g. mpegiSceneUpdate[ ] (sometimes also designated as "mpeghiSceneUpdate"), defining an update of scene metadata for the rendering, e.g. a change of a parameter of a scene object or a change of a scene characteristic, and comprising a representation of one or more update conditions.

In addition, the audio decoder is configured to evaluate whether the one or more update conditions, e.g. as defined in the scene update packets, are fulfilled and to selectively update one or more scene metadata in dependence on a content of the one or more scene update packets if the one or more update conditions are fulfilled.

The inventors recognized an audio scene may be updated efficiently using metadata updates in the form of scene update packets. The scene update packets therefore comprise representations of update conditions, such that the decoder can, for example, receive the scene update packet before the update itself has to be performed, therefore relaxing transmission timing constraints. The apparatus can then perform the update when the respective condition is fulfilled.

This may allow to consider predetermined, triggered acoustic influences in the audio scene efficiently. For example, in a VR surrounding, a user may open a door, hence changing the acoustic characteristics of the virtual room. Hence, the opening of the door may trigger the update. The information about the acoustic "mechanics" of the door-opening may hence be transmitted before the door is opened.

Therefore, a virtual acoustic scene may be provided with a high degree of realism and in real time, whilst simplifying a transmission of metadata update information.

Furthermore, it is to be highlighted that one advantage of this approach may, for example, be the aggregation of not only update information but also update trigger information in the form of update conditions in the scene update packets, allowing to provide a self-consistent and/or self-sufficient and/or self-reliant update information.

Moreover, the audio decoder may react to different events, defined by the update conditions, (e.g. to local events occurring at the side of the audio decoder, triggering an update) and is not bound to a predetermined temporal evolution of the scene. Thus, the usage of scene update packets brings along a particularly good hearing expression, while keeping a required bitrate reasonably small.

According to further embodiments of the invention, the audio decoder is configured to evaluate a temporal condition, e.g. a temporal trigger condition; e.g. defined by startTimestamp, which is included in a scene update packet, in order to decide whether one or more scene metadata should be updated in dependence on a content of the one or more scene update packets, e.g. in dependence on an enumeration of scene metadata items to be changed, e.g. referenced by "targetId", and corresponding new values, e.g. defined by "attribute".

The inventors recognized that an update trigger may, for example, not only provided by an event, but as well by a timing. Hence, again, a scene update packet may comprise an information on the update itself and a time, or timespan to determine a time, when to perform the update. Therefore, an acoustic change over time may, for example, be taken into account efficiently.

According to further embodiments of the invention, the temporal condition defines a start time instant, e.g. using a bitstream element startTimestamp. Alternatively, the temporal condition defines a time interval, e.g. using a start time and an end time.

Furthermore, the audio decoder is configured to effect an update of one or more scene metadata, e.g. in accordance with the definition included in a respective scene update packet, in response to a detection, e.g. immediately in response to the detection, or using a temporal delay defined within the respective scene update packet, that a current playout time, e.g. a scene time, has reached the start time instant or lies after the start time instant.

Alternatively, the audio decoder is configured to effect an update of one or more scene metadata, e.g. in accordance with the definition included in a respective scene update package, in response to a detection that a current playout time, e.g. the scene time, lies within the time interval.

Hence, depending on the specific implementation, a point in time when the update has to be performed, or a, in simple words, "timer" until the update has to be performed may, for example, be provided, allowing an efficient updating of metadata.

According to further embodiments of the invention, the audio decoder is configured to evaluate a spatial condition, e.g. a spatial trigger condition, which is included in a scene update packet, e.g. a spatial condition defined by a reference to a geometry definition; e.g. a spatial condition defined by geometryId, in order to decide whether one or more scene metadata should be updated in dependence on a content of the one or more scene update packets, e.g. in dependence on an enumeration of scene metadata items to be changed, e.g. referenced by "targetId", and corresponding new values, e.g. defined by "attribute".

Therefore, an update dependent on a spatial location in the acoustic scene may be indicated efficiently.

According to further embodiments of the invention, the spatial condition defines a geometry element, e.g. using a reference to a geometry definition, wherein said geometry definition may, for example, be included in a scene payload element.

Furthermore, the audio decoder is configured to effect an update of one or more scene metadata, e.g. in accordance with the definition included in a respective scene update packet, in response to a detection, e.g. immediately in response to the detection, or, for example, using a temporal delay defined within the respective scene update packet, that a current position has reached the geometry element (e.g. has reached a one-dimensional boundary defined by the geometry element, or has reached a two-dimensional boundary defined by the geometry object, or has reached a three-dimensional boundary defined by the geometry object), or in response to a detection, e.g. immediately in response to the detection, or, for example, using a temporal delay defined within the respective scene update packet, that a current position lies within the geometry element, e.g. within a two-dimensional geometry element or within a three-dimensional geometry element.

As an example, a user of a VR surrounding may move through a VR room which is separated in acoustic zones, for example, defined by geometry elements, such as boxes. When a user enters a new acoustic zone, that zone may be updated, in order to accurately describe corresponding acoustic properties, hence allowing an immersive user experience. This way, only, the currently relevant acoustic zone may have to be updated.

According to further embodiments of the invention, the audio decoder is configured to evaluate whether an interactive trigger condition, which may, for example, be defined in a scene update packet (e.g. a condition that a user takes a certain action which goes beyond a mere movement within a scene; e.g. a condition that a user gives a predetermined command or activates a predetermined button, e.g. defined by the flag "fireOn") is fulfilled, in order to decide whether one or more scene metadata should be updated, in dependence on a content of the one or more scene update packets.

As explained before, e.g. in the context of the first aspect of the invention, an acoustic scene may hence be updated efficiently.

According to further embodiments of the invention, the audio decoder is configured to evaluate a combination, e.g. an AND-combination, or another Boolean combination, of two or more update conditions, and the audio decoder is configured to selectively update one or more scene metadata in dependence on a content of the one or more scene update packets if a combined update condition is fulfilled, e.g. if the two or more update conditions are all fulfilled.

The inventors recognized that an evaluation of interlinked, or chained update conditions may allow an efficient update of an acoustic scene, e.g. audio scene, e.g. rendering scenario.

According to further embodiments of the invention, the audio decoder is configured to evaluate both a temporal update condition and a spatial update condition. Alternatively, the audio decoder is configured to evaluate both a temporal update condition and an interactive update condition.

Hence, update conditions may be indicated with a high flexibility, allowing to improve an efficiency and/or adaptivity of the update.

According to further embodiments of the invention, the audio decoder is configured to evaluate a delay information, e.g. delay, which is included in the scene update packet; and the audio decoder is configured to delay an update of one or more scene metadata in dependence on a content of the one or more scene update packets in accordance with the delay information in response to a detection that the one or more update conditions are fulfilled.

Some changes in an acoustic scene may be triggered by an event, followed by a delay, e.g. a time lag. Such a change may be incorporated in an acoustic scene update efficiently, based on the above explained approach.

According to further embodiments of the invention, the audio decoder is configured to evaluate a flag, e.g. hasTemporalCondition, within the scene update packet indicating whether a temporal update condition is defined in the scene update packet. Alternatively or in addition, the audio decoder is configured to evaluate a flag, e.g. hasSpatialCondition, within the scene update packet indicating whether a spatial update condition is defined in the scene update packet. Optionally, the audio decoder is configured to AND-combine conditions a presence of which is indicated by the respective flags.

Hence, the decoder may be provided with the information whether a temporal and/or spatial update condition is to be considered using flags and hence with low signaling effort.

According to further embodiments of the invention, the audio decoder is configured to evaluate a flag, for example has delay, e.g. a flag indicating "has delay", within the scene update packet indicating whether a delay information is defined in the scene update packet.

Therefore, an indication whether a delay is to be considered may be provided with low signaling effort.

According to further embodiments of the invention, the scene update packet comprises a representation (e.g. an enumeration, wherein a number of entries of the enumeration may, for example, be indicated by a bitstream parameter, e.g. by numOfModifications") of a plurality of modifications of one or more parameters of one or more scene objects and/or of one or more scene characteristics.

Optionally, the parameters or scene characteristics to be modified (or updated) are, for example, designated with "targetId", and respective new values of the parameters or scene characteristics are, for example, designated with "attribute".

In addition, the audio decoder is configured to apply the modifications in response to a detection that the one or more update conditions are fulfilled.

According to further embodiments of the invention, the scene update packet comprises a trajectory information, which may, for example, be associated with a parameter of a scene object to be changed, or, for example, with a scene characteristic to be changed, e.g. comprising is Trajectory, interpolationType, numPoints, time[n] and value[n]

In addition, the audio decoder is configured to update a respective scene metadata, to which the trajectory information is associated, using a parameter variation, e.g. a smooth interpolated parameter variation, following a trajectory, e.g. a temporal evolution, defined by the trajectory information, wherein the audio decoder may, for example, determine the trajectory on the basis of a plurality of support points.

Hence, even a complex update may, for example, be parameterized or represented with low effort using the trajectory, reducing a signaling effort. Therefore, optionally, based on support points, the trajectory and hence the metadata update may be interpolated.

According to further embodiments of the invention, the audio decoder is configured to evaluate an information (e.g. a flag isTrajectory; e.g. an information which is included in the scene update packet) indicating whether a trajectory based update of scene metadata is used, in order to activate or deactivate the trajectory based update of scene metadata.

According to further embodiments of the invention, the audio decoder is configured to evaluate an interpolation type information, which may, for example, indicate a linear interpolation, and/or a cubic interpolation, and/or a sample-and-hold behavior, included in the scene update packet, e.g. an interpolationType information, in order to determine a type of interpolation between two or more support points of the trajectory, wherein the support points may, for example, be defined by a time information (e.g. time[n]) associated with the respective supporting points and by a value information (e.g. value[n]) associated with the respective support points.

Hence, depending on the desired trajectory, a suitable interpolation type may be chosen. Furthermore, a good compromise between a computational complexity for the interpolation of the trajectory and an accuracy of the desired trajectory may be achieved based on the choice of the type of interpolation.

According to further embodiments of the invention, the audio decoder is configured to evaluate a supporting point information (e.g. a supporting point information comprising an information about a number of supporting points; e.g. a supporting point information comprising one or more values time[n] and value[n]) describing the trajectory, wherein the supporting point information may, for example, describe a plurality of supporting points for a temporal variation of the scene metadata, e.g. using pairs of supporting point time information and supporting point value information.

The inventors recognized that supporting points may allow to describe a trajectory and hence an update rule with low computational and/or transmission costs.

In the following embodiments related to an apparatus for providing an encoded audio representation, e.g. an encoder, are discussed. It is to be noted that such embodiments may be based on the same or similar or corresponding considerations as the above embodiments related to a decoder. Hence, the following embodiments may comprise same, similar or corresponding features, functionalities and details as the above disclosed embodiments, both individually and taken in combination.

Further embodiments according to the invention comprise an apparatus, e.g. an audio encoder or an audio server, for providing an encoded audio representation, wherein the apparatus is configured to provide an information for a spatial rendering of one or more audio signals and wherein the apparatus is configured to provide a plurality of packets of different packet types, e.g. having packet types which are conformant to a MPEG-H MHAS packet definition.

Furthermore, the packets comprise one or more scene configuration packets, e.g. Scene ConfigPacket, e.g. mpegiSceneConfig[ ] (sometimes also designated as "mpeghiSceneConfig"), providing a renderer configuration information, e.g. defining a usage of scene objects and/or a usage of scene characteristics, e.g. defining when or under which condition different scene objects and/or scene characteristics should be used in a rendering process.

In addition, the packets comprise one or more scene update packets, e.g. mpegiSceneUpdate[ ] (sometimes also designated as "mpeghiSceneUpdate"), defining an update of scene metadata for the rendering, e.g. a change of a parameter of a scene object or a change of a scene characteristic, and comprising a representation of one or more update conditions.

According to further embodiments of the invention, the apparatus is configured to provide a scene update packet such that the scene update packet comprises a representation of a temporal condition, e.g. a temporal trigger condition; e.g. defined by startTimestamp, for updating one or more scene metadata in dependence on a content of the scene update packet, e.g. in dependence on an enumeration of scene metadata items to be changed, e.g. referenced by "targetId", and corresponding new values, e.g. defined by "attribute".

According to further embodiments of the invention, the temporal condition defines a start time instant, e.g. using a bitstream element startTimestamp. Alternatively, the temporal condition defines a time interval, e.g. using a start time and an end time.

According to further embodiments of the invention, the apparatus is configured to provide a scene update packet, such that the scene update packet comprises a representation of a spatial condition, e.g. a spatial trigger condition, e.g. a spatial condition defined by a reference to a geometry definition; e.g. a spatial condition defined by geometryId, for updating one or more scene metadata in dependence on a content of the scene update packet, e.g. in dependence on an enumeration of scene metadata items to be changed, e.g. referenced by "targetId", and corresponding new values, e.g. defined by "attribute".

According to further embodiments of the invention, the spatial condition defines a geometry element, e.g. using a reference to a geometry definition, wherein said geometry definition may, for example, be included in a scene payload element.

According to further embodiments of the invention, the apparatus is configured to provide a scene update packet, such that the scene update packet comprises a representation of an interactive trigger condition, which may, for example, be defined in a scene update packet, (e.g. a condition that a user takes a certain action which goes beyond a mere movement within a scene; e.g. a condition that a user gives a predetermined command or activates a predetermined button, e.g. defined by the flag "fireOn") for updating one or more scene metadata in dependence on a content of the scene update packet, e.g. in dependence on an enumeration of scene metadata items to be changed, e.g. referenced by "targetId", and corresponding new values, e.g. defined by "attribute".

According to further embodiments of the invention, the apparatus is configured to provide a scene update packet, such that the scene update packet comprises a representation of a combination, e.g. an AND-combination, or another Boolean combination, of two or more update conditions.

According to further embodiments of the invention, the apparatus is configured to provide a scene update packet, such that the scene update packet comprises a delay information, e.g. delay, defining to delay an update of one or more scene metadata in dependence on a content of the one or more scene update packets in response to a detection that the one or more update conditions are fulfilled.

According to further embodiments of the invention, the apparatus is configured to provide a scene update packet, such that the scene update packet comprises a flag, e.g. hasTemporalCondition, indicating whether a temporal update condition is defined in the scene update packet. Alternatively, or in addition, the apparatus is configured to provide a scene update packet, such that the scene update packet comprises a representation of a flag, e.g. hasSpatial-Condition, indicating whether a spatial update condition is defined in the scene update packet.

According to further embodiments of the invention, the apparatus is configured to provide a scene update packet such that the scene update packet comprises a flag, e.g. has delay, e.g. a flag "has delay", indicating whether a delay information is defined in the scene update packet.

According to further embodiments of the invention, the apparatus is configured to provide a scene update packet, such that the scene update packet comprises a representation, e.g. an enumeration, wherein a number of entries of the enumeration may, for example, be indicated by a bitstream parameter, e.g. by numOfModifications", of a plurality of modifications of one or more parameters of one or more scene objects and/or of one or more scene characteristics.

According to further embodiments of the invention, the apparatus is configured to provide a scene update packet, such that the scene update packet comprises a trajectory information, which may, for example, be associated with a parameter of a scene object to be changed, or with a scene characteristic to be changed, e.g. comprising isTrajectory, interpolationType, numPoints, time[n] and value[n].

Furthermore, the trajectory information describes to update a respective scene metadata, to which the trajectory information is associated, using a parameter variation, e.g. a smooth interpolated parameter variation, following a trajectory, e.g. a temporal evolution, defined by the trajectory information, wherein the audio decoder may, for example, determine the trajectory on the basis of a plurality of support points.

According to further embodiments of the invention, the apparatus is configured to provide a scene update packet, such that the trajectory information comprises an information, e.g. a flag isTrajectory; e.g. an information which is included in the scene update packet, indicating whether a trajectory based update of scene metadata is used, in order to activate or deactivate the trajectory based update of scene metadata.

According to further embodiments of the invention, the apparatus is configured to provide a scene update packet, such that the trajectory information comprises an interpolation type information, which may, for example, indicate a linear interpolation, and/or a cubic interpolation, and/or a sample-and-hold behavior, included in the scene update packet, e.g. an interpolationType information, in order to determine a type of interpolation between two or more support points of the trajectory, wherein the support points may, for example, be defined by a time information (e.g. time[n]) associated with the respective supporting points and by a value information (e.g. value[n]) associated with the respective support points.

According to further embodiments of the invention, the apparatus is configured to provide a scene update packet, such that the trajectory information comprises a supporting point information, e.g. a supporting point information comprising an information about a number of supporting points; e.g. a supporting point information comprising one or more values time[n] and value[n], describing the trajectory, wherein the supporting point information may, for example, describe a plurality of supporting points for a temporal variation of the scene metadata, e.g. using pairs of supporting point time information and supporting point value information.

In the following, embodiments related to methods for providing a decoded and encoded audio representation are discussed. It is to be noted that such embodiments may be based on the same or similar or corresponding considerations as the above embodiments related to apparatuses. Hence, the following embodiments may comprise same, similar or corresponding features, functionalities and details as the above disclosed embodiments, both individually and taken in combination.

Further embodiments according to the invention comprise a method for providing a decoded, and optionally rendered, audio representation on the basis of an encoded audio representation, wherein the method comprises spatially rendering one or more audio signals and receiving a plurality of packets of different packet types, e.g. having packet types which are conformant to a MPEG-H MHAS packet definition.

Furthermore, the packets comprise one or more scene configuration packets, e.g. Scene ConfigPacket, e.g. mpegiSceneConfig[ ] (sometimes also designated as "mpeghiSceneConfig"), providing a renderer configuration information (e.g. defining a usage of scene objects and/or a usage of scene characteristics, e.g. defining when or under which condition different scene objects and/or scene characteristics should be used in a rendering process).

In addition, the packets comprise one or more scene update packets, e.g. mpegiSceneUpdate[ ] (sometimes also designated as "mpeghiSceneUpdate"), defining an update of scene metadata for the rendering, e.g. a change of a parameter of a scene object or a change of a scene characteristic, and comprising a representation of one or more update conditions;

Moreover, the method comprises evaluating whether the one or more update conditions, e.g. as defined in the scene update packets, are fulfilled and selectively updating one or more scene metadata in dependence on a content of the one or more scene update packets, if the one or more update conditions are fulfilled.

Further embodiments according to the invention comprise a method for providing an encoded audio representation, wherein the method comprises providing a plurality of packets of different packet types, e.g. having packet types which are conformant to a MPEG-H MHAS packet definition.

Furthermore, the packets comprise one or more scene configuration packets, e.g. Scene ConfigPacket, e.g. mpegiSceneConfig[ ] (sometimes also designated as "mpeghiSceneConfig"), providing a renderer configuration information (e.g. defining a usage of scene objects and/or a usage of scene characteristics, e.g. defining when or under which condition different scene objects and/or scene characteristics should be used in a rendering process.

In addition, the packets comprise one or more scene update packets, e.g. mpegiSceneUpdate[ ] (sometimes also designated as "mpeghiSceneUpdate"), defining an update of scene metadata for the rendering, e.g. a change of a parameter of a scene object or a change of a scene characteristic, and comprising a representation of one or more update conditions.

Further embodiments according to the invention comprise a computer program for performing a method according to any of the embodiments, when the computer program runs on a computer.

In the following, embodiments related to bitstreams are discussed. It is to be noted that such embodiments may be based on the same or similar or corresponding considerations as the above embodiments related to apparatuses and/or methods. Hence, the following embodiments may comprise same, similar or corresponding features, functionalities and details as the above disclosed embodiments, both individually and taken in combination.

Further embodiments according to the invention comprise a bitstream representing an audio content, wherein the bitstream comprises a plurality of packets of different packet types, e.g. having packet types which are conformant to a MPEG-H MHAS packet definition.

Furthermore, the packets comprise one or more scene configuration packets, e.g. Scene ConfigPacket, e.g. mpegiSceneConfig[ ] (sometimes also designated as "mpeghiSceneConfig"), providing a renderer configuration information (e.g. defining a usage of scene objects and/or a usage of scene characteristics, e.g. defining when or under which condition different scene objects and/or scene characteristics should be used in a rendering process).

In addition, the packets comprise one or more scene update packets, e.g. mpegiSceneUpdate[ ] (sometimes also designated as "mpeghiSceneConfigUpdate"), defining an update of scene metadata for the rendering, e.g. a change of a parameter of a scene object or a change of a scene characteristic, and comprising a representation of one or more update conditions.

As an example, the bitstream may optionally be supplemented by any bitstream elements disclosed herein, both individually and taken in combination.

In the following, embodiments according to a third aspect of the invention are discussed. Embodiments according to the third aspect of the invention may be based on using a time stamp, and/or based on an evaluation of time stamp information, and other features.

Embodiments according to the third aspect may comprise features functionalities and details of embodiments of the first and/or second aspect of the invention and respectively vice versa, both individually or taken in combination.

Embodiments according to the invention comprise an audio decoder, for providing a decoded, and optionally rendered, audio representation on the basis of an encoded audio representation. The audio decoder is configured to spatially render one or more audio signals and to receive a plurality of packets of different packet types, e.g. having packet types which are conformant to a MPEG-H MHAS packet definition, the packets comprising a plurality of scene configuration packets, e.g. Scene ConfigPacket, e.g. mpegiSceneConfig[ ] (sometimes also designated as "mpeghiSceneConfig"), providing a renderer configuration information defining a temporal evolution of a rendering scenario, e.g. defining a usage of scene objects and/or a usage of scene characteristics, e.g. defining when or under which condition different scene objects and/or scene characteristics should be used in a rendering process, and comprising a timestamp information.

Furthermore, the audio decoder is configured to evaluate the timestamp information and to set a rendering configuration to a rendering scenario corresponding to the time stamp using the renderer configuration information, e.g. when the audio decoder tunes into a stream.

The inventors recognized that an audio scene having a temporal evolution may be rendered efficiently by adjusting a renderer configuration of the respective decoder. Therefore, the decoder may, for example, be provided with a scene configuration packet which provides a renderer configuration information defining the temporal evolution of the rendering scenario, e.g. audio scene.

Hence, an information may be provided to the decoder that defines when to use a respective renderer configuration, e.g. provided in the scene configuration packet, in order to render the audio scene or rendering scenario well.

Therefore, the scene configuration packets comprise a timestamp information. Consequently, upon an evaluation of the timestamp information, the decoder or renderer may, for example, be able to set the rendering configuration, so that is suitable for a rendering of the rendering scenario at a certain point in time, e.g. as defined by the timestamp information. For example, if a playout time matches or surpasses the time defined by the timestamp information, the renderer configuration may, for example, be activated.

The renderer configuration may, for example, define which acoustically relevant objects or scene characteristics are to be considered for an accurate rendering of the audio scene.

Therefore, for example based on a reference point in time and a time difference information extracted from the timestamp information, or optionally directly, the point in time at which a respective renderer configuration provided by the scene configuration packets is to be used, may, for example, be determined. Accordingly, the time stamp may, for example, be any entity of information suitable for defining a point in time at which a respective renderer configuration is to be used.

This may allow to efficiently incorporate changes in an acoustic scene that are triggered by a point in time or by an elapsed time.

Furthermore, it is to be highlighted that one advantage of this approach may, for example, be the aggregation of not only configuration information (e.g. how to set the renderer configuration) but also trigger information in the form of the temporal information about the adaptation (e.g. when to set the renderer configuration). This may allow to provide a self-consistent and/or self-sufficient and/or self-reliant update information.

In addition, it is to be noted that the scene configuration packet may optionally comprise an information about which payload packets (e.g. mpegiScenePayload (sometimes also designated as "mpeghiScenePayload")), as explained before, may be required at a given point in time and/or space. Hence, the information about the temporal evolution of the rendering scenario may optionally as well be used in order to adapt metadata, e.g. of acoustically relevant objects and/or scene characteristics, e.g. as defined in payload packets, based on a timing information.

Thus the timestamp information ensures that the rendering configuration is properly set and fits (or is in alignment with) the actual playout time.

As an example, the rendering configuration may comprise, e.g. amongst other information, for example user input information and/or preceding input information and/or preceding packet information, an information or setting based on the renderer configuration information.

According to further embodiments of the invention, the audio decoder is configured to evaluate the timestamp information when the audio decoder has missed one or more preceding scene configuration packets of a stream, or when the audio decoder tunes in into a stream.

In addition, the audio decoder is configured to set a playout time, or optionally a scene time, in dependence on the timestamp information included in the scene configuration packet.

Hence, the decoder may, for example, efficiently determine and hence set, the current playout time, e.g. the time (e.g. relative time or absolute time) for which an associated audio information is to be displayed, e.g. after a disturbance, or when newly joining a stream or when joining a stream anew.

According to further embodiments of the invention, the audio decoder is configured to execute, or, optionally, equivalently, retrace, or reconstruct, a temporal development of a rendering scene up to a playout time, or for example scene time, defined by the timestamp information, when the audio decoder has missed one or more preceding scene configuration packets of a stream, or when the audio decoder tunes in into a stream.

Hence, as an example, the decoder or renderer may catch up a course of updates, e.g. metadata updates, based on the scene configuration packets, e.g. taking into consideration the timestamp information.

According to further embodiments of the invention, the audio decoder is configured to obtain a time scale information which is included in a packet, e.g. in a Scene Config Packet; e.g. in a mpegiSceneConfig( ) packet (sometimes also designated as "mpeghiSceneConfig").

Furthermore, the audio decoder is configured to evaluate the time stamp information using the time scale information, wherein the audio decoder may, for example, be configured to evaluate the time stamp information in a time scale defined by the time scale information; wherein, for example, the time scale information configures an interpretation of the time stamp information, and optionally also an interpretation of other time information, in relation to a clock source of the audio decoder or of the renderer. Hence, a time information or timing information may be provided and determined efficiently.

According to further embodiments of the invention, the audio decoder is configured to determine, in dependence on the timestamp information, which scene objects should be used for the rendering. Therefore, a temporally dependent scene changes that can be modeled by objects can be represented efficiently.

According to further embodiments of the invention, the audio decoder is configured to evaluate a scene configuration packet, which defines an evolution of a rendering scene starting from a point of time which lies before a time defined by the timestamp information.

In addition, the audio decoder is configured to derive a scene configuration associated with a point in time defined by the timestamp information on the basis of the information in the scene configuration packet.

Hence, an evolution of the audio scene update, before a time of the timestamp information, may, for example, be considered by the audio decoder to determine the scene configuration that is present at the time of the timestamp. Consequently, a tune-in of the audio decoder in an audio stream is possible without having a self-consistent scene configuration information associated with the time of the timestamp information. This may reduce the bitrate while providing a good hearing experience.

According to further embodiments of the invention, the audio decoder is configured to derive the scene configuration associated with a point in time defined by the timestamp information using one or more scene update packets, and, for example, also using information in the scene configuration packet.

Hence, embodiments provide a good flexibility with regard to renderer configuration information providing packets.

According to further embodiments of the invention, the scene configuration packets, and optionally the one or more scene update packets and the one or more scene payload packets, are conformant to a MPEG-H MHAS packet definition.

Hence, embodiments according to the invention may be used with, or in accord with, existing audio coding frameworks or standards.

According to further embodiments of the invention, the scene configuration packets, and optionally the one or more scene update packets and the one or more scene payload packets, each comprise a packet type identifier, e.g. MHASPacketType, a packet label, e.g. MHASPacketLabel, a packet length information, e.g. MHASPacketLength, and a packet payload, e.g. MHASPAcketPayload.

As an example, the packet label may provide an indication of which packets belong together. For example, with using different labels, different MPEG-H 3D audio configuration structures may be assigned to particular sequences of MPEG-H 3D audio access units. The packet length information may indicate a length of the packet payload. The inventors recognized that usage of such a data structure may allow an efficient processing of the packets.

According to further embodiments of the invention, the audio decoder is configured to extract the one or more scene configuration packets, and optionally the one or more scene update packets and the one or more scene payload packets, from a bitstream comprising a plurality of MPEG-H packets, including packets representing one or more audio channels to be rendered.

Optionally, the audio decoder may, for example, be configured to extract the one or more scene configuration packets, the one or more scene update packets and the one or more scene payload packets from an interleaved sequence of packets (e.g. from an interleaved sequence of MHAS packets) comprising packets of different types, e.g. making use of packet type identifiers and/or packet labels included within the packets.

Hence, smaller data portions may, for example, be transmitted in the interleaved manner. For example, in a broadcast scenario, this may allow to keep the broadcast bitstream data rate low.

According to further embodiments of the invention, the audio decoder is configured to receive the one or more scene configurations packets via a broadcast stream, e.g. via a low bitrate broadcast stream.

This may, for example, allow a distribution of renderer configuration information to a plurality of decoders or renderers with limited use of transmission resources.

According to further embodiments of the invention, the audio decoder is configured to tune into the broadcast stream and to determine a playout time on the basis of the timestamp of a first scene configuration packet identified by the audio decoder after the tune-in.

The inventors recognized that by enabling a determination of the timestamp based on a first scene configuration packet identified by the audio decoder after the tune-in, the audio decoder may quickly set the correct current playout time in order to correctly render an audio information.

In the following, embodiments related to an apparatus for providing an encoded audio representation, e.g. an encoder, are discussed. It is to be noted that such embodiments may be based on the same or similar or corresponding considerations as the above embodiments related to a decoder. Hence, the following embodiments may comprise same, similar or corresponding features, functionalities and details as the above disclosed embodiments, both individually and taken in combination.

Further embodiments according to the invention comprise an apparatus, e.g. an audio encoder or an audio server, for providing an encoded audio representation, wherein the apparatus is configured to provide an information for a spatial rendering of one or more audio signals.

Furthermore, the apparatus is configured to provide a plurality of packets of different packet types, e.g. having packet types which are conformant to a MPEG-H MHAS packet definition, the packets comprising a plurality of scene configuration packets, e.g. Scene ConfigPacket, e.g. mpegiSceneConfig[ ] (sometimes also designated as "mpeghiSceneConfig"), providing a renderer configuration information defining a temporal evolution of a rendering scenario, e.g. defining a usage of scene objects and/or a usage of scene characteristics, e.g. defining when or under which condition different scene objects and/or scene characteristics should be used in a rendering process, and comprising a timestamp information.

According to further embodiments of the invention, the apparatus is configured to provide, in one of the packets, e.g. in a scene configuration packet, a time scale information, wherein the time stamp information is provided in a representation related to the time scale information.

According to further embodiments of the invention, the apparatus is configured to provide the scene configuration packets, and optionally the one or more scene update packets and the one or more scene payload packets, such that the scene configuration packets, and optionally the one or more scene update packets and the one or more scene payload packets, are conformant to a MPEG-H MHAS packet definition.

According to further embodiments of the invention, the apparatus is configured to provide the scene configuration packets, and optionally the one or more scene update packets and the one or more scene payload packets, such that the scene configuration packets, and optionally the one or more scene update packets and the one or more scene payload packets, each comprise a packet type identifier, e.g. MHASPacketType, a packet label, e.g. MHASPacketLabel, a packet length information, e.g. MHASPacketLength, and a packet payload, e.g. MHASPAcketPayload.

According to further embodiments of the invention, the apparatus is configured to provide a bitstream comprising a plurality of MPEG-H packets, also, as an example, designated as MHAS or MHAS stream, including packets representing one or more audio channels to be rendered and the one or more scene configuration packets, and optionally the one or more scene update packets and the one or more scene payload packets.

According to further embodiments of the invention, the apparatus is configured to provide a bitstream comprising a plurality of MPEG-H packets, also, as an example, designated as MHAS or MHAS stream, including packets representing one or more audio channels to be rendered and the one or more scene configuration packets, and optionally the one or more scene update packets and the one or more scene payload packets, in an interleaved manner.

According to further embodiments of the invention, the apparatus is configured to periodically repeat the scene configuration packet, e.g. with a change only of the time stamp, e.g. to periodically repeat the scene configuration packet, with one or more scene payload packets (e.g. payload 1, payload 2) and one or more packets representing one or more audio channels to be rendered (e.g. MPEGH3DAFRAME) (and optionally also one or more scene update packets) in between two subsequent scene configuration packets, e.g. to periodically repeat the scene configuration packet, with one or packets representing one or more audio channels to be rendered (e.g. MPEGH3DAFRAME) (and optionally also one or more scene update packets) in between two subsequent scene configuration packets, wherein the apparatus provides.

This may allow an efficient tune-in procedure for decoders or renderers joining a stream.

According to further embodiments of the invention, the apparatus is configured to periodically repeat, e.g. in a broadcast bitstream, the scene configuration packet, optionally with a change only of the time stamp, with one or more scene payload packets, e.g. payload 1, payload 2, and one or more packets representing one or more audio channels to be rendered, e.g. MPEGH3DAFRAME, and optionally also one or more scene update packets, in between two subsequent scene configuration packets.

According to further embodiments of the invention, the apparatus is configured to periodically repeat, e.g. in a broadcast bitstream, the scene configuration packet, optionally with a change or update only of the time stamp, with one or more packets representing one or more audio channels to be rendered, e.g. MPEGH3DAFRAME, and optionally also one or more scene update packets, in between two subsequent scene configuration packets.

Furthermore, the apparatus is configured to provide or to request one or more scene payload packets at request, e.g. at the request of an audio decoder or renderer.

Optionally, the apparatus may be configured to periodically repeat the scene configuration packet, with one or more packets representing one or more audio channels to be rendered (e.g. MPEGH3DAFRAME) (and optionally also one or more scene update packets) in between two subsequent scene configuration packets, wherein, for example, the apparatus provides the scene payload packets only at request.

Hence, the scene configuration packets may, for example, be small packets, and a respective decoder or renderer may determine, for example, based on said scene configuration packets which payload packets are needed an may request them via a back-channel, for example, from the above explained apparatus, which may be configured to provide the same. Therefore, a broadcast bitstream data rate may be kept low.

According to further embodiments of the invention, the apparatus is configured to provide, e.g. periodically, a plurality of otherwise identical scene configuration packets differing, e.g. only, in the timestamp information.

Hence, for example, only timestamp information may be updated. Therefore, an adaptation effort may be kept low, whilst also providing an information about the current playout time.

According to further embodiments of the invention, the apparatus is configured to adapt the timestamp information to a playout time, e.g. a scene time.

According to further embodiments of the invention, the apparatus is configured to adapt the timestamp information to a playout time, e.g. an independent playout time, e.g. an intended playout time, e.g. an independent playout time; e.g. a scene time, of rendering scene information included in packets which are provided by the apparatus in a temporal environment of a respective scene configuration packet in which the respective timestamp information is included.

In the following, embodiments related to methods for providing a decoded and encoded audio representation are discussed. It is to be noted that such embodiments may be based on the same or similar or corresponding considerations as the above embodiments related to apparatuses. Hence, the following embodiments may comprise same, similar or corresponding features, functionalities and details as the above disclosed embodiments, both individually and taken in combination.

Further embodiments according to the invention comprise a method for providing a decoded, and optionally rendered, audio representation on the basis of an encoded audio representation, wherein the method comprises spatially rendering one or more audio signals and receiving a plurality of packets of different packet types, e.g. having packet types which are conformant to a MPEG-H MHAS packet definition, with the packets comprising a plurality of scene configuration packets, e.g. Scene ConfigPacket, e.g. mpegiSceneConfig[ ] (sometimes also designated as "mpeghiSceneConfig"), providing a renderer configuration information defining a temporal evolution of a rendering scenario, e.g. defining a usage of scene objects and/or a usage of scene characteristics, e.g. defining when or under which process, and comprising a timestamp information.

Furthermore, the method comprises evaluating the timestamp information and setting a rendering configuration to a rendering scenario corresponding to the time stamp using the renderer configuration information, e.g. when the audio decoder tunes into a stream.

Further embodiments according to the invention comprise a method for providing an encoded audio representation, wherein the method comprises providing an information for a spatial rendering of one or more audio signals and providing a plurality of packets of different packet types, e.g. having packet types which are conformant to a MPEG-H MHAS packet definition, the packets comprising a plurality of scene configuration packets, e.g. Scene ConfigPacket, e.g. mpegiSceneConfig[ ] (sometimes also designated as "mpeghiSceneConfig"), providing a renderer configuration information defining a temporal evolution of a rendering scenario, e.g. defining a usage of scene objects and/or a usage of scene characteristics, e.g. defining when or under which condition different scene objects and/or scene characteristics should be used in a rendering process, and comprising a timestamp information.

Further embodiments according to the invention comprise a computer program for performing a method according to any of the embodiments, when the computer program runs on a computer.

In the following, embodiments related to bitstreams are discussed. It is to be noted that such embodiments may be based on the same or similar or corresponding considerations as the above embodiments related to apparatuses and/or methods. Hence, the following embodiments may comprise same, similar or corresponding features, functionalities and details as the above disclosed embodiments, both individually and taken in combination.

Further embodiments according to the invention comprise bitstream representing an audio content, the bitstream comprising a plurality of packets of different packet types, e.g. having packet types which are conformant to a MPEG-H MHAS packet definition, the packets comprising a plurality of scene configuration packets, e.g. Scene ConfigPacket, e.g. mpegiSceneConfig[ ] (sometimes also designated as "mpeghiSceneConfig"), providing a renderer configuration information defining a temporal evolution of a rendering scenario, e.g. defining a usage of scene objects and/or a usage of scene characteristics, e.g. defining when or under which condition different scene objects and/or scene characteristics should be used in a rendering process, and comprising a timestamp information.

As an example, the bitstream may optionally be supplemented by any bitstream elements disclosed herein, both individually and taken in combination.

Further embodiments of the invention comprise an audio decoder, for providing a decoded audio representation on the basis of an encoded audio representation, wherein the audio decoder is configured to spatially render one or more audio signals and to receive a plurality of packets of different packet types, the packets comprising a plurality of scene configuration packets providing a renderer configuration information.

Furthermore, the audio decoder is configured to evaluate a timestamp information and to set a rendering configuration to a rendering scenario corresponding to the time stamp.

It is to be noted that such an inventive decoder may comprise same, similar or corresponding features, functionalities and details as any of the above disclosed embodiments or as any of the other embodiments disclosed herein, both individually and taken in combination.

In the following embodiments according to a fourth aspect of the invention are discussed. Embodiments according to the fourth aspect of the invention may be based on using cell information.

Embodiments according to the fourth aspect may comprise features functionalities and details of embodiments of the first, second and/or third aspect of the invention and vice versa, both individually or taken in combination.

Embodiments according to the invention comprise an audio decoder, for providing a decoded, and optionally rendered, audio representation on the basis of an encoded audio representation, wherein the audio decoder is configured to spatially render one or more audio signals, which may, for example, be encoded within the encoded audio representation.

Furthermore, the audio decoder is configured to receive a scene configuration packet, e.g. a scene configuration packet which is conformant to a MPEG-H MHAS packet definition, e.g. Scene ConfigPacket, e.g. mpegiSceneConfig[ ] (sometimes also designated as "mpeghiSceneConfig"), providing a renderer configuration information, e.g. defining a usage of scene objects and/or a usage of scene characteristics, e.g. defining when or under which condition different scene objects and/or scene characteristics should be used in a rendering process.

In addition, the scene configuration packet comprises a cell information (e.g. an information numCells indicating a number of cells and, for each cell, a definition of one or more cell conditions (e.g. a start timestamp and optionally an end time stamp, or a geometry identifier) and a definition of one or more scene payloads (e.g. payloadId[i][j] and/or a reference to a scene update packet (e.g. updateId[i])) (wherein, for example, but not necessarily, the cell information may be a subscene cell information) defining one or more cells, for example of a plurality of cells, and optionally also a definition of, or for example defining, one or more audio streams.

Furthermore, the cell information defines an association between the one or more, e.g. temporal and/or spatial, cells, e.g. having cell index i, and respective one or more data structures (e.g. payloads or payload packets (e.g. mpegiScenePayload (sometimes also designated as "mpeghiScenePayload")); e.g. payloadId[i][j]; e.g. payloads defining scene objects and/or scene characteristics; e.g. data structures defining sound sources and/or scattering objects and/or scattering surfaces and/or attenuating objects and/or attenuating surfaces, and/or material parameters and/or reverberation characteristics and/or portals and/or early reflections and/or late reverberation and/or diffraction characteristics and/or acoustic materials and/or geometric elements in the scene, e.g. identified by a data structure identifier or a payload identifier; e.g. identified by payloadId) associated with the one or more cells, e.g. using a reference to a payload of a scene payload packet representing one or more respective data structures, and defining a rendering scenario (for example, but not necessarily a subscene rendering scenario).

In addition, the audio decoder is configured to evaluate the cell information in order to determine which data structures, e.g. which scene payloads identified by payloadId[i][j], should be used for the spatial rendering, e.g. at different times or at different listener positions, wherein said data structures may, for example, be included in scene payload packets.

The inventors recognized that based on a definition of cells, a rendering scenario comprising data structures may be defined efficiently. As explained above, the cells may, for example, be temporal and/or spatial cells. In other words, an audio scene, for example an aspect of an audio scene, such as acoustically relevant objects, may be divided or separated or partitioned in time and/or space.

In other words, metadata can, for example, become required (a) at a specific point in time, or (b) at a specific location in space. The "Cell" concept provides, for example, a method to specify at which time and/or location certain payload packets are required for rendering the scene.

The cells may comprise cell bounds, defining a geometry of the cell in the spatial acoustic scene. A cell may, for example, be active when a listener is within the cell bounds and/or when the listener is within the cell bounds at a certain time. Cell bounds can, for example, be arbitrary geometry, but primitive geometries (like axis-aligned bounding boxes) may be advantageous for efficient implementation.

In simple words, and as an example, cells may provide a "packaging" for data structures, e.g. in the form of payloads, for example, defining scene objects and/or scene characteristics, such that those elements are associated with a specific area and/or time in an acoustic scene, and such that those elements can be activated, or taken into account in a simple manner, for example by activating a respective cell.

Furthermore, cells may be overlapping, e.g. implementing a level of detail approach, such that a first cell provides a coarse information about acoustically relevant elements of the audio scene, which is refined by overlapping cells providing more detailed information.

As an example, based on the cell information being optionally included in the payload packets, a decoder may hence select which payloads are needed for a rendering of an audio scene, e.g. based on a temporal or spatial condition of the cell information. Thus, the decoder may only request a selection of payloads, which may be used and/or stored.

Thus, an efficiency may be increased, since less payloads may have to be requested and evaluated, which may reduce a corresponding required bitrate between an encoder and the decoder.

Furthermore, as an example, since the scene configuration packets may comprise the cell information, which may optionally be distributed as small bitstreams packets in a broadcast channel, a good availability of such a fundamental rendering information, e.g. for the efficient selection of payloads, may be provided, which may increase an efficiency of the inventive concept.

According to further embodiments of the invention, the cell information comprises a temporal definition, e.g. a temporal condition, of a given cell, e.g. of a cell having cell index i, e.g. a start time information and/or a stop time information; e.g. a start time stamp and/or an end time stamp; e.g. startTimestamp[i] and/or endTimestamp[i].

Furthermore, the audio decoder is configured to evaluate the temporal definition of the given cell, in order to determine whether the one or more data structures associated with the given cell, e.g. identified by payloadId[i][j], should be considered (e.g. used) in the spatial rendering, wherein the audio decoder may, for example, be configured to selectively use the data structure(s) associated with the given cell if a current playout time fulfills the temporal definition (e.g. temporal condition) of the given cell.

Hence, a temporal information (e.g. temporal evolution) of an audio scene may, for example, be incorporated easily in a rendering procedure, based on the cell concept.

According to further embodiments of the invention, the cell information comprises a spatial definition, e.g. a spatial condition, of a given cell, e.g. a direct geometrical definition or a reference to a definition of a geometrical object; e.g. a geometry identifier; e.g. geometryId[i].

In addition, the audio decoder is configured to evaluate the spatial definition of the given cell, in order to determine whether the one or more data structures associated with the given cell, e.g. identified by payloadId[i][j], should be considered (e.g. used) in the spatial rendering.

Optionally, the audio decoder may, for example, be configured to selectively use the data structure(s) associated with the given cell if a current listener position fulfills the spatial definition (e.g. spatial condition) of the given cell.

Hence, a spatial information about an audio scene may, for example, be incorporated easily in a rendering procedure, based on the cell concept.

According to further embodiments of the invention, the audio decoder is configured to evaluate a number-of-cells information, e.g. numCells, which is included in the scene configuration packet, in order to determine a number of cells.

According to further embodiments of the invention, the cell information comprises a flag, e.g. is Timed[i], indicating whether the cell information comprises a temporal definition of the cell or a spatial definition of the cell.

Furthermore, the audio decoder is configured to evaluate the flag indicating whether cell information comprises a temporal definition of the cell or a spatial definition of the cell, e.g. in order to derive a condition when the one or more data structures associated with a respective cell should be used for the spatial rendering.

Flags may, for example, be transmitted and evaluated with low computational effort and with low requirements with regard to transmission resources.

According to further embodiments of the invention, the cell information comprises a reference of a geometric structure, e.g. geometryId[i], in order to define the cell, wherein the geometric structure may, for example, be defined in a payload packet.

Furthermore, the audio decoder is configured to evaluate the reference of the geometric structure, in order to obtain the geometric definition of the cell.

Using a reference information may, for example, allow to define a plurality of complex geometries, a selection of which may be indicated by the reference information, for example using a list or look up table, which may be common both for encoder and decoder, such that a transmission of extensive information defining the geometry itself may be omitted.

In general it is to be noted that cells may, for example, define a spatial and/or temporal division of the audio scene, comprising acoustically relevant elements, which may be described using payload elements. Therefore, cells may be associated to payloads or payload packets. However, cells themselves may optionally as well represent acoustically relevant objects, wherein their geometry may, for example, represent a geometry of an element.

According to further embodiments of the invention, the audio decoder is configured to obtain a definition of the geometric structure, e.g. of a geometric structure referenced by geometryId, which defines a geometric boundary of the cell, from a global payload packet, wherein a reference to the global payload packet may, for example, be included in the scene configuration packet, and wherein the global payload packet may, for example, define data structures, like scene objects and/or scene characteristics which will be used in multiple cells and/or which should be globally available.

The inventors recognized that geometric structures, and for example especially often used geometric structures, may be defined efficiently by a global definition, hence, a global payload packet, which may be globally available.

According to further embodiments of the invention, the audio decoder is configured to identify one or more current, for example temporal and/or spatial, cells, e.g. using a current playout time and/or a current position, and optionally temporal and/or spatial definitions of the cells.

Furthermore, the audio decoder is configured to perform the spatial rendering, e.g. selectively, using one or more data structures, e.g. payloads, associated with the one or more identified current cells, and optionally also using one or more globally required payloads.

As an example, a current cell may, for example be an active cell, hence a cell of which associated metadata, e.g. payloads, may be taken into account for the rendering of an audio scene. Accordingly, only a limited amount of cells may have to be activated, such that a signaling and computation effort may be limited.

The inventors recognized that only a portion of the available cells may have to be activated and/or taken into account, for example for a certain listener (e.g. spatially at a certain location), and/or for example, for a current playout time of an audio scene.

According to further embodiments of the invention, the audio decoder is configured to identify one or more current, for example, temporal and/or spatial, cells, e.g. using a current playout time and/or a current position, and optionally temporal and/or spatial definitions of the cells.

Furthermore, the audio decoder is configured to perform the spatial rendering, e.g. selectively, using one or more scene objects (e.g. audio sources and/or scattering objects and/or attenuating objects, and/or obstacles) and/or scene characteristics (e.g. material characteristics, and/or propagation characteristics, and/or diffraction characteristics, and/or reflection characteristics) associated with the one or more identified current cells, and optionally also using one or more globally required payloads.

According to further embodiments of the invention, the audio decoder is configured to select scene objects and/or scene characteristics to be considered, e.g. used, in the spatial rendering in dependence on the cell information.

According to further embodiments of the invention, the audio decoder is configured to determine, in which one or more, e.g. spatially overlapping, spatial cells a current position, e.g. a current listener's position, lies, e.g. using cell bounds which may, for example, be defined in one or more globally required payloads, for example to thereby obtain identified cells.

Furthermore, the audio decoder is configured to perform the spatial rendering, e.g. selectively, using one or more scene objects, e.g. audio sources and/or scattering objects and/or attenuating objects, and/or obstacles, and/or scene characteristics, e.g. material characteristics, and/or propagation characteristics, and/or diffraction characteristics, and/or reflection characteristics, associated with the one or more identified current cells, and optionally also using one or more globally required payloads.

This may allow to efficiently render an audio scene.

According to further embodiments of the invention, the audio decoder is configured to determine one or more payloads, e.g. payloads describing scene objects and/or scene characteristics; e.g. payloads mpegiPayloadElement( ) (sometimes also designated as "mpeghiPayloadElement"), associated with one or more current cells, e.g. having cell index i, on the basis of an enumeration of payload identifiers, e.g. for (j=0;j<numPayloads[i];j++){payloadId[i][j];}, included in a cell definition of a cell.

In addition, the audio decoder is configured to perform the spatial rendering using the determined one or more payloads, e.g. while leaving other payloads, associated with other cells, unconsidered/neglected.

Hence, as an example, cells may be associated with payloads, which may, for example, define metadata which may be used in order to incorporate acoustically relevant elements in an acoustic scene. Therefore, based on an identification of a respective cell, a selection of payloads to be considered may be performed (and a selection of which payloads to leave unconsidered), hence increasing the efficiency of the audio rendering.

According to further embodiments of the invention, the audio decoder is configured to perform the spatial rendering using information from one or more scene update packets, e.g. mpegiSceneUpdate( ) (sometimes also designated as "mpeghiSceneUpdate"), which are associated with one or more current cells, and which may, for example, be identified, e.g. using a reference updateId[i], in cell definitions of the cells, wherein a scene update, as defined by a scene update packet, may, for example, comprise an activation and/or a deactivation of one or more scene objects.

As an example, updates may be associated with certain cells, or elements, e.g. payload elements, associated with a certain cell respectively. Hence, scene updates may be indicated efficiently based on a referencing of a corresponding cell.

According to further embodiments of the invention, the audio decoder is configured to update a rendering scene using information from one or more scene update packets, e.g. a scene update packet designated by updateId[ ], associated with a given cell, in response to a finding that the given cell becomes active, e.g. in response to a finding that a position reaches or enters a region associated with the cell, and/or in response to a finding that a playout time reaches a time or time interval associated with the cell, or enters a time interval associated with the cell.

Therefore, acoustically relevant elements of a scene may, for example, be updated when they are needed for the rendering of the rendering scene, e.g. audio scene. The inventors recognized that based on an activation state of a cell, a need for providing an up to date version of acoustic metadata may be indicated efficiently.

According to further embodiments of the invention, the cell information comprises a reference, e.g. updateId[i], of a and/or to a scene update packet, e.g. mpegiSceneUpdate[ ] (sometimes also designated as "mpeghiSceneUpdate"), defining an update of scene metadata for the rendering, e.g. a change of a parameter of a scene object or a change of a scene characteristic, and optionally comprising a representation of one or more update conditions.

Furthermore, the audio decoder is configured to selectively perform the update of the scene metadata defined in a given scene update packet in response to a detection that a cell comprising a link to the given scene update packet becomes active, e.g. such that the audio decoder uses the evaluation of the cell information to determine which scene objects and/or scene characteristics should be used for the spatial rendering and also to determine, by means of the link to the scene update packet, which update of scene metadata should be made in response to an activation of the cell.

Hence, based on the cell information a scene update packet associated with a respective cell may be requested and/or acquired. As an example, upon an activation of a cell, the metadata associated with the cell may be updated based on the referenced scene update packet. Therefore, metadata may be updated efficiently.

According to further embodiments of the invention, the one or more scene update packets comprise a representation of one or more update conditions, and the audio decoder is configured to evaluate whether the one or more update conditions, e.g. as defined in the scene update packets, are fulfilled and to selectively update one or more scene metadata in dependence on a content of the one or more scene update packets, if the one or more update conditions are fulfilled, e.g., such that there are, for example, two mechanisms for triggering an update of the one or more scene metadata in dependence on the content of the one or more scene update packets, namely the triggering using a cell defined in the scene configuration packet and a triggering using a condition defined in the scene update packet itself.

Hence, an acoustic scene may be updated efficiently. Embodiments may allow to define and provide flexible trigger conditions, such that an efficient update triggering may be provided for a plurality of different applications.

According to further embodiments of the invention, the audio decoder is configured to evaluate a temporal condition, e.g. a temporal trigger condition; e.g. defined by startTimestamp, which is included in a scene update packet, in order to decide whether one or more scene metadata should be updated in dependence on a content of the one or more scene update packets, e.g. in dependence on an enumeration of scene metadata items to be changed, e.g. referenced by "targetId", and corresponding new values, e.g. defined by "attribute".

Furthermore, the temporal condition defines a start time instant, e.g. using a bitstream element startTimestamp, or the temporal condition defines a time interval, e.g. using a start time and an end time.

In addition, the audio decoder is configured to effect an update of one or more scene metadata, e.g. in accordance with the definition included in a respective scene update packet, in response to a detection, e.g. immediately in response to the detection, or using a temporal delay defined within the respective scene update packet, that a current playout time, e.g. a scene time, has reached the start time instant or lies after the start time instant.

Alternatively, the audio decoder is configured to effect an update of one or more scene metadata, e.g. in accordance with the definition included in a respective scene update package, in response to a detection that a current playout time, e.g. the scene time, lies within the time interval.

Alternatively, or in addition, the audio decoder is configured to evaluate a spatial condition, e.g. a spatial trigger condition, which is included in a scene update packet, e.g. a spatial condition defined by a reference to a geometry definition; e.g. a spatial condition defined by geometryId, in order to decide whether one or more scene metadata should be updated in dependence on a content of the one or more scene update packets, e.g. in dependence on an enumeration of scene metadata items to be changed, e.g. referenced by "targetId", and corresponding new values, e.g. defined by "attribute".

Hence, updates may, for example, be triggered by a temporal condition and/or by a spatial condition, providing a good flexibility for an implementation of an update condition and hence allowing to efficiently update an acoustic scene.

According to further embodiments of the invention, the spatial condition in the scene update packet defines a geometry element, e.g. using a reference to a geometry definition, wherein said geometry definition may, for example, be included in a scene payload element.

In addition, the audio decoder is configured to effect an update of one or more scene metadata, e.g. in accordance with the definition included in a respective scene update packet, in response to a detection, e.g. immediately in response to the detection, or, for example, using a temporal delay defined within the respective scene update packet, that a current position has reached the geometry element, e.g. has reached a one-dimensional boundary defined by the geometry element, or, for example, has reached a two-dimensional boundary defined by the geometry object, or, for example, has reached a three-dimensional boundary defined by the geometry object, or in response to a detection, e.g. immediately in response to the detection, or, for example, using a temporal delay defined within the respective scene update packet, that a current position lies within the geometry element, e.g. within a two-dimensional geometry element or within a three-dimensional geometry element.

Hence, the inventors recognized that a spatial condition may represent or define a geometry element, for example, in the form of a cell. The geometry element may, for example, be a spatial portion of the audio scene, e.g. the rendering scenario. Hence, acoustically relevant metadata may be determined, as an example, based on a position of a listener, or a user for which the audio scene is rendered, such that metadata, associated with the geometry element, the metadata optionally describing acoustically relevant elements or characteristics of the scene, may be relevant if the listener or user is close to or even within the geometry element. In order to thus render the audio scene with high quality, the metadata associated with such a geometry element (e.g. metadata describing elements that are spatially arranged around or within the geometric element in the audio scene) may be updated.

According to further embodiments of the invention, the audio decoder is configured to evaluate whether an interactive trigger condition, which may, for example, be defined in a scene update packet (e.g. a condition that a user takes a certain action which goes beyond a mere movement within a scene; e.g. a condition that a user gives a predetermined command or activates a predetermined button, e.g. defined by the flag "fireOn") is fulfilled, in order to decide whether one or more scene metadata should be updated in dependence on a content of the one or more scene update packets.

Hence, event triggered updates may be incorporated in a rendering of an audio scene. This may, for example, be especially advantageous in the context of VR applications, for example wherein a digital twin of an object, such as a machine or building is simulated. The acoustic environment may change based on an interaction with the digital twin of the object and not solely based on a relative position to the object or a time in the simulation.

According to further embodiments of the invention, the audio decoder is configured to evaluate the cell information, in order to determine at which time, e.g. at which playout time, and/or in which area of a listener position which data structures, e.g. which payloads designated by a payload identifier, e.g. payloadId, are required, or should, for example, be used, for the spatial rendering.

Hence, the cell information may be a compact information that allows to determine or to associate or to connect acoustically relevant information of an audio scene (e.g. location (e.g. area), time (e.g. playout time) and acoustic characteristics (e.g. as defined by payloads) at the location and time), therefore allowing an efficient rendering of the audio scene.

According to further embodiments of the invention, the audio decoder is configured to spatially render one or more audio signals using a first set of scene objects and/or scene characteristics, e.g. using scene objects and/or scene characteristics referenced in a cell information associated with a first cell, and optionally global scene objects and/or scene characteristics which apply to all cells, when a listener position lies within a first spatial region, e.g. within a first cell.

Furthermore, the audio decoder is configured to spatially render the one or more audio signals using a second set of scene objects and/or scene characteristics, e.g. using scene objects and/or scene characteristics referenced in a cell information associated with a second cell, and optionally global scene objects and/or scene characteristics which apply to all cells, when a listener position lies within a second spatial region, e.g. within a second cell.

In addition, the first set of scene objects and/or scene characteristics provides for a more detailed spatial rendering when compared to the second set of scene objects and/or scene characteristics, e.g. because the first set of scene objects and/or scene characteristics comprises a larger number of scene objects and/or scene characteristics than the second set of scene objects and/or scene characteristics, wherein, for example, the first second spatial region may be closer to the sound sources than the first spatial region.

The inventors recognized that a level-of-detail concept may allow an efficient rendering of an audio scene. As an example, a level-of-detail (LOD) decomposition of the acoustic scene may be performed: For example, far away from a geometric structure, a coarse geometric representation of the structure may be sufficient (e.g. with a small number of reflective surfaces), whereas close to the same structure, reflections on the geometric structure and other effects related to geometrical acoustics should be rendered with a higher LOD (e.g. with a large number of reflective surfaces). This can, for example, be achieved, by specifying one cell for the vicinity of the considered geometry including a high LOD geometric representation, and one cell for the remaining scene, including a low LOD geometric representation.

Hence, in general cells may be overlapping and/or even containing or comprising each other. Therefore, it is to be noted that in general, cells may be used to define different degrees of generalization or abstraction of an audio scene. E.g. a first cell may be associated with a coarse metadata for a rendering of the audio scene at the location and for example activation time of the cell. A second overlapping cell may provide refined or additional metadata information for a finer rendering of the audio scene.

A level of detail may hence be scaled not only by a distance to a certain element, but as well with regard to an available bandwidth and/or other requirements that may make a level of detail scaling needed or beneficial.

Hence, an audio scene may be rendered with a variable level of granularity.

According to further embodiments of the invention, the audio decoder is configured to request the one or more scene payload packets, which may, for example, comprise the data structures referenced in the cell information, from a packet provider, e.g. using a backchannel to a packet provider, e.g. in response to a determination, by the audio decoder, that one or more scene payload packets, or a content of one or more scene payload packets, is required for a rendering.

Therefore, a traffic on a broadcast channel may, for example, be reduced, since a respective decoder may individually request only the payload packets needed for itself.

According to further embodiments of the invention, the audio decoder is configured to identify one or more data structures to be used for the spatial rendering using a payload identifier, e.g. payloadId[i], which is included in the cell information.

Based on a payload identifier, data structures may, for example, be identified efficiently.

According to further embodiments of the invention, the audio decoder is configured to request one or more scene payload packets from a packet provider, e.g. using a backchannel to a packet provider, e.g. in response to a determination, by the audio decoder, on the basis of the cell information that one or more scene payload packets, or a content of one or more scene payload packets, is required for a rendering.

The inventors recognized that for example, in a broadcasting scenario, traffic on the broadcast channel may be reduced, if the decoders or renderers are configured and hence for example responsible, to identify and request missing scene payload packets, e.g. via a separate channel.

According to further embodiments of the invention, the audio decoder is configured to request one or more scene payload packets from a packet provider using a payload ID which is included in the cell information, e.g. using an ID associated with a payload element.

Alternatively, the audio decoder is configured to request the one or more scene payload packets from a packet provider using a packet ID, e.g. using an ID associated with a scene payload packet.

Payload and/or packet IDs may, for example, be efficient means to identify and request missing scene payload packets, hence allowing to keep request transmission costs low.

According to further embodiments of the invention, the audio decoder is configured to anticipate, e.g. using a prediction, which one or more data structures, e.g. which one or more PayloadElements, will be required, or are expected to be required, e.g. using a prediction which cell will become active next, or has a defined likelihood to become active next, using the cell information, and to request the one or more data structures, or one or more scene payload packets comprising said one or more data structures, before the data structures are actually required.

Hence, time constraints for a transmission of respective data structures may be relaxed. This may, for example, be especially advantageous in scenarios wherein an audio scene has to be rendered in real time, and/or wherein the audio scene may change in real time, but in predictable way, e.g. when it is known a priori that or can at least be modeled how an event triggers subsequent further events which change acoustic characteristics of the scene.

According to further embodiments of the invention, the audio decoder is configured to extract payloads identified by the cell information from a bitstream, e.g. from payload packets of a bitstream, e.g. from payload packets of a broadcast bitstream.

According to further embodiments of the invention, the audio decoder is configured to keep track of required data structures, e.g. payloads identified by a payload identifier payloadId[i], using the cell information.

Therefore, the decoder may, e.g. at least approximately, be up to date, e.g. to a scene time or playout time, e.g. with regard to acoustically relevant elements of a scene. This may allow usage of small, incremental updates a usage of which may, for example, reduce transmission costs.

According to further embodiments of the invention, the audio decoder is configured to selectively discard one or more data structures, e.g. payloads identified by a payload identifier payloadId[i], in dependence on the cell information, e.g. in response to a finding, using the cell information, that a current playout time lies after a time interval (defined in the cell information) during which the data structure is required, and/or in response to a finding that a current listener position is sufficiently far away from a geometrical cell boundary of a cell within which the data structure is required.

Hence, audio scene information may be updated efficiently, based on the separation of the acoustic scene or aspects thereof in cells.

According to further embodiments of the invention, the cell information defines a location-based and/or time-based subdivision of rendering scene.

This may allow to reduce a complexity of the rendering scenario.

According to further embodiments of the invention, the audio decoder is configured to obtain a definition of, for example temporal and/or spatial, cells on the basis of a scene configuration data structure, e.g. a scene configuration packet, e.g. SceneConfig, wherein the scene configuration data structure may be located at a beginning of a file or stream, and wherein the scene configuration data structure may optionally be repeated within a stream, wherein the decoder may, for example, be configured to parse a file or stream for a scene configuration packet.

The inventors recognized that cell definitions may be provided efficiently, using inventive scene configuration data structures.

According to further embodiments of the invention, the audio decoder is configured to request one or more data structures, e.g. payloads or payload packets, using respective data structure identifiers, e.g. payload identifiers or payload packet identifiers, e.g. payloadId.

In addition, the audio decoder is configured to derive the data structure identifiers of data structures to be requested using the cell information, e.g. by identifying in which cell or cells a current position lies, and optionally by providing a request message comprising data structure identifiers associated with the one or more identified cells; e.g. by identifying one or more cells which are associated with a current time information, and by providing a request message comprising data structure identifiers associated with the one or more identified cells.

As explained before, as an example, by implementing a request based provision of data structures, traffic on a broadcast channel may be reduced.

According to further embodiments of the invention, the audio decoder is configured to anticipate, e.g. using a prediction, which one or more data structures will be required, or are expected to be required, e.g. using a prediction which cell will become active next, or has a defined likelihood to become active next, and to request the one or more data structures before the data structures are actually required.

As explained before, this may, for example, relax time constraints on a transmission of required data structures, for example in real time applications.

According to further embodiments of the invention, the audio decoder is configured to extract one or more data structures, e.g. payloads or payload packets, using respective data structure identifiers, e.g. payload identifiers or payload packet identifiers, e.g. payloadId.

In addition, the audio decoder is configured to derive the data structure identifiers of data structures to be extracted, and optionally evaluated, using the cell information.

According to further embodiments of the invention, the audio decoder is configured to extract metadata required for a rendering, e.g. for a rendering of complex and/or dynamic 6DoF audio scenes, from a payload packet, e.g. a "Scene Payload" packet.

Optionally a scene payload packet may comprise a plurality of payload elements, e.g. mpegiPayloadElement (sometimes also designated as "mpeghiPayloadElement"), to which payload element identifiers, e.g. ID, are assigned.

In the following embodiments related to an apparatus for providing an encoded audio representation, e.g. an encoder, are discussed. It is to be noted that such embodiments may be based on the same or similar or corresponding considerations as the above embodiments related to a decoder. Hence, the following embodiments may comprise same, similar or corresponding features, functionalities and details as the above disclosed embodiments, both individually and taken in combination.

Further embodiments according to the invention, comprise an apparatus, e.g. an audio encoder or an audio server, for providing an encoded audio representation, wherein the apparatus is configured to provide an information for a spatial rendering of one or more audio signals and to provide a plurality of packets of different packet types, e.g. having packet types which are conformant to a MPEG-H MHAS packet definition.

Furthermore, the apparatus is configured to provide a scene configuration packet, e.g. a scene configuration packet which is conformant to a MPEG-H MHAS packet definition, e.g. Scene ConfigPacket, e.g. mpegiSceneConfig[ ] (sometimes also designated as "mpeghiSceneConfig"), providing a renderer configuration information, e.g. defining a usage of scene objects and/or a usage of scene characteristics, e.g. defining when or under which In addition, the scene configuration packet comprises a cell information (e.g. an information numCells indicating a number of cells and, for each cell, a definition of one or more cell conditions (e.g. a start timestamp and optionally an end time stamp, or a geometry identifier) and a definition of one or more scene payloads (e.g. payloadId[i][j] and/or a reference to a scene update packet (e.g. updateId[i])), defining one or more cells, of a plurality of cells, and optionally also a definition of one or more audio streams.

Moreover, the cell information defines an association between the one or more, e.g. temporal and/or spatial, cells, e.g. having cell index i, and respective one or more data structures (e.g. payloads or payload packets; e.g. payloadId [i][j]; e.g. payloads defining scene objects and/or scene characteristics; e.g. data structures defining sound sources and/or scattering objects and/or scattering surfaces and/or attenuating objects and/or attenuating surfaces, and/or material parameters and/or reverberation characteristics and/or portals and/or early reflections and/or late reverberation and/or diffraction characteristics and/or acoustic materials and/or geometric elements in the scene, e.g. identified by a data structure identifier or a payload identifier; e.g. identified by payloadId) associated with the one or more cells, e.g. using a reference to a payload of a scene payload packet representing one or more respective data structures, and defining a rendering scenario.

The audio decoder may optionally provide any of the packets disclosed herein, also with respect to the audio encoder, both individually and taken in combination. Moreover the cell information may, for example, comprise any of the characteristics disclosed herein, also with respect to the audio decoder, both individually and taken in combination.

According to further embodiments of the invention, the apparatus is configured to repeat a provision of the scene configuration packet, or for example even of a sequence of a scene configuration packet and one or more scene payload packets and optionally also one or more scene update packets, periodically. Alternatively or in addition, the apparatus is configured to provide one or more scene payload packets at request, e.g. at the request of an audio decoder or renderer.

In simple words and as an example, a responsibility to distribute scene configuration packets may be fulfilled by the encoder. Optionally, the encoder may as well determine when to provide which payload packets and may, for example, broadcast the same or a portion thereof, e.g. periodically, for example together with the scene configuration packets. On the other hand, the decoder may explicitly demand needed payloads, such that respective payload packets are optionally only provided at request, e.g. via a unicast channel.

According to further embodiments of the invention, the apparatus is configured to provide one or more scene payload packets, which comprise one or more data structures referenced in the cell information.

According to further embodiments of the invention, the apparatus is configured to provide the scene payload packets, taking into account when the data structures included in the scene payload packets are needed by an audio decoder in accordance with the cell information.

Hence, as an example, it may be made certain or at least likely by the encoder that needed information is at the decoder or renderer in a timely manner, for example, in order to prevent buffering times or acoustic lags.

According to further embodiments of the invention, the audio encoder or decoder is configured to provide a first cell information defining a first set of scene objects and/or scene characteristics for a rendering of a scene when a listener position lies within a first spatial region, e.g. within a first cell.

Furthermore, the audio encoder or decoder is configured to provide a second cell information defining a second set of scene objects and/or scene characteristics for a rendering of a scene when a listener position lies within a second spatial region, e.g. within a second cell.

The first set of scene objects and/or scene characteristics provides for a more detailed spatial rendering when compared to the second set of scene objects and/or scene characteristics, e.g. because the first set of scene objects and/or scene characteristics comprises a larger number of scene objects and/or scene characteristics than the second set of scene objects and/or scene characteristics, wherein, for example, the first second spatial region may be closer to the sound sources than the first spatial region.

According to further embodiments of the invention, the apparatus is configured to use different cell definitions in order to control a spatial rendering with different level of detail, e.g. in dependence on whether a listener's position lies within a first cell or a second cell, wherein, for example, a cell which is relatively closer to the sound source may comprise more data structures (e.g. data structures describing reflective surfaces and/or absorptive surfaces, and/or scattering objects and/or absorbing objects, and so on) than a cell which is relatively further away from the sound source.

The inventors recognized that using different cell definitions or even different categories of cell definitions may allow to implement a level of detail concept efficiently, such that a quality of a rendering of an audio scene may be scalable.

In the following embodiments related to methods for providing a decoded and encoded audio representation are discussed. It is to be noted that such embodiments may be based on the same or similar or corresponding considerations as the above embodiments related to apparatuses. Hence, the following embodiments may comprise same, similar or corresponding features, functionalities and details as the above disclosed embodiments, both individually and taken in combination.

Further embodiments according to the invention comprise a method for providing a decoded, and optionally rendered, audio representation on the basis of an encoded audio representation, wherein the method comprises spatially rendering one or more audio signals, which may, for example, be encoded within the encoded audio representation.

In addition, the method comprises receiving a scene configuration packet, e.g. a scene configuration packet which is conformant to a MPEG-H MHAS packet definition, e.g. Scene ConfigPacket, e.g. mpegiSceneConfig[ ] designated (sometimes also as "mpeghiSceneConfig"), providing a renderer configuration information, e.g. defining a usage of scene objects and/or a usage of scene characteristics, e.g. defining when or under which condition different scene objects and/or scene characteristics should be used in a rendering process.

Furthermore, the scene configuration packet comprises a cell information, e.g. an information numCells indicating a number of cells and, for each cell, a definition of one or more cell conditions (e.g. a start timestamp and optionally an end time stamp, or a geometry identifier) and a definition of one or more scene payloads (e.g. payloadId[i][j] and/or a reference to a scene update packet (e.g. updateId[i]), defining one or more cells, for example of a plurality of cells, and optionally also a definition of one or more audio streams.

In addition, the cell information defines an association between the one or more, e.g. temporal and/or spatial, cells, e.g. having cell index i, and respective one or more data structures (e.g. payloads or payload packets; e.g. payloadId [i][j]; e.g. payloads defining scene objects and/or scene characteristics; e.g. data structures defining sound sources and/or scattering objects and/or scattering surfaces and/or attenuating objects and/or attenuating surfaces, and/or material parameters and/or reverberation characteristics and/or portals and/or early reflections and/or late reverberation and/or diffraction characteristics and/or acoustic materials and/or geometric elements in the scene, e.g. identified by a data structure identifier or a payload identifier; e.g. identified by payloadId) associated with the one or more cells, e.g. using a reference to a payload of a scene payload packet representing one or more respective data structures, and defining a rendering scenario.

Moreover, the method comprises evaluating the cell information in order to determine which data structures, e.g. which scene payloads identified by payloadId[i][j], should be used for the spatial rendering, e.g. at different times or at different listener positions, wherein said data structures may, for example, be included in scene payload packets.

Further embodiments according to the invention comprise a method, e.g. an audio encoder or for an audio encoder, or an audio server or for an audio server, for providing an encoded audio representation, wherein the method comprises providing an information for a spatial rendering of one or more audio signals and providing a plurality of packets of different packet types, e.g. having packet types which are conformant to a MPEG-H MHAS packet definition.

Furthermore, the method comprises providing a scene configuration packet, e.g. a scene configuration packet which is conformant to a MPEG-H MHAS packet definition, e.g. Scene ConfigPacket, e.g. mpegiSceneConfig[ ] also (sometimes designated as "mpeghiSceneConfig"), providing a renderer configuration information, e.g. defining a usage of scene objects and/or a usage of scene characteristics, e.g. defining when or under which condition different scene objects and/or scene characteristics should be used in a rendering process.

Moreover, the scene configuration packet comprises a cell information (e.g. an information numCells indicating a number of cells and, for each cell, a definition of one or more cell conditions (e.g. a start timestamp and optionally an end time stamp, or a geometry identifier) and a definition of one or more scene payloads (e.g. payloadId[i][j] and/or a reference to a scene update packet (e.g. updateId[i])) defining one or more cells, for example of a plurality of cells, and optionally also a definition of one or more audio streams.

Furthermore, the cell information defines an association between the one or more, e.g. temporal and/or spatial, cells, e.g. having cell index i, and respective one or more data structures (e.g. payloads or payload packets; e.g. payloadId [i][j]; e.g. payloads defining scene objects and/or scene characteristics; e.g. data structures defining sound sources and/or scattering objects and/or scattering surfaces and/or attenuating objects and/or attenuating surfaces, and/or material parameters and/or reverberation characteristics and/or portals and/or early reflections and/or late reverberation and/or diffraction characteristics and/or acoustic materials and/or geometric elements in the scene, e.g. identified by a data structure identifier or a payload identifier; e.g. identified by payloadId) associated with the one or more cells, e.g. using a reference to a payload of a scene payload packet representing one or more respective data structures, and defining a rendering scenario.

Further embodiments according to the invention comprise a computer program for performing a method according to any of the embodiments as disclosed herein when the computer program runs on a computer.

In the following embodiments related to bitstreams are discussed. It is to be noted that such embodiments may be based on the same or similar or corresponding considerations as the above embodiments related to apparatuses and/or methods. Hence, the following embodiments may comprise same, similar or corresponding features, functionalities and details as the above disclosed embodiments, both individually and taken in combination.

Further embodiments according to the invention comprise a bitstream representing an audio content, the bitstream comprising a plurality of packets of different packet types, e.g. having packet types which are conformant to a MPEG-H MHAS packet definition, the packets comprising a scene configuration packet, e.g. a scene configuration packet which is conformant to a MPEG-H MHAS packet definition, e.g. Scene ConfigPacket, e.g. mpegiSceneConfig[ ] (sometimes also designated as "mpeghiSceneConfig"), providing a renderer configuration information, e.g. defining a usage of scene objects and/or a usage of scene characteristics, e.g. defining when or under which condition different scene objects and/or scene characteristics should be used in a rendering process.

Furthermore, the scene configuration packet comprises a cell information, e.g. an information numCells indicating a number of cells and, for each cell, a definition of one or more cell conditions (e.g. a start timestamp and optionally an end time stamp, or a geometry identifier) and a definition of one or more scene payloads (e.g. payloadId[i][j] and/or a reference to a scene update packet (e.g. updateId[i]), defining one or more cells, for example of a plurality of cells, and optionally also a definition of one or more audio streams.

Moreover, the cell information defines an association between the one or more, e.g. temporal and/or spatial, cells, e.g. having cell index i, and respective one or more data structures (e.g. payloads or payload packets; e.g. payloadId [i] [i]; e.g. payloads defining scene objects and/or scene characteristics; e.g. data structures defining sound sources and/or scattering objects and/or scattering surfaces and/or attenuating objects and/or attenuating surfaces, and/or material parameters and/or reverberation characteristics and/or portals and/or early reflections and/or late reverberation and/or diffraction characteristics and/or acoustic materials and/or geometric elements in the scene, e.g. identified by a data structure identifier or a payload identifier; e.g. identified by payloadId) associated with the one or more cells, e.g. using a reference to a payload of a scene payload packet representing one or more respective data structures, and defining a rendering scenario.

As an example, the bitstream may optionally be supplemented by any bitstream elements disclosed herein, both individually and taken in combination.

Further embodiments according to the invention comprise an audio decoder, for providing a decoded audio representation on the basis of an encoded audio representation, wherein the audio decoder is configured to receive a plurality of packets of different packet types, the packets comprising one or more scene configuration packets providing a renderer configuration information, the packets comprising one or more scene update packets defining an update of scene metadata for the rendering.

Furthermore, the audio decoder is configured to evaluate whether one or more update conditions are fulfilled and to selectively update one or more scene metadata in dependence on a content of the one or more scene update packets if the one or more update conditions are fulfilled.

It is to be noted that such an inventive decoder may comprise same, similar or corresponding features, functionalities and details as any of the above disclosed embodiments or as any of the other embodiments disclosed herein, both individually and taken in combination.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
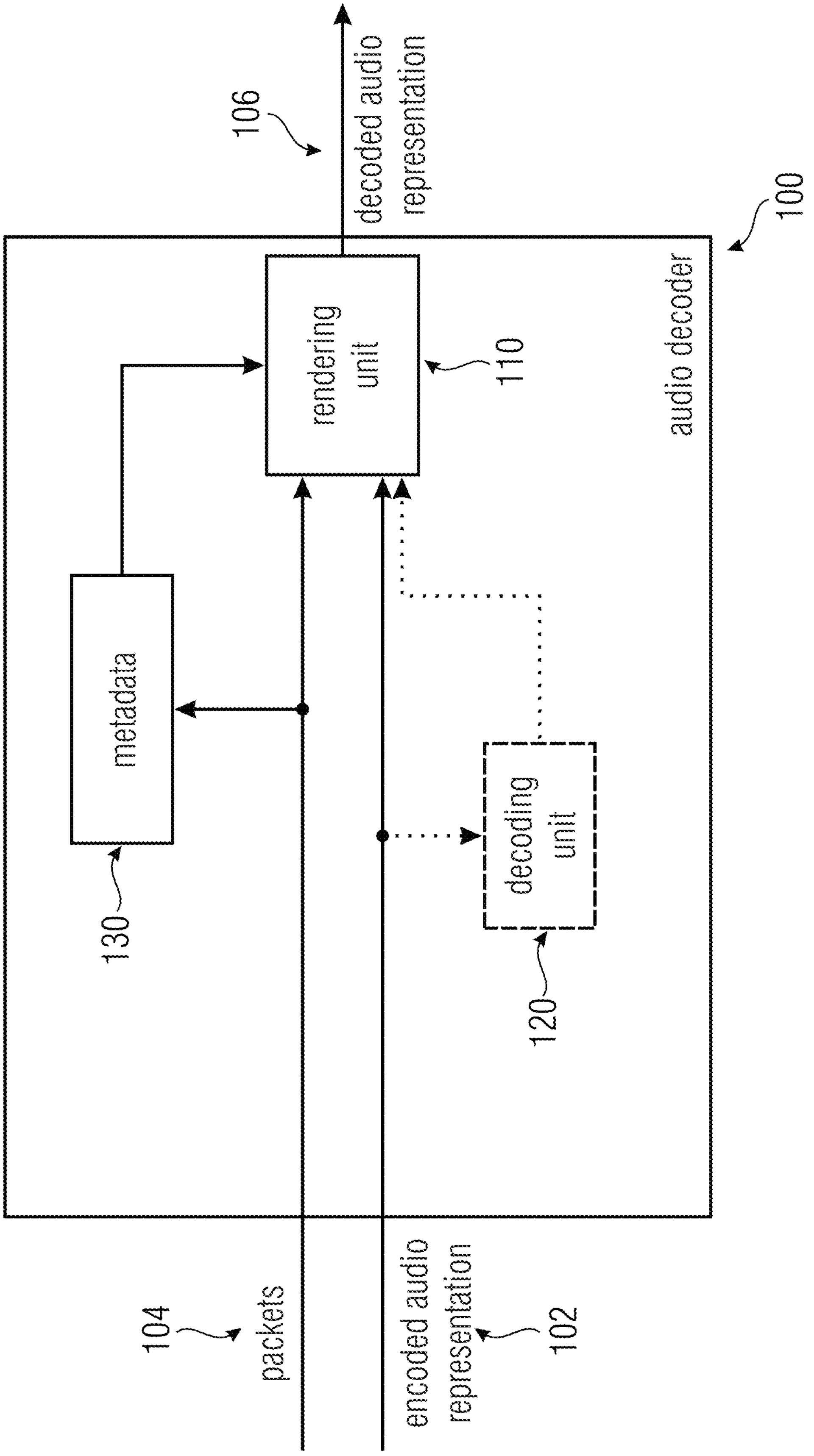
FIG. 1 shows a schematic view of an audio decoder according to embodiments of a first aspect of the invention.

Equal or equivalent elements or elements with equal or equivalent functionality are denoted in the following description by equal or equivalent reference numerals even if occurring in different figures.

In the following description, a plurality of details is set forth to provide a more throughout explanation of embodiments of the present invention. However, it will be apparent to those skilled in the art that embodiments of the present invention may be practiced without these specific details. In other instances, well-known structures and devices are shown in block diagram form rather than in detail in order to avoid obscuring embodiments of the present invention. In addition, features of the different embodiments described herein after may be combined with each other, unless specifically noted otherwise.

FIG. 1 shows a schematic view of an audio decoder according to embodiments of the first aspect of the invention. FIG. 1 shows audio decoder 100 which is configured to provide a decoded and as shown, optionally rendered, audio representation 106 on the basis of an encoded audio representation 102. The audio decoder 100 comprises a rendering unit 110 which is configured to spatially render one or more audio signals. Therefore, rendering unit 110 may optionally comprise a decoding unit, which may be configured to decode the encoded audio representation in order to obtain the one or more audio signals. However, as another option, as shown with dotted and dashed lines, audio decoder 100 may comprise a decoding unit 120, which may be provided with the encoded audio representation 102 and which may provide the one or more audio signals to the rendering unit 110.

Furthermore, the audio decoder 100 is configured to receive a plurality of packets 104 of different packet types, the packets comprising one or more scene configuration packets, providing a renderer configuration information defining a usage of scene objects and/or a usage of scene characteristics, as well as one or more scene update packets defining a update of scene metadata 130 for the rendering and one or more scene payload packets comprising definitions of one or more of the scene objects and/or definitions of one or more of the scene characteristics.

Hence, based on the scene configuration packets, a renderer configuration of the rendering unit 110 may be set and/or adjusted. Based on the renderer configuration, the rendering unit 110 may determine which scene object and or scene characteristics are to be considered.

Such objects and/or characteristics may, for example, be defined using metadata 130. As explained before, based on the scene update packets, said metadata 130 may be updated for the rendering.

As an example, based on the scene payload packets, new definitions of scene objects and/or of scene characteristics may be added to the metadata 130 for the rendering unit 110, and/or may be provided directly to the rendering unit 110.

Accordingly, rendering unit 110 is configured to select definitions of one or more scene objects and/or definitions of one or more scene characteristics, which are in included in the scene payload packets, for the rendering in dependence on the renderer configuration information. In addition, as explained before, the decoder 100 is configured to update one or more scene metadata 130 in dependence on a content of the one or more scene update packets.

In simple words, and as an example, the decoder 100 may receive an encoded audio representation 102. This encoded audio representation may be decoded in order to obtain an audio information. The audio information may, for example, comprise an information about spectral coefficients of an audio signal.

However, for an accurate reconstruction of an audio scene or for example for an immersive acoustic feeling in a VR or AR environment, further effects may have to be taken in to account. Therefore, the decoder 100 may be configured to take metadata 130 for a rendering of the audio information into account.

This metadata may, for example, comprise or describe or relate to data objects that may further define characteristics or elements, e.g. objects, of the acoustic scene. The metadata may, for example, define elements, for example in space and/or time that may cause acoustically relevant effects such as reverberation, reflection and the same.

To exploit the concept of audio metadata in an efficient way, packets 104 are provided to the decoder 100. The inventors recognized that a distinction in at least three packet types may, for example, be advantageous.

Scene configuration packets may, for example, provide an information about which acoustic elements and/or characteristics are to be considered, for example, at a certain location in the audio scene, or at a certain time. In order to incorporate changes to the acoustically relevant elements, scene update packets are, for example, introduced, such that respective metadata can be changed.

The scene payload packets on the other hand may, for example, comprise information and/or definitions of acoustically relevant elements, e.g. objects or scene characteristics themselves that may be relevant for a rendering of the audio signal. A selection of the payload elements may be performed based on the scene configuration information.

Furthermore, it is to be highlighted, that the above explained and shown metadata 130 is optional. The rendering unit may, for example, pick and consider only acoustically relevant elements as defined by the payload packets provided to the decoder 100. A selection thereof may, for example, be performed by the rendering configuration which may be adapted based on the scene configuration packets.

Furthermore, it is to be noted that a separation of the incoming signals in packets 104 and encoded audio representation 102 is an example. The encoded audio representation may be provided as part of the packets 104, e.g. as an MPEGH3DAFRAME, for example in the form of a packet, e.g. comprising an information about spectral audio coefficients. On the other hand, decoder 100 may, for example, receive only an encoded audio representation, comprising, in addition to the audio information or audio signal, the packets 104, as explained above, comprising the configuration data, update data and metadata. Hence an optional decoding unit 120 may be configured to decode encoded packets alternatively or in addition.

As an optional feature, the decoder 100 is configured to determine a rendering configuration, e.g. using rendering unit 110 or an optional evaluation unit (e.g. as explained in the context of FIG. 2) on the basis of a scene configuration packet to determine an update of the rendering configuration of rendering unit 110 on the basis of one or more scene update packets.

Hence, the scene configuration packet may, for example, comprise a full set of configuration parameters and based thereon, for example incremental updates, may be provided or performed based on the scene update packets.

Optionally, the one or more scene update packets may comprise an enumeration of scene metadata items to be changed, and the enumeration may comprise, for one or more metadata items to be changed, a metadata identifier and a metadata update value. Hence, optionally, metadata 130 may be organized based on an identifier, e.g. a number, and one or more values. Such a value may be changed according to the metadata update value.

As another optional feature, the audio decoder 100, e.g. the rendering unit 110 of decoder 100, is configured to obtain definitions of one or more of the scene objects and/or definitions of one or more of the scene characteristics, for example as an example, of metadata.

Figure 2:
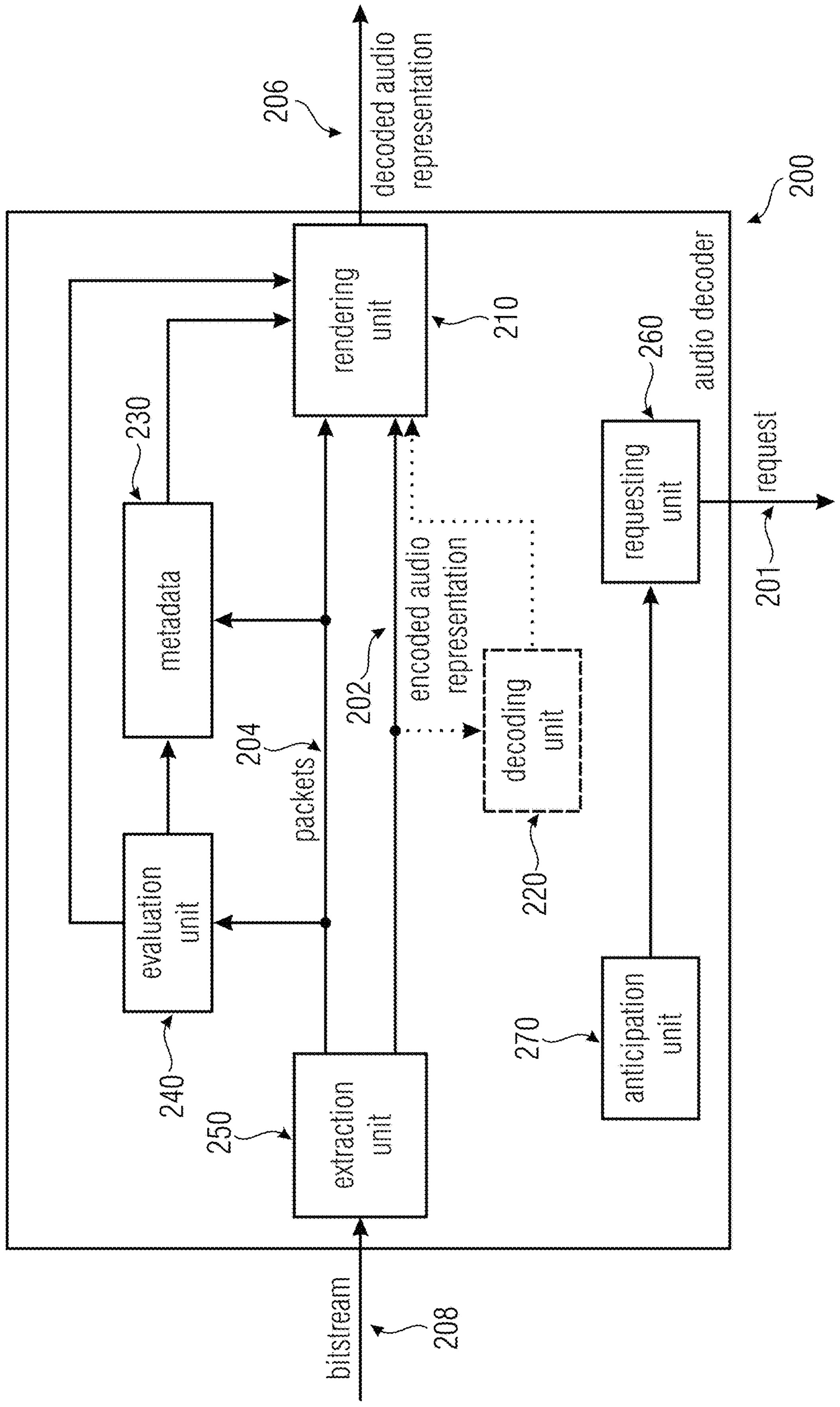
FIG. 2 shows a schematic view of an audio decoder with further additional, optional features, according to embodiments of the first aspect of the invention.

In the following reference is made to FIG. 2. FIG. 2 shows a schematic view of an audio decoder with further additional, optional features, according to embodiments of the first aspect of the invention. FIG. 2 shows audio decoder 200 which comprises a rendering unit 210, an optional decoding unit 220 and metadata 230 as explained in the context of FIG. 1, as well as corresponding decoded and encoded audio representations 202, 206 and packets 204.

As an optional feature, audio decoder 200 comprises an evaluation unit 240. Optionally, the one or more scene payload packets (e.g. included in packets 204) comprise an enumeration of payloads defining scene objects and/or scene characteristics. Furthermore, the audio decoder 100 is configured to evaluate, e.g. using evaluation unit 240, the enumeration of payloads defining scene objects and/or scene characteristics.

As another optional feature, a payload identifier is associated with the payloads within a scene payload packet, and the audio decoder, e.g. evaluation unit 240 thereof, may be configured to evaluate the payload identifier of a given payload in order to decide whether the given payload should be used for the rendering in rendering unit 210.

Hence, optionally, information about packets 204 may optionally be provided to rendering unit 210 exclusively via evaluation unit 240.

As another optional feature, the one or more of the scene update packets define a condition for a scene update, and the audio decoder, e.g. evaluation unit 240 thereof, is configured to evaluate whether the condition for the scene update defined in a scene update packet is fulfilled, to decide whether the scene update should be made. Therefore, as an example, metadata 230 may be adjusted and/or a rendering configuration of rendering unit 210 may be adjusted.

As another optional feature, one or more of the scene update packets define an interactive trigger condition and the audio decoder, e.g. evaluation unit 240 thereof, is configured to evaluate whether the interactive trigger condition is fulfilled, to decide whether the scene update should be made. Hence, as an example, metadata 230 may be updated and/or the rendering unit 210 may be instructed to adjust the rendering and/or rendering configuration. The trigger condition may, for example, be an event based condition, e.g. apart from or in addition to a location based and/or time based condition.

As another optional feature, the one or more scene configuration packets and the one or more scene update packets and the one or more scene payload packets, and hence as an example packets 204, are conformant to a MPEG-H MHAS packet definition.

As another optional feature, the one or more scene configuration packets and the one or more scene update packets and the one or more scene payload packets each comprise a packet type identifier, e.g. MHASPacketType, a packet label, e.g. MHASPacketLabel, a packet length information, e.g. MHASPacketLength, and a packet payload, e.g. MHASPacketPayload. As an example, the audio decoder 200 may optionally be configured, e.g. using evaluation unit 240, to evaluate the packet type identifier, in order to distinguish packets of different packet types. Hence, the decoder may distinguish the different packets for a further processing.

As another optional feature, audio decoder 200 comprises an extraction unit 250. As another optional feature, the audio decoder 200, e.g. extraction unit 250 thereof, is configured to extract the one or more scene configuration packets, the one or more scene update packets and the one or more scene payload packets from a bitstream 208 comprising a plurality of MPEG-H packets, including packets representing one or more audio channels to be rendered.

As an example, the encoded audio representation 202 may comprise or may be the information about the audio channels to be rendered. As explained before, the encoded audio representation 202 may be a packet as well. Optionally, extraction unit 250 may be configured, as shown, to extract the encoded audio representation 202 from bitstream 208, separated from packets 204.

Again, it is to be noted that a separation of the incoming signals in packets 204 and encoded audio representation 202 is an example. The encoded audio representation may be provided as part of the packets 204, e.g. as an MPEGH3DAFRAME, for example in the form of a packet, e.g. comprising an information about spectral audio coefficients. On the other hand, decoder 200 may, for example, receive only an encoded audio representation, comprising, in addition to the audio information or audio signal, the packets 204, as explained above comprising the configuration data, update data and metadata.

As another optional feature, the bitstream 208 may be a broadcast bitstream. Hence, decoder 200 may be configured to receive the one or more scene configurations packets via a broadcast stream. However, it is to be noted that packets 204 may be received by decoder 204 via different bitstreams. The bitstreams may comprise broadcast bitstreams as well as unicast bitstreams, e.g. for a transmission request to a dedicated server or encoder.

As another optional feature, decoder 200 comprises a requesting unit 260. Optionally, the audio decoder 200 is configured, e.g. using requesting unit 260, to request the one or more scene payload packets from a packet provider. Therefore, decoder 200 may provide a request 201. Accordingly, the scene payload packets may be received by the decoder via a separate bitstream (not shown), e.g. a unicast bitstream, via a channel which is used for the transmission of request 201.

For requesting the one or more scene payload packets, the decoder 200 may optionally use a payload ID, e.g. using an ID associated with a payload element, or a packet ID, e.g. using an ID associated with a scene payload packet. Hence, request 201 may comprise such IDs.

As another optional feature, decoder 200 comprises an anticipation unit 270. As an optional feature, the audio decoder 200 is configured to anticipate, e.g. to predict, e.g. using anticipation unit 270, which one or more data structures will be required, or are expected to be required and to request the one or more data structures, or one or more scene payload packets comprising said one or more data structures, before the data structures are actually required.

Hence, anticipation unit 270 may, for example, provide an information to the requesting unit 260, for defining the request 201.

As another optional feature, the audio decoder, e.g. requesting unit 260, is configured to provide an information, e.g. request 201, indicating which one or more scene payload packets are required, or will be required within a predetermined period of time to a packet provider, for example, an encoder according to embodiments.

As an optional feature, the one or more scene update packets (e.g. of packets 204) define an update of scene metadata, e.g. of metadata 230, for the rendering and comprise a representation of one or more update conditions. Furthermore, as an optional feature, the audio decoder 200, e.g. evaluation unit 240 thereof, is configured to evaluate whether the one or more update conditions are fulfilled and to selectively update one or more scene metadata, e.g. metadata 230, in dependence on a content of the one or more scene update packets, if the one or more update conditions are fulfilled.

In the following reference is made to FIG. 3. For the sake of brevity, and as explained before, it is to be noted that embodiments according to the invention comprise encoders with corresponding features according decoders and hence to a decoder as shown in FIG. 1.

Therefore, an encoder may only comprise the needed features, to provide the signals as received by decoder 100 in FIG. 1 and to process the same in order to provide a decoded audio representation 106, without any optional features. However, any of the optional features, functionalities and details as disclosed above in the context of FIGS. 1 and 2 may be present correspondingly (e.g. in a corresponding manner) in an encoder according to embodiments, individually or taken in combination. The same applies for features, functionalities and details of decoders and/or encoders of other aspects of the invention.

Figure 3:
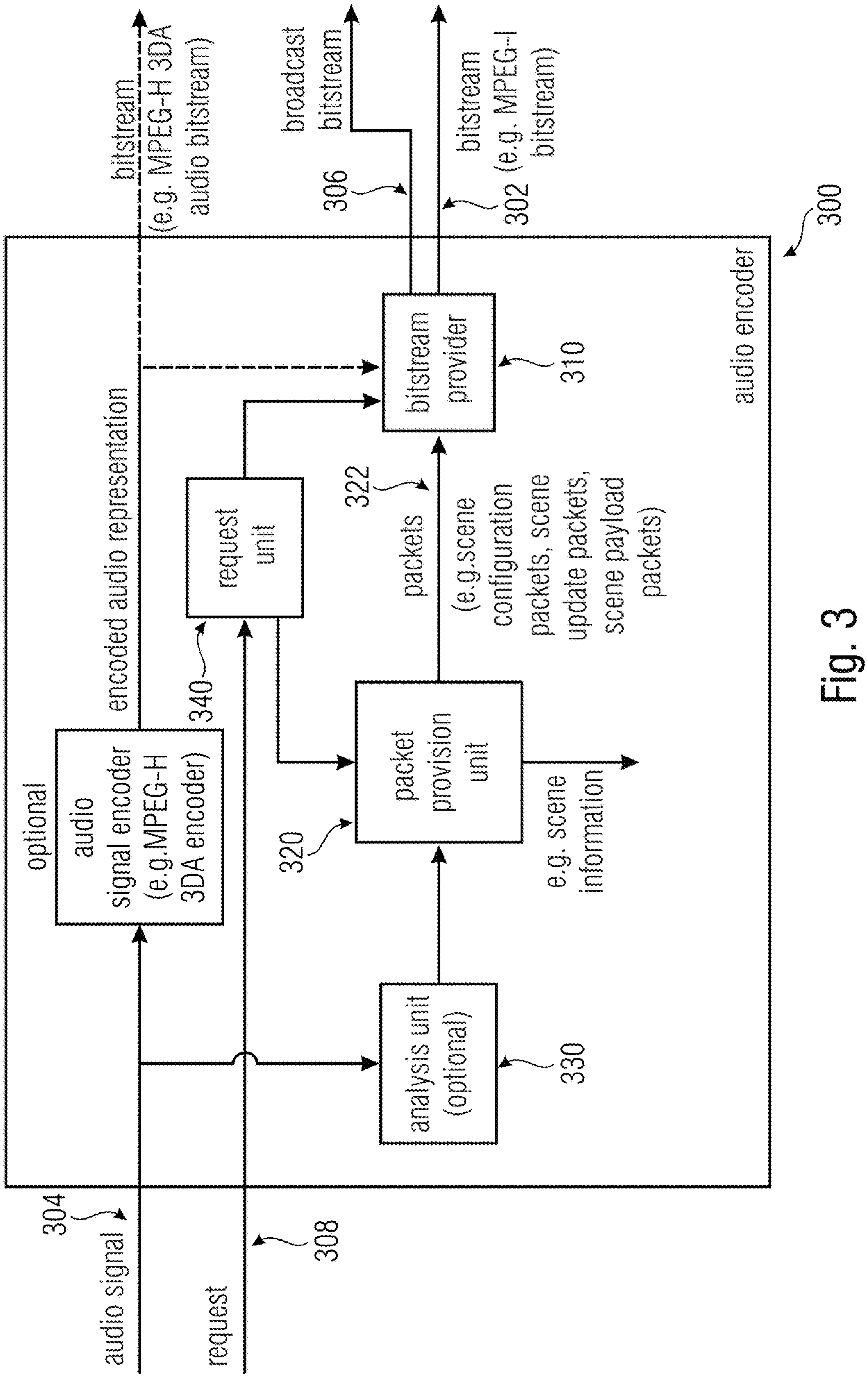
FIG. 3 shows a schematic view of an encoder according to embodiments of the first aspect of the invention.

FIG. 3 shows a schematic view of an encoder according to embodiments of the first aspect of the invention. Encoder 300 is configured to provide a bitstream 302 (e.g. similar or corresponding or identical to bitstream 208 as shown in FIG. 2), wherein the bitstream may, for example, comprise an encoded audio representation. In particular, the encoder 300 is configured to provide an information for a spatial rendering of one or more audio signals, which is included into the bitstream 302. Therefore, bitstream 302 comprises a plurality of packets 322 of different packet types.

For a provision of the bitstream, and hence the above information entities, encoder 300 comprises a bitstream provider 310 to which packets 322 are provided.

As shown, encoder 300 may optionally comprise a packet provision unit 320. The encoder 300 is configured to provide, e.g. using packet provision unit 320, the packets 322. Packets 322 comprise one or more scene configuration packets, providing a renderer configuration information defining a usage of scene objects and/or a usage of scene characteristics, one or more scene update packets, defining a update of scene metadata for the rendering, and one or more scene payload packets comprising definitions of one or more of the scene objects and/or definitions of one or more of the scene characteristics.

As an example, an audio signal 304 to be encoded may be provided to the encoder 300. The audio signal may comprise time domain samples and/or spectral values, for example of a speech and/or music signal. Optionally (not shown), if this signal is already encoded, this signal may be directly provided to the bitstream provider 310, in order to be included into a bitstream, for example, together with packets 322.

The packets 322 may be provided by the packet provision unit in different ways. For example, the packet provision unit 320 may provide the packets 322 on the basis of a scene information which defines an acoustic scene and which may be predefined or which may be obtained by the packet provision unit.

For example for virtual reality applications, based on a virtual model (e.g. of the acoustic scene), acoustically relevant virtual objects may be determined, in order to model or represent the acoustic scene (the acoustic scene for example comprising the virtual model with acoustically relevant virtual objects and the audio signal), using the packets. Optionally, the (optional) analysis unit 330 may support the determination of acoustically relevant virtual objects, or of characteristics thereof (such that, for example, characteristics of the audio signal may be used to supplement and/or refine the virtual model of the acoustic scene, e.g. by providing information about a position of a sound source).

Hence, an information for supporting the determination of respective packets 322 may be provided from the optional analysis unit 330 to the packet provision unit 320. For example, the packet provision unit 320 may manage the virtual model, or may be provided with an information about the virtual model.

As another example, in the context of augmented reality applications, the audio signal 304 to be encoded may be provided to the encoder 300 and may comprise time domain samples and/or spectral values, for example of a speech and/or music signal. However, optionally, audio signal 304 may additionally comprise (or carry) spatial information (e.g. in an implicit form) of a real audio scene that is to be augmented, e.g. position information of a measured audio source within the scene, e.g. of a user that is speaking. Such an information, and optionally in addition virtual overlay information (e.g. information for adding acoustically relevant virtual objects to a real scene, in order to augment the real scene), may be extracted and/or analyzed and/or applied by optional analysis unit 330, in order to model or represent the scene using the packets. Hence, as explained before, an information for determining respective packets 322 may be provided to the packet provision unit 320. As an example, the analysis unit 330 may determine, based on a spatial information in the audio signal 304, which acoustically relevant objects of the scene are to be considered or updated or rendered, in order to provide a desired hearing experience.

However, it is to be noted, that encoder 300 may optionally not comprise an analysis unit, such that, for example, an information about the packets 322 may be provided to the encoder 300 from an external unit, e.g. a unit managing the virtual or augmented scene.

To further explain the above example, an audio signal 304 to be encoded may be provided to the encoder 300, which may be an audio signal from a spatial audio scene and may optionally additionally comprise spatial information about the audio scene. Therefore, as an optional feature, encoder 300 comprises an analysis unit 330. The analysis unit 330 is configured to analyze the information provided from the audio scene in order to determine or approximate a representation of the audio scene. As an example, the audio scene may, for example, be modeled using metadata, e.g. describing scene objects and/or scene characteristics, which may be used together with spectral coefficients of an audio signal to provide an immersive representation of the audio scene for a listener.

It should be noted that the metadata may, for example, be based on a digital model of an audio scene (e.g. for a case of virtual reality application cases) and/or on an analysis of an actual scene in which the audio signal is recorded (e.g. for a case of augmented reality application cases).

Based thereon, as an example, corresponding scene configuration packets, scene update packets and scene payload packets may be determined and provided.

As an example, the packet provision unit 320 may hence additionally provide packets comprising said spectral information of the audio signal, e.g. in the form of packets representing one or more audio channels to be rendered (e.g. optionally packets such as MPEGH3DAFRAMEs), which may be part of packets 322.

Optionally, audio signal 304 may, for example, be provided directly to packet provision unit 320 and/or bitstream provider 310. As an example, if the audio signal 304 is already encoded may already comprise defined packets 322, such that these packets may, for example, only be extracted in packet provision unit 322 in order to be encoded, e.g. re-encoded, in bitstream provider 310. The audio signal information, e.g. apart from metadata information, may, for example, be provided in the form of packets or directly based on audio signal 304 to the bitstream provider 310.

Furthermore, it is to be noted that analysis unit 330 may as well optionally be configured to determine or approximate a virtual acoustic scene, with the audio signal 304, for example, only representing an acoustic signal itself (e.g. spectral coefficients thereof, e.g. as measured by a headset of a user of a VR room), wherein further spatial characteristics of the scene may be based on a virtual model of the surrounding in the virtual acoustic scene and, for example based on a position of a user in the virtual surrounding. For example, in a virtual conference room, reflection characteristics of virtual walls, and/or damping characteristics of a virtual carpet may be incorporated as metadata, for example describing scene objects, based on a virtual acoustic model of the wall or carpet, e.g. with respect to a position of a listener, and not based on a real measurement.

As another optional feature, the encoder 300, e.g. packet provision unit 320, is configured to provide the renderer configuration information, which is included in the scene configuration packets, such that the renderer configuration information defines a selection of definitions of one or more scene objects and/or of definitions of one or more scene characteristics (e.g. as defined by metadata, e.g. as shown in FIG. 2, metadata 230), which are in included in the scene payload packets, for the rendering.

As another optional feature, the encoder 300, e.g. packet provision unit 320, is configured to provide the one or more scene update packets, such that a content of the one or more scene update packets defines an update of one or more scene metadata.

As another optional feature, the encoder 300, e.g. packet provision unit 320, is configured to provide the scene configuration packet, such that the scene configuration packet determines a rendering configuration, and to provide the scene update packets, such that the scene update packets define an update of the rendering configuration. Hence, as an example, based on the scene configuration packet renderer parameters may be provided and based on the scene update packets updates of the renderer parameters, e.g. incremental updates.

Furthermore, as another optional feature, encoder 300, e.g. packet provision unit 320, is configured to provide the one or more scene configuration packets and the one or more scene update packets and the one or more scene payload packets, such that the one or more scene configuration packets and the one or more scene update packets and the one or more scene payload packets are conformant to a MPEG-H MHAS packet definition.

As another optional feature, the encoder 300, e.g. packet provision unit 320, is configured to provide the one or more scene configuration packets and the one or more scene update packets and the one or more scene payload packets, such that the one or more scene configuration packets and the one or more scene update packets and the one or more scene payload packets each comprise a packet type identifier, e.g. MHASPacketType, a packet label, e.g. MHASPacketLabel, a packet length information, e.g. MHASPacketLength, and a packet payload, e.g. MHASPacketPayload.

Accordingly, as an optional feature, bitstream 302 may, for example, comprise a plurality of MPEG-H packets including packets representing one or more audio channels to be rendered.

Hence, encoder 300, e.g. bitstream provider 310, may be configured to provide the one or more scene configuration packets and the one or more scene update packets and the one or more scene payload packets within the bitstream, for example interleaved with the MPEG-H packets.

Furthermore, encoder 300 (in general apparatus for encoding) may, optionally, provide the bitstream via a broadcast stream. However, it is to be noted that encoder 300, e.g. bitstream provider 310, may optionally be configured to provide some packets via a broadcast bitstream, e.g. via the optionally shown broadcast bitstream 306, and some packets via a non-broadcast bitstream, e.g. 302. For example, broadcast bitstream 306 may comprise scene configuration packets. On the other hand, bitstream 302 may, for example, address a specific user and may hence comprise specific payload packets. Accordingly, encoder 300 may provide a broadcast bitstream 306 and a plurality of individual bitstreams 302, e.g. via a plurality of server-client channels.

As another optional feature, encoder 300 comprises a request unit 340. Encoder 300 may receive a request 308 (e.g. corresponding to request 201 shown in FIG. 2), for example, from a decoder and may hence provide the one or more scene payload packets in response to the request 308. Therefore, request unit 340 may forward such a request to packet provision unit 320 and/or bitstream provider 310 to provide the packets and to encode the same to a bitstream.

The one or more scene payload packets may, for example, be identified using a payload ID and/or a packet ID. In other words, encoder 300 may be configured to provide the one or more scene payload packets in response to a request 308 from an audio decoder comprising a payload ID or in response to a request 308 from an audio decoder comprising a packet ID.

The request 308 comprises as an optional feature, e.g. in addition or as an alternative to the above, an information indicating, at least implicitly, which one or more scene payload packets are required, or will be required within a predetermined period of time. Hence, request unit 340 may optionally schedule a timely transmission of the requested packets.

As another optional feature, encoder 300 is configured, e.g. using packet provision unit 320, to provide the one or more scene update packets, such that the one or more scene update packets define an update of scene metadata for the rendering and comprise a representation of one or more update conditions.

As an example, analysis unit 330 may determine the scene metadata needed for representing or approximating the audio scene. Based on currently used metadata in a corresponding decoder, the analysis unit may provide an information to the packet provision unit 320 in order to define or determine the scene update packets to provide a metadata update information to the corresponding decoder. Furthermore, updates may be conditional, e.g. with regard to a time, a location in the audio scene and/or an event (e.g. a user in a VR-Room opening a window).

As another optional feature, encoder 300 is configured to repeat a provision of the scene configuration packet periodically, e.g. in broadcast bitstream 306, e.g. to allow an efficient tune in of new decoders.

As another optional feature, encoder 300 is configured, e.g. using packet provision unit 320, to provide the scene configuration packet, such that the scene configuration packet defines which scene payload packets are required at a given point in space and time. In other words and as an example, based on an analysis of the acoustic scene a configuration may be determined which defines at which point in time and/or space and/or with respect to which condition, which payloads, e.g. representing metadata defining acoustically relevant objects and/or characteristics, may be needed or are advantageous for defining or recreating the audio scene.

As another optional feature, encoder 300 is configured, e.g. using packet provision unit 320, to provide the scene configuration packet, such that the scene configuration packet defines where scene payload packets can be retrieved from. Hence, based on a scene configuration packet, e.g. from a broadcast channel, a decoder may individually request respective payload packets, e.g. via a unicast channel.

As explained before, and as an optional feature, the encoder 300 is configured, e.g. using packet provision unit 320, to provide the scene update packets, such that the scene update packets define a condition for a scene update. Optionally, the scene update packets may define an interactive trigger condition for a scene update.

Furthermore, as another optional feature, the encoder 300, e.g. using packet provision unit 320, is configured to adapt an ordering of definitions of one or more of the scene objects and/or of definitions of one or more of the scene characteristics in the scene payload packets in dependence on when and/or where the definitions of one or more of the scene objects and/or the definitions of one or more of the scene characteristics are needed by a renderer or decoder.

As another optional feature, apparatus 300, e.g. using packet provision unit 320, is configured to adapt an ordering of definitions of one or more of the scene objects and/or of definitions of one or more of the scene characteristics in the scene payload packets in dependence on an importance of the definitions of one or more of the scene objects and/or of the definitions of one or more of the scene characteristics for a renderer.

Optionally, the ordering of definitions of one or more of the scene objects and/or of definitions of one or more of the scene characteristics in the scene payload packets may be set in dependence on a packet size limitation.

As another optional feature, the apparatus is configured to provide payload packets comprising a comparatively low level of detail first and to provide payload packets comprising a comparatively higher level of detail later on. As an example, analysis unit 330 may "break down" the audio scene to be encoded, in different degrees of detail or granularity. In accord with that, first, a coarse information about the audio scene may be provided and later on a more precise information.

Furthermore, as an optional feature, the apparatus 300, e.g. using analysis unit 330, is configured to separate definitions of one or more of the scene objects and/or definitions of one or more of the scene characteristics into a plurality of scene payload packets and to provide the different scene payload packets at different times. In accord with the above, some scene objects or characteristics may have a greater impact on an audio scene and may hence be provided immediately for the rendering of an audio scene. Other objects or characteristics may, for example, only be needed for a refinement of the acoustic experience and may hence be transmitted if computational resources and/or bandwidth limitations allow it.

As another optional feature, the apparatus 300, e.g. using analysis unit 330, is configured to provide the scene configuration packets in order to decompose a scene into a plurality of spatial regions in which different rendering metadata is valid. Hence, a decoder addressing a specific user in a specific location of an audio scene may selectively request only valid metadata, which may increase efficiency.

Figure 4:
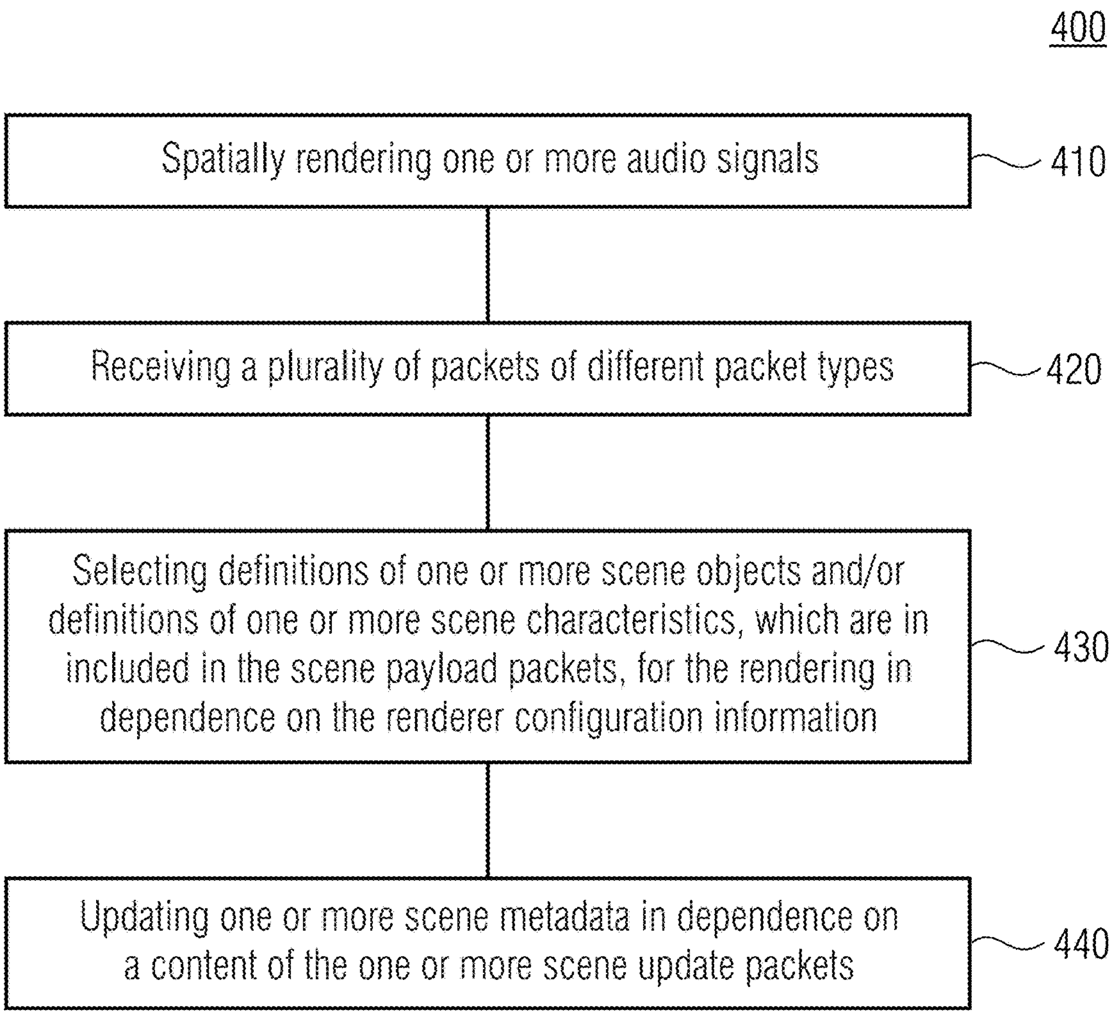
FIG. 4 shows a schematic block diagram of a method for providing a decoded audio representation on the basis of an encoded audio representation according to embodiments of the first aspect of the invention.

FIG. 4 shows a schematic block diagram of a method for providing a decoded audio representation on the basis of an encoded audio representation according to embodiments of the first aspect of the invention.

The method 400 comprises spatially rendering, 410, one or more audio signals and receiving, 420, a plurality of packets of different packet types, the packets comprising one or more scene configuration packets providing a renderer configuration information defining a usage of scene objects and/or a usage of scene characteristics, the packets comprising one or more scene update packets defining a update of scene metadata for the rendering, and the packets comprising one or more scene payload packets comprising definitions of one or more of the scene objects and/or definitions of one or more of the scene characteristics.

The method further comprises selecting, 430, definitions of one or more scene objects and/or definitions of one or more scene characteristics, which are in included in the scene payload packets, for the rendering in dependence on the renderer configuration information and updating, 440, one or more scene metadata in dependence on a content of the one or more scene update packets.

Figure 5:
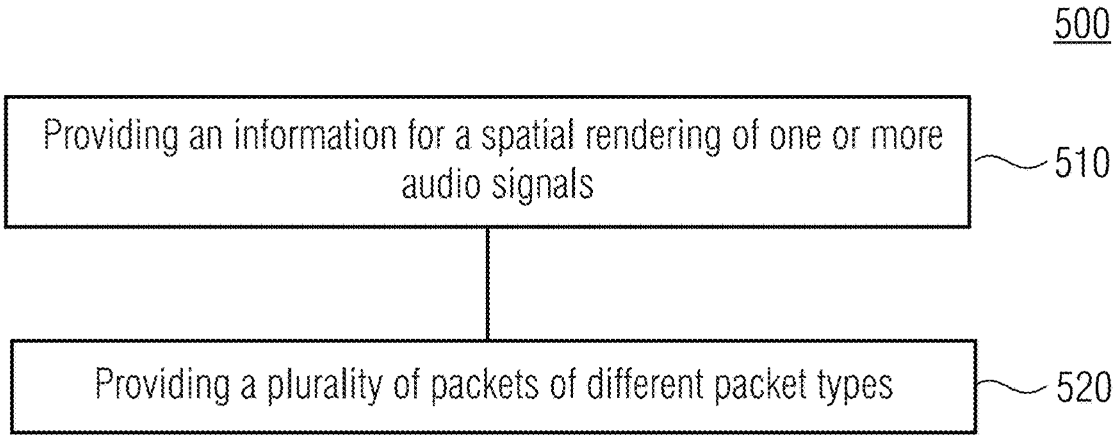
FIG. 5 shows a schematic block diagram of a method for providing an encoded audio representation, according to embodiments of the first aspect of the invention.

FIG. 5 shows a schematic block diagram of a method for providing an encoded audio representation, according to embodiments of the first aspect of the invention. The method 500 comprises providing, 510, an information for a spatial rendering of one or more audio signals and providing, 520, a plurality of packets of different packet types, the packets comprising one or more scene configuration packets, providing a renderer configuration information defining a usage of scene objects and/or a usage of scene characteristics, the packets comprising one or more scene update packets defining a update of scene metadata for the rendering, and the packets comprising one or more scene payload packets comprising definitions of one or more of the scene objects and/or definitions of one or more of the scene characteristics.

In the following, reference is made to FIGS. 2 to 3. Bitstream 208 of FIG. 2 and accordingly, bitstream 302 and/or 306 of FIG. 3 represent an audio content. Embodiments according to the invention comprise bitstreams, such as the above bitstreams. To sum up, such bitstreams comprise a plurality of packets of different packet types, the packets comprising one or more scene configuration packets providing a renderer configuration information defining a usage of scene objects and/or a usage of scene characteristics, the packets comprising one or more scene update packets, defining a update of scene metadata for the rendering and the packets comprising one or more scene payload packets comprising definitions of one or more of the scene objects and/or definitions of one or more of the scene characteristics.

Figure 6:
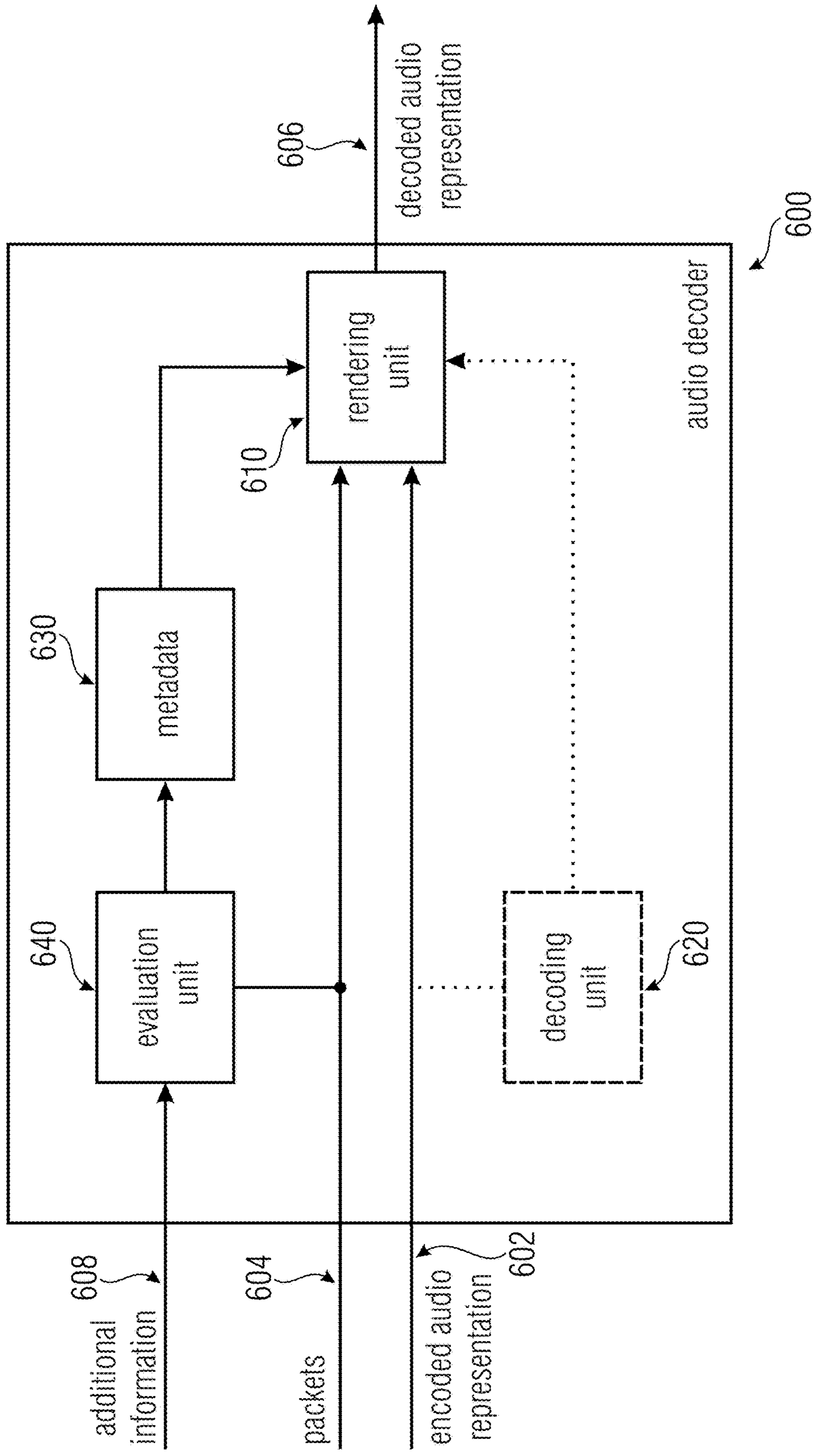
FIG. 6 shows a schematic view of an audio decoder according to embodiments of a second aspect of the invention.

FIG. 6 shows a schematic view of an audio decoder according to embodiments of the second aspect of the invention. FIG. 6 shows audio decoder 600 for providing a decoded audio representation 606 on the basis of an encoded audio representation 602. Decoder 600 comprises, as an optional feature a rendering unit 610 which is configured to spatially render one or more audio signals. Therefore, rendering unit 610 may optionally comprise a decoding unit, which may be configured to decode the encoded audio representation in order to obtain the one or more audio signals. However, as another option, as shown with dotted and dashed lines, audio decoder 600 may comprise a decoding unit 620, which may be provided with the encoded audio representation 602 and which may provide the one or more audio signals to the rendering unit 610.

Furthermore, the audio decoder 600 is configured to receive a plurality of packets 604 of different packet types, the packets 604 comprising one or more scene configuration packets, providing a renderer configuration information, the packets 604 comprising one or more scene update packets, defining an update of scene metadata for the rendering and comprising a representation of one or more update conditions.

Hence, based on the scene configuration packets, a renderer configuration of the rendering unit 610 may be set and/or adjusted. Based on the renderer configuration, the rendering unit 610 may determine which scene object and or scene characteristics are to be considered.

Such objects and/or characteristics may, for example, be defined using metadata 630. As explained before, based on the scene update packets, said metadata 630 may be updated for the rendering.

Moreover, the audio decoder 600 is configured to evaluate, using an optional evaluation unit 640, whether the one or more update conditions are fulfilled and to selectively update one or more scene metadata 130 in dependence on a content of the one or more scene update packets, if the one or more update conditions are fulfilled.

Hence, in other words and as an example, the decoder 600 may receive an encoded audio representation 602 which is decoded, e.g. using decoding unit 620, and rendered using rendering unit 610. The rendering is performed based on a renderer configuration, which is defined based on one or more scene configuration packets which are provided to the decoder 600 in addition to the audio representation 602.

Moreover, the packets 604 provided to the decoder 600 comprise an information about a scene update, which comprises an information about an update of metadata used by a rendering unit 610. However, in addition to the update data itself, update conditions are provided, such that the decoder may evaluate the conditions and may update the metadata used for the rendering when the defined criteria are met.

As shown in FIG. 6, the evaluation unit 640 may cause an update of the metadata 630, e.g. definitions of scene objects and/or scene characteristics themselves. Optionally, the evaluation unit 640 may cause an adaptation in the rendering unit to choose other metadata objects or to update the metadata via the rendering unit. However, such an additional functionality or signal path may be optional.

Again, it is to be noted that a separation of the incoming signals in packets 604 and encoded audio representation 602 is an example. The encoded audio representation may be provided as part of the packets 604, e.g. as MPEGH3DAFRAMEs, for example in the form of packets, e.g. comprising an information about spectral audio coefficients. On the other hand, decoder 600 may, for example, receive only an encoded audio representation, comprising, in addition to the audio information or audio signal, the packets 604, as explained above comprising the configuration data and update data. Hence, an optional decoding unit 620 may be configured to decode encoded packets alternatively or in addition.

Optionally, decoder 600, e.g. using evaluation unit 640, is configured to evaluate a temporal condition, which is included in a scene update packet, in order to decide whether one or more scene metadata 630 should be updated in dependence on a content of the one or more scene update packets.

As an example, the temporal condition may define a start time instant, or a time interval and the decoder 600, e.g. using evaluation unit 640, may be configured to effect an update of one or more scene metadata in response to a detection that a current playout time has reached the start time instant or lies after the start time instant, or to effect an update of one or more scene metadata 630 in response to a detection that a current playout time lies within the time interval.

As another optional feature, e.g. in addition or alternatively to the above, the decoder 600, e.g. using evaluation unit 640, may be configured to evaluate a spatial condition, which is included in a scene update packet, in order to decide whether one or more scene metadata should be updated in dependence on a content of the one or more scene update packets.

Optionally, the spatial condition defines a geometry element and the audio decoder 600, e.g. using evaluation unit 640, is configured to effect an update of one or more scene metadata 630 in response to a detection that a current position has reached the geometry element, or in response to a detection that a current position lies within the geometry element.

Therefore, as an optional feature, decoder 600 may be configured to receive an additional information 608 which may comprise an information about such a current position. The position may, for example, be a position of a listener for which the decoder is rendering the acoustic scene, within said scene. However, it is to be noted that decoder 600 may as well determine such an information based on the provided packets 604, e.g. using evaluation unit 640

Furthermore, the decoder 600, e.g. evaluation unit 640, may be configured to evaluate whether an interactive trigger condition is fulfilled, in order to decide whether one or more scene metadata should be updated in dependence on a content of the one or more scene update packets. As an example, a user opening a window in a virtual room, may change the acoustic characteristics of the room and hence based on the trigger "opening window" metadata, e.g. an element representing acoustic characteristics of a wall, may be changed to a wall with a hole (=the window). This event may be communicated to the decoder, as an example, via additional information 608. However, the decoder may optionally, comprise such an information, or derive such an information on its own.

As another optional feature, the audio decoder 600, e.g. the evaluation unit 640, is configured to evaluate a combination of two or more update conditions, and to selectively update one or more scene metadata 130 in dependence on a content of the one or more scene update packets if a combined update condition is fulfilled.

Accordingly, as an optional feature, the audio decoder 600, e.g. the evaluation unit 640, is be configured to evaluate both a temporal update condition and a spatial update condition, or to evaluate both a temporal update condition and an interactive update condition. According to embodiments any combination of spatial, temporal condition and/or event condition may be considered.

As another optional feature, the audio decoder, e.g. the evaluation unit 640, is configured to evaluate a delay information which is included in the scene update packet and to delay an update of the one or more scene metadata 130 in dependence on a content of the one or more scene update packets in accordance with the delay information in response to a detection that the one or more update conditions are fulfilled.

Furthermore, as an optional feature, the audio decoder 600, e.g. the evaluation unit 640, is configured to evaluate a flag within the scene update packet, indicating whether a temporal update condition is defined in the scene update packet, and/or to evaluate a flag within the scene update packet, indicating whether a spatial update condition is defined in the scene update packet.

Accordingly, the audio decoder 600, e.g. the evaluation unit 640, is configured to evaluate a flag within the scene update packet indicating whether a delay information is defined in the scene update packet.

As another optional feature, the scene update packet comprises a representation of a plurality of modifications of one or more parameters of one or more scene objects and/or of one or more scene characteristics and the audio decoder 600 is configured to apply the modifications, e.g. to metadata 630 defining such objects or characteristics, in response to a detection, e.g. using evaluation unit 640, that the one or more update conditions are fulfilled.

As another optional feature, the scene update packet comprises a trajectory information and the audio decoder 600, e.g. using evaluation unit 640, is configured to update a respective scene metadata 130, to which the trajectory information is associated, using a parameter variation following a trajectory defined by the trajectory information.

Hence, it is to be noted that evaluation unit 640 may be configured to perform any or all of the above explained updates, e.g. the metadata updates. Therefore, evaluation unit 640 may comprise an update unit which is not shown for simplicity. Optionally, decoder 600 may comprise a distinct update unit, which is configured to receive an evaluation result from the evaluation unit 640 and to perform a respective update.

As another optional feature, the audio decoder 600, e.g. evaluation unit 640, is configured to evaluate an information indicating whether a trajectory based update of scene metadata 630 is used, in order to activate or deactivate the trajectory based update of scene metadata.

As another optional feature, the audio decoder 600, e.g. evaluation unit 640, is configured to evaluate an interpolation type information included in the scene update packet in order to determine a type of interpolation between two or more support points of the trajectory Accordingly, as an optional feature, the audio decoder 600, e.g. evaluation unit 640, is configured to evaluate a supporting point information describing the trajectory.

It is to be noted that decoder 600 may comprise any or all of the features as explained in the context of the decoders as shown in FIGS. 1 and 2 both individually and taken in combination. For example, decoder 600 may optionally comprise an extraction unit, an anticipation unit and/or a requesting unit (and hence respective functionalities). Furthermore, decoder 600 may be configured to receive and process payload packages as described in the context of FIGS. 1 and 2, e.g. as part of packets 604. Vice versa, decoders 100 and 200 from FIGS. 1 and 2 may comprise any or all of the features as explained in the context of the decoder as shown in FIG. 6, for example, means to receive an additional information and to use the same in the evaluation unit.

In the following reference is made to FIG. 7. For the sake of brevity, and as explained before, it is to be noted that embodiments according to the invention comprise encoders with corresponding features according to decoders and hence to a decoder as shown in FIG. 6. Therefore, an encoder may only comprise the needed features, to provide the non-optional signals as received by decoder 600 in FIG. 6 and to process the same in order to provide a decoded audio representation 606, without any optional features. However, any of the optional features, functionalities and details as disclosed above may be present correspondingly in an encoder according to embodiments, individually or taken in combination. The same applies for features, functionalities and details of decoders and/or encoders of other aspects of the invention.

Figure 7:
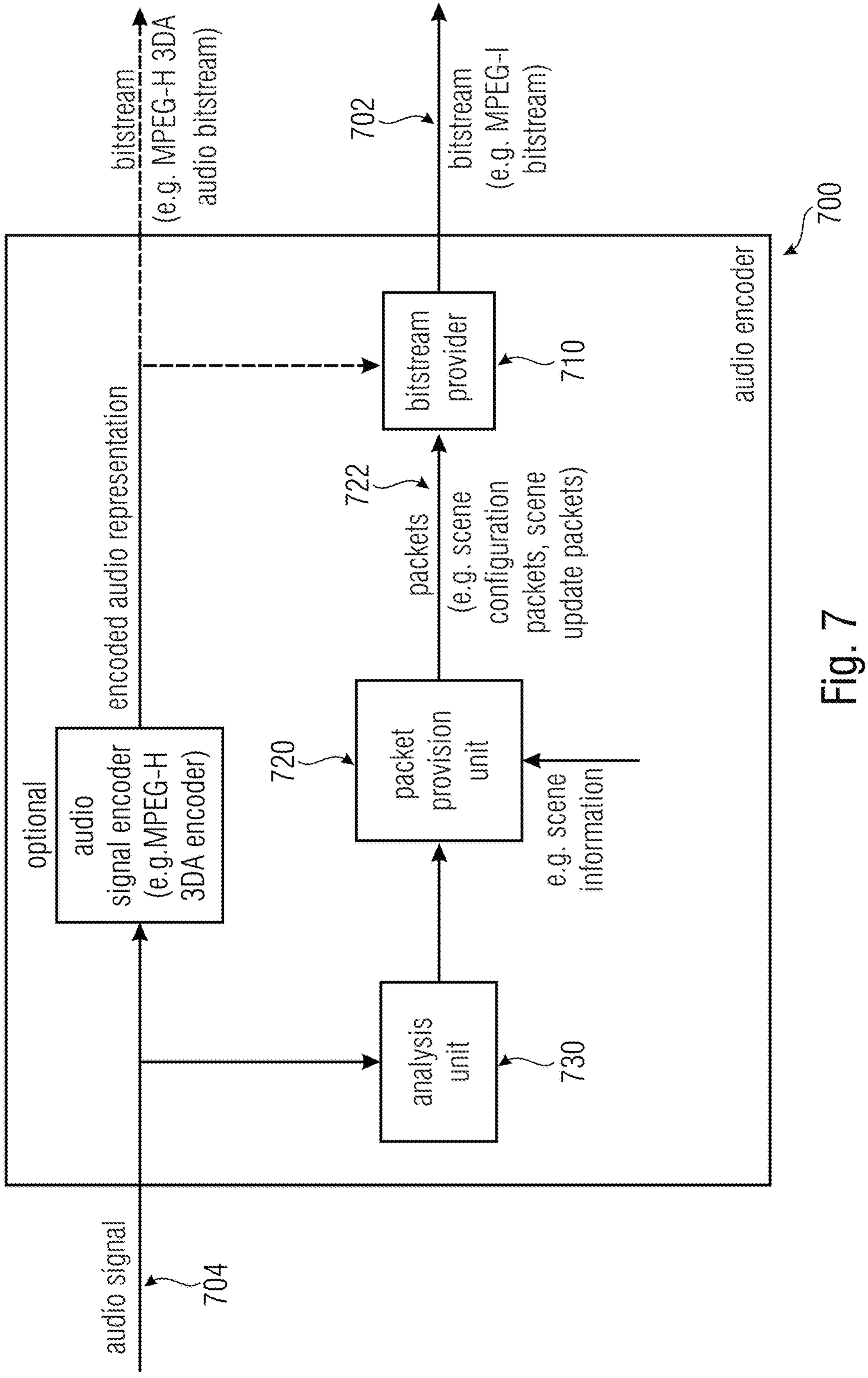
FIG. 7 shows a schematic view of an encoder according to embodiments of the second aspect of the invention.

FIG. 7 shows a schematic view of an encoder according to embodiments of the second aspect of the invention. Encoder 700 is configured to provide a bitstream 702, wherein the bitstream may, for example, comprise an encoded audio representation. In particular, the encoder 700 is configured to provide an information for a spatial rendering of one or more audio signals which is included into the bitstream 702. Therefore, bitstream 702 comprises a plurality of packets 722 of different packet types.

For a provision of the bitstream 702, and hence the above information entities, encoder 700 comprises an optional bitstream provider 710 to which the packets 722 are provided.

As shown, encoder 700 may optionally comprise a packet provision unit 720. The encoder 700 is configured, e.g. using packet provision unit 720, to provide the packets 722. Packets 722 comprise one or more scene configuration packets, providing a renderer configuration information, and one or more scene update packets, defining an update of scene metadata for the rendering and comprising a representation of one or more update conditions.

As an example, an audio signal 704 to be encoded may be provided to the encoder 700. The audio signal may comprise time domain samples and/or spectral values, for example of a speech and/or music signal. Optionally (not shown), if this signal is already encoded, this signal may be directly provided to the bitstream provider 710, in order to be included into a bitstream, for example, together with packets 722.

The packets 722 may be provided by the packet provision unit in different ways. For example, the packet provision unit 720 may provide the packets 722 on the basis of a scene information which defines an acoustic scene and which may be predefined or which may be obtained by the packet provision unit.

For example for virtual reality applications, based on a virtual model (e.g. of the acoustic scene), acoustically relevant virtual objects may be determined, in order to model or represent the acoustic scene (the acoustic scene for example comprising the virtual model with acoustically relevant virtual objects and the audio signal), using the packets. Optionally, the (optional) analysis unit 730 may support the determination of acoustically relevant virtual objects, or of characteristics thereof (such that, for example, characteristics of the audio signal may be used to supplement and/or refine the virtual model of the acoustic scene, e.g. by providing information about a position of a sound source).

Hence, an information for supporting the determination of respective packets 722 may be provided from the optional analysis unit 730 to the packet provision unit 720. For example, the packet provision unit 720 may manage the virtual model, or may be provided with an information about the virtual model.

As another example, in the context of augmented reality applications, the audio signal 704 to be encoded may be provided to the encoder 700 and may comprise time domain samples and/or spectral values, for example of a speech and/or music signal. However, optionally, audio signal 704 may additionally comprise (or carry) spatial information (e.g. in an implicit form) of a real audio scene that is to be augmented, e.g. position information of a measured audio source within the scene, e.g. of a user that is speaking. Such an information, and optionally in addition virtual overlay information (e.g. information for adding acoustically relevant virtual objects to a real scene, in order to augment the real scene), may be extracted and/or analyzed and/or applied by optional analysis unit 730, in order to model or represent the scene using the packets. Hence, as explained before, an information for determining respective packets 722 may be provided to the packet provision unit 720. As an example, the analysis unit 730 may determine, based on a spatial information in the audio signal 704, which acoustically relevant objects of the scene are to be considered or updated or rendered, in order to provide a desired hearing experience.

However, it is to be noted, that encoder 700 may optionally not comprise an analysis unit, such that, for example, an information about the packets 722 may be provided to the encoder 700 from an external unit, e.g. a unit managing the virtual or augmented scene.

To further explain the above example, an audio signal 704 to be encoded may be provided to the encoder 700, which may be an audio signal from a spatial audio scene and may optionally additionally comprise spatial information about the audio scene. Therefore, optionally, encoder 700 may comprise an analysis unit 730. The analysis unit 730 may be configured to analyze the information provided from the audio scene, in order to determine or approximate a representation of the audio scene. As an example, the audio scene may be represented using metadata, e.g. describing scene objects and/or scene characteristics, which may be used together with spectral coefficients to provide an immersive representation of the audio scene for a listener.

Based thereon, as an example, corresponding scene configuration packets and scene update packets comprising update conditions, may be determined and provided using packet provision unit 720, in order to provide a renderer configuration information for a rendering of the audio scene and metadata updates, to indicate an evolution of the audio scene, or for example, a change of a perception of the audio scene for a listener in the audio scene, e.g. with regard to space, time and/or further conditions.

It should be noted that the metadata may, for example, be based on a digital model of an audio scene (e.g. for a case of virtual reality application cases) and/or on an analysis of an actual scene in which the audio signal is recorded (e.g. for a case of augmented reality application cases).

As an example, the packet provision unit 720 may additionally provide packets comprising said spectral information of the audio signal, e.g. in the form of packets representing one or more audio channels to be rendered (e.g. optionally packets such as MPEGH3DAFRAMEs), which be part of packets 722.

Optionally, audio signal 704 may, for example, be provided directly to packet provision unit 720 and/or to bitstream provider 710. As an example, audio signal 704 may already comprise defined packets 722, such that these packets may only be extracted in packet provision unit 722 in order to be encoded in bitstream provider 710. The audio signal information, e.g. apart from metadata information, may, for example, be provided in the form of packets or directly based on audio signal 304 to the bitstream provider 710.

Furthermore, it is to be noted that analysis unit 730 may as well determine or approximate a virtual acoustic scene, with the audio signal 704, for example, only representing an acoustic signal itself, wherein further spatial characteristics of the scene may be based on a virtual model of the surrounding in the virtual acoustic scene, for example, using an information about a position of a user in the virtual surrounding. For example, in a virtual conference room, reflection characteristics of virtual walls, or damping characteristics of a virtual carpet may be incorporated as metadata based on a virtual acoustic model of the wall or carpet, e.g. with respect to a position of a listener, and not based on a real measurement.

As an optional feature, encoder 700, e.g. packet provision unit 720, is configured to provide a scene update packet, such that the scene update packet comprises a representation of a temporal condition for updating one or more scene metadata, in dependence on a content of the scene update packet. For example, based on a result of the analysis unit 730, encoder 700 may determine or deduce that an audio scene to be encoded may change according to a temporal evolution and may hence communicate such an information, e.g. modelling, via transmission of respective update data and a temporal condition.

As another optional feature, the temporal condition defines a start time instant or a time interval.

Accordingly, as another optional feature, analysis unit 730 is, as an example, configured to determine that an audio scene to be encoded comprises a spatial dependency and may hence communicate such an information via transmission of respective update data and a spatial condition. Hence, the apparatus 700 is optionally configured to provide a scene update packet, such that the scene update packet comprises a representation of a spatial condition for updating one or more scene metadata in dependence on a content of the scene update packet.

As another optional feature, the spatial condition defines a geometry element. The analysis unit may hence model the audio scene efficiently using such geometry elements.

As another optional feature, the encoder 700, e.g. packet provision unit 720, is configured to provide a scene update packet, such that the scene update packet comprises a representation of an interactive trigger condition for updating one or more scene metadata in dependence on a content of the scene update packet.

Optionally, the apparatus 700, e.g. packet provision unit 720, is configured to provide a scene update packet, such that the scene update packet comprises a representation of a combination of two or more update conditions.

As another optional feature, the apparatus 700, e.g. packet provision unit 720, is configured to provide a scene update packet, such that the scene update packet comprises a delay information defining to delay an update of one or more scene metadata in dependence on a content of the one or more scene update packets in response to a detection that the one or more update conditions are fulfilled.

Optionally, the apparatus 700, e.g. packet provision unit 720, is configured to provide a scene update packet, such that the scene update packet comprises a flag indicating whether a temporal update condition is defined in the scene update packet, and/or a representation of a flag indicating whether a spatial update condition is defined in the scene update packet.

As another optional feature, the apparatus 700, e.g. packet provision unit 720, is configured to provide a scene update packet, such that the scene update packet comprises a flag indicating whether a delay information is defined in the scene update packet.

As another optional feature, the apparatus 700, e.g. packet provision unit 720, is configured to provide a scene update packet, such that the scene update packet comprises a representation of a plurality of modifications of one or more parameters of one or more scene objects and/or of one or more scene characteristics.

Optionally, the apparatus 700, e.g. packet provision unit 720, is configured to provide a scene update packet, such that the scene update packet comprises a trajectory information, the trajectory information describing to update a respective scene metadata, to which the trajectory information is associated, using a parameter variation following a trajectory defined by the trajectory information.

As an example, analysis unit 730, may be configured to determine that a change of an acoustically relevant object or characteristic of an audio scene to be encoded can be modeled or approximated using a metadata update according to a trajectory information and may hence be configured to reduce a signaling effort for such an update information by providing the same in the form of the trajectory information.

As another optional feature, the apparatus 700, e.g. packet provision unit 720, is configured to provide a scene update packet, such that the trajectory information comprises an information indicating whether a trajectory based update of scene metadata is used, in order to activate or deactivate the trajectory based update of scene metadata.

As another optional feature, the apparatus 700, e.g. packet provision unit 720, is configured to provide a scene update packet, such that the trajectory information comprises an interpolation type information included in the scene update packet.

As another optional feature, the apparatus 700, e.g. packet provision unit 720, is configured to provide a scene update packet, such that the trajectory information comprises a supporting point information describing the trajectory.

Figure 8:
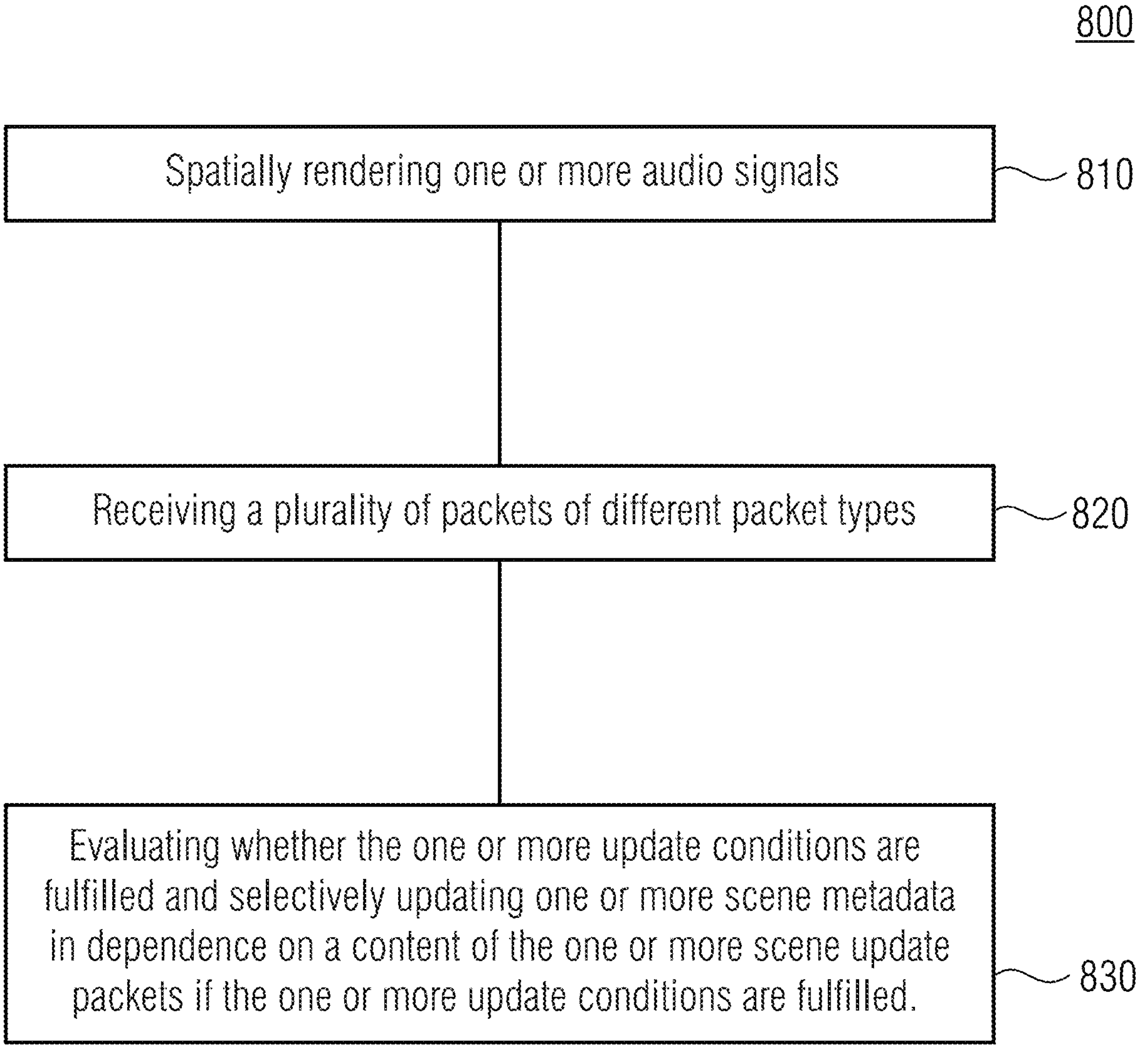
FIG. 8 shows a schematic block diagram of a method for providing a decoded audio representation on the basis of an encoded audio representation according to embodiments of the second aspect of the invention.

FIG. 8 shows a schematic block diagram of a method for providing a decoded audio representation on the basis of an encoded audio representation according to embodiments of the second aspect of the invention. Method 800 comprises spatially rendering, 810, one or more audio signals and receiving, 820, a plurality of packets of different packet types, the packets comprising one or more scene configuration packets, providing a renderer configuration information, the packets comprising one or more scene update packets, defining an update of scene metadata for the rendering and comprising a representation of one or more update conditions.

Furthermore, the method 800 comprises evaluating 830 whether the one or more update conditions are fulfilled and selectively updating one or more scene metadata in dependence on a content of the one or more scene update packets if the one or more update conditions are fulfilled.

Figure 9:
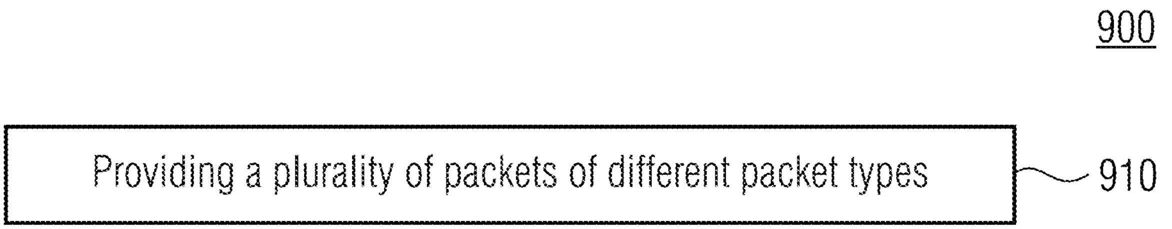
FIG. 9 shows a schematic block diagram of a method for providing an encoded audio representation, according to embodiments of the second aspect of the invention.

FIG. 9 shows a schematic block diagram of a method for providing an encoded audio representation, according to embodiments of the second aspect of the invention. The method 900 comprises providing 910 a plurality of packets of different packet types, the packets comprising one or more scene configuration packets, providing a renderer configuration information and the packets comprising one or more scene update packets defining an update of scene metadata for the rendering and comprising a representation of one or more update conditions.

In the following, reference is made to FIG. 7. Bitstream 702 of FIG. 7 represents an audio content. Embodiments according to the invention comprise bitstreams such as the above bitstream. To sum up, such a bitstream comprises a plurality of packets of different packet types, the packets comprising one or more scene configuration packets, providing a renderer configuration information and the packets comprising one or more scene update packets, defining an update of scene metadata for the rendering and comprising a representation of one or more update conditions.

Figure 10:
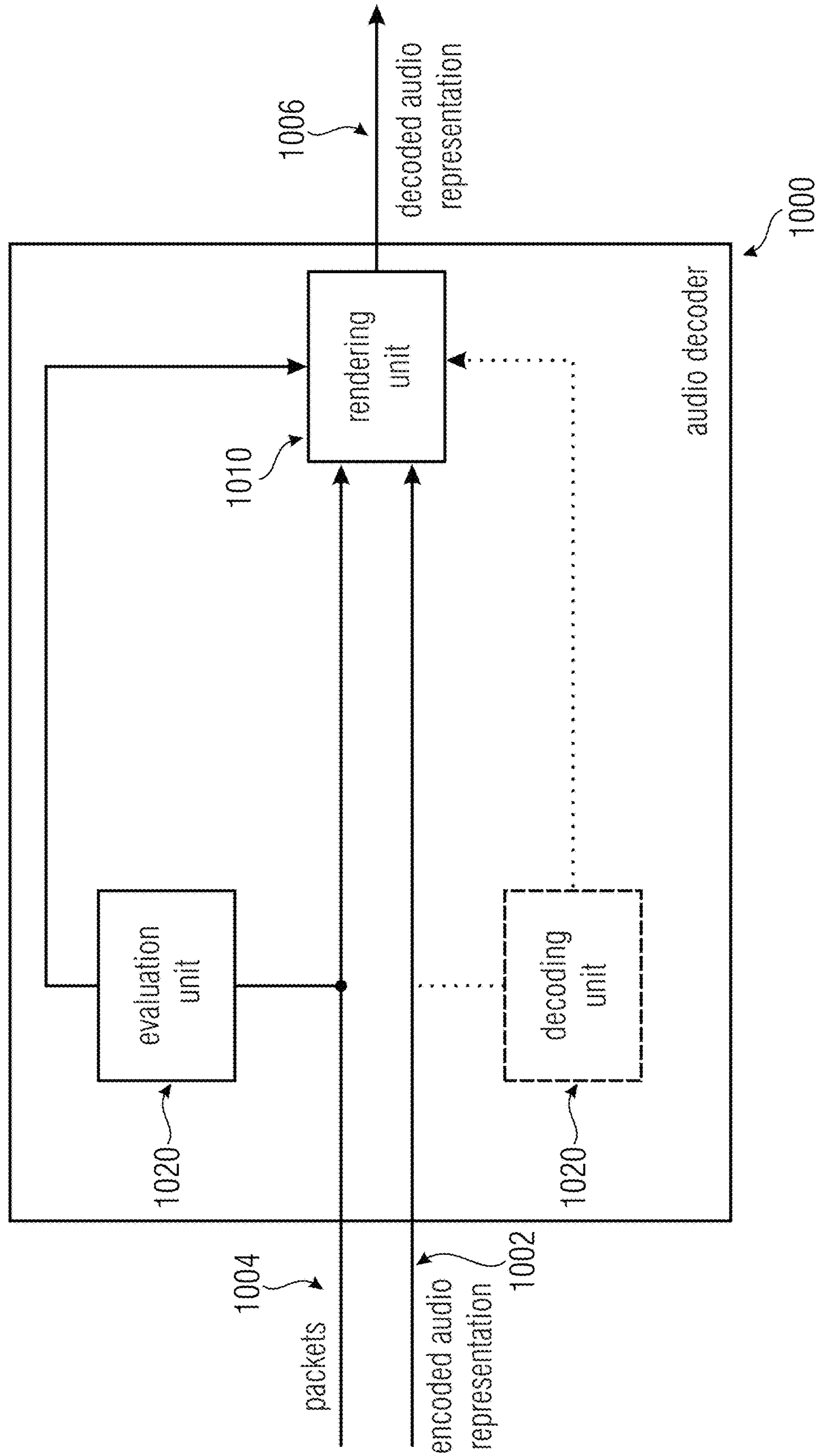
FIG. 10 shows a schematic view of an audio decoder according to embodiments of a third aspect of the invention.

FIG. 10 shows a schematic view of an audio decoder according to embodiments of the third aspect of the invention. FIG. 10 shows audio decoder 1000 for providing a decoded audio representation 1006 on the basis of an encoded audio representation 602. Decoder 1000 comprises a rendering unit 1010, which is configured to spatially render one or more audio signals. Therefore, rendering unit 1010 may optionally comprise a decoding unit, which may be configured to decode the encoded audio representation in order to obtain the one or more audio signals. However, as another option, as shown with dotted and dashed lines, audio decoder 1000 may comprise a decoding unit 1020, which may be provided with the encoded audio representation 1002 and which may provide the one or more audio signals to the rendering unit 1010.

Furthermore, the audio decoder 1000 is configured to receive a plurality of packets 1004 of different packet types, the packets 1004 comprising a plurality of scene configuration packets providing a renderer configuration information defining a temporal evolution of a rendering scenario and comprising a timestamp information.

Furthermore, the audio decoder 1000 is configured, using evaluation unit 1020, to evaluate the timestamp information and to set a rendering configuration of the rendering unit 1010 to a rendering scenario corresponding to the time stamp using the renderer configuration information.

Again, it is to be noted that a separation of the incoming signals in packets 1004 and encoded audio representation 1002 is an example. The encoded audio representation may be provided as part of the packets 1004, e.g. as an MPEGH3DAFRAME, for example in the form of a packet, e.g. comprising an information about spectral audio coefficients. On the other hand, decoder 1000 may, for example, receive only an encoded audio representation, comprising, in addition to the audio information or audio signal, the packets 1004, as explained above comprising the configuration data, update data and metadata. Hence an optional decoding unit 1020 may be configured to decode encoded packets alternatively or in addition.

As an optional feature, the audio decoder 1000, e.g. evaluation unit 1020, is configured to evaluate the timestamp information, when the audio decoder has missed one or more preceding scene configuration packets of a stream, or when the audio decoder tunes in into a stream. Furthermore, the audio decoder 1000 is configured to set a playout time, e.g. in the rendering unit 1010, in dependence on the timestamp information included in the scene configuration packet.

As another optional feature, the audio decoder 1000, e.g. rendering unit 1010, is configured to execute a temporal development of a rendering scene up to a playout time defined by the timestamp information when the audio decoder has missed one or more preceding scene configuration packets of a stream, or when the audio decoder tunes in into a stream.

As another optional feature, the audio decoder 1000 is configured to obtain a time scale information which is included in a packet and to evaluate, e.g. using evaluation unit 1020, the time stamp information using the time scale information.

As another optional feature, the audio decoder 1000, e.g. evaluation unit 1020, is configured to determine, in dependence on the timestamp information, which scene objects should be used for the rendering. Based on such a determination, a renderer configuration of rendering unit 1010 may be adapted accordingly.

Optionally, the rendering unit 1010 may receive or select scene objects or scene characteristics for the rendering from a set of metadata elements, e.g. as shown in FIGS. 1, 2 and/or 6.

As another optional feature, the audio decoder 1000, e.g. using evaluation unit 1020, is configured to evaluate a scene configuration packet, which defines an evolution of a rendering scene starting from a point of time which lies before a time defined by the timestamp information. Furthermore, the audio decoder 1000, e.g. evaluation unit 1020 thereof, is configured to derive a scene configuration associated with a point in time defined by the timestamp information on the basis of the information in the scene configuration packet. Accordingly, such scene configuration may, for example, be provided to rendering unit 1010.

As another optional feature, the audio decoder 1000, e.g. using evaluation unit 1020, is configured to derive the scene configuration associated with a point in time defined by the timestamp information using one or more scene update packets.

Accordingly, packets 1004 may optionally comprise the one or more scene update packets.

As another optional feature, the scene configuration packets are conformant to a MPEG-H MHAS packet definition.

As another optional feature, the scene configuration packets each comprise a packet type identifier, a packet label, a packet length information and a packet payload.

As another optional feature, the audio decoder 1000 is configured to extract the one or more scene configuration packets, from a bitstream comprising a plurality of MPEG-H packets, including packets representing one or more audio channels to be rendered. Therefore, decoder 1000 may optionally comprise an extraction unit, e.g. as shown in FIG. 2.

As an optional feature, audio decoder 1000 is configured to receive the one or more scene configurations packets via a broadcast stream.

As another optional feature, the audio decoder 1000 is configured to tune into the broadcast stream and to determine a playout time on the basis of the timestamp of a first scene configuration packet identified by the audio decoder after the tune-in.

In the following reference is made to FIG. 11. For the sake of brevity, and as explained before, it is to be noted that embodiments according to the invention comprise encoders with corresponding features according to the decoder as shown in FIG. 10. Hence, an encoder may only comprise the needed features, to provide the non-optional signals as received by decoder 1000 in FIG. 10 and to process the same in order to provide a decoded audio representation 1006, without any optional features. However any of the optional features, functionalities and details as disclosed above may be present correspondingly in an encoder according to embodiments, individually or taken in combination. The same applies for features, functionalities and details of decoders and/or encoders of other aspects of the invention.

Figure 11:
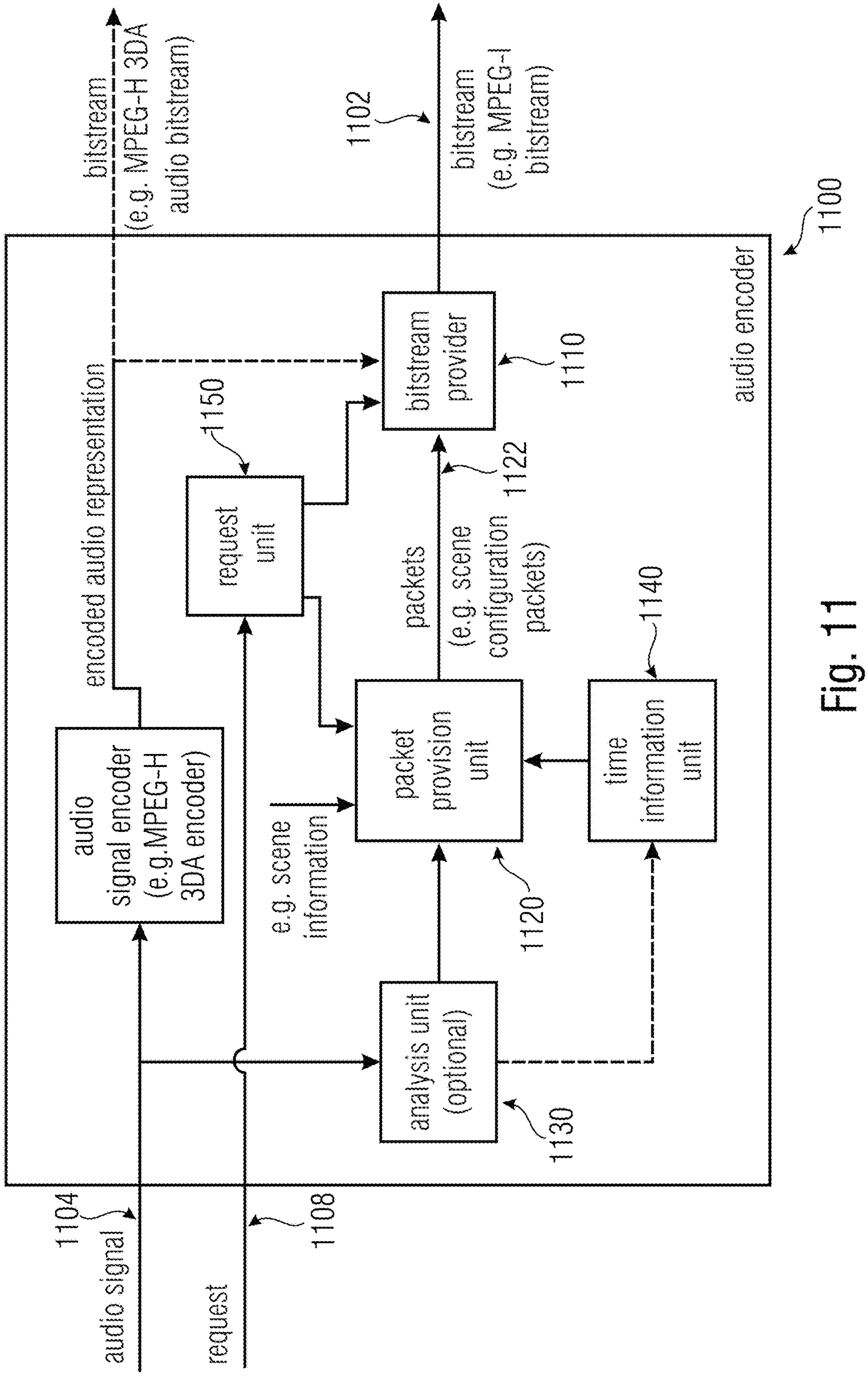
FIG. 11 shows a schematic view of an encoder according to embodiments of the third aspect of the invention.

FIG. 11 shows a schematic view of an encoder according to embodiments of the third aspect of the invention. Encoder 1100 is configured to provide a bitstream 1102, wherein the bitstream may, for example, comprise an encoded audio representation. In particular, the encoder 1100 is configured to provide an information for a spatial rendering of one or more audio signals, which is included in the bitstream. Therefore, bitstream 1102 comprises a plurality of packets 1122 of different packet types.

For a provision of the bitstream 1102, and hence the above information entities, encoder 1100 comprises an bitstream provider 1110 to which the packets 1122 are provided.

As shown, encoder 1100 may comprise a packet provision unit 1120. The encoder 1100 is configured, e.g. using packet provision unit 1120, to provide the packets 1122. Packets 1122 comprise a plurality of scene configuration packets providing a renderer configuration information defining a temporal evolution of a rendering scenario and comprising a timestamp information.

Therefore, as shown in FIG. 11, said timestamp information may be provided to the packet provision unit 1120 by an optional time information unit 1140.

As an example, an audio signal 1104 to be encoded may be provided to the encoder 1100. The audio signal may comprise time domain samples and/or spectral values, for example of a speech and/or music signal. Optionally (not shown), if this signal is already encoded, this signal may be directly provided to the bitstream provider 1110, in order to be included into a bitstream, for example, together with packets 1122.

The packets 1122 may be provided by the packet provision unit in different ways. For example, the packet provision unit 1120 may provide the packets 322 on the basis of a scene information which defines an acoustic scene and which may be predefined or which may be obtained by the packet provision unit.

For example for virtual reality applications, based on a virtual model (e.g. of the acoustic scene), acoustically relevant virtual objects may be determined, in order to model or represent the acoustic scene (the acoustic scene for example comprising the virtual model with acoustically relevant virtual objects and the audio signal), using the packets. Optionally, the (optional) analysis unit 1130 may support the determination of acoustically relevant virtual objects, or of characteristics thereof (such that, for example, characteristics of the audio signal may be used to supplement and/or refine the virtual model of the acoustic scene, e.g. by providing information about a position of a sound source).

Hence, an information for supporting the determination of respective packets 1122 may be provided from the optional analysis unit 1130 to the packet provision unit 1120. For example, the packet provision unit 1120 may manage the virtual model, or may be provided with an information about the virtual model.

As another example, in the context of augmented reality applications, the audio signal 1104 to be encoded may be provided to the encoder 1100 and may comprise time domain samples and/or spectral values, for example of a speech and/or music signal. However, optionally, audio signal 1104 may additionally comprise (or carry) spatial information (e.g. in an implicit form) of a real audio scene that is to be augmented, e.g. position information of a measured audio source within the scene, e.g. of a user that is speaking. Such an information, and optionally in addition virtual overlay information (e.g. information for adding acoustically relevant virtual objects to a real scene, in order to augment the real scene), may be extracted and/or analyzed and/or applied by optional analysis unit 1130, in order to model or represent the scene using the packets. Hence, as explained before, an information for determining respective packets 1122 may be provided to the packet provision unit 1120. As an example, the analysis unit 1130 may determine, based on a spatial information in the audio signal 1104, which acoustically relevant objects of the scene are to be considered or updated or rendered, in order to provide a desired hearing experience.

However, it is to be noted, that encoder 1100 may optionally not comprise an analysis unit, such that, for example, an information about the packets 1122 may be provided to the encoder 1100 from an external unit, e.g. a unit managing the virtual or augmented scene.

To further explain the above example, the audio signal 1104 may be an audio signal from a spatial audio scene and may optionally additionally comprise spatial information about the audio scene. Therefore, optionally, encoder 1100 may comprise an analysis unit 1130. The analysis unit 1130 may, for example, be configured to analyze the information provided from the audio scene in order to determine or approximate a representation of the audio scene. As an example, the audio scene may be represented using metadata, e.g. describing scene objects and/or scene characteristics, which may be used together with spectral coefficients of an audio signal to provide an immersive representation of the audio scene for a listener.

It should be noted that the metadata may, for example, be based on a digital model of an audio scene (e.g. for a case of virtual reality application cases) and/or on an analysis of an actual scene in which the audio signal is recorded (e.g. for a case of augmented reality application cases).

Based thereon, as an example, corresponding scene configuration packets, scene update packets and scene payload packets may be determined and provided.

As an example, the packet provision unit 1120 may hence additionally provide packets comprising said spectral information of the audio signal, e.g. in the form of packets representing one or more audio channels to be rendered, which may hence optionally be included in packets 1122.

Optionally, audio signal 1104 may be provided directly to packet provision unit 1120 and/or bitstream provider 1110. As an example, audio signal 1104 may already comprise defined packets 1122, such that these packets may only be extracted in packet provision unit 1122, in order to be encoded in bitstream provider 1110. The audio signal information, e.g. apart from metadata information, may be provided in the form of packets or directly based on audio signal 1104 to the bitstream provider 1110.

Furthermore, it is to be noted that analysis unit 1130 may as well determine or approximate a virtual acoustic scene, with the audio signal 1104, for example, only representing an acoustic signal itself, wherein further spatial characteristics of the scene may be based on a virtual model of the surrounding in the virtual acoustic scene and, for example based on a position of a user in the virtual surrounding. For example, in a virtual conference room, reflection characteristics of virtual walls, or damping characteristics of a virtual carpet may be incorporated as metadata based on a virtual acoustic model of the wall or carpet, e.g. with respect to a position of a listener, and not based on a real measurement.

Optionally, the timestamp information may be derived via an analysis of the audio signal 1104, e.g. as indicated by the dashed line, or may, for example, be defined or set, e.g. independently. Optionally, the timestamp information may be provided as another input signal of the encoder 1100.

Optionally, the apparatus 1100 is configured to provide, e.g. using time information unit 1140, in one of the packets a time scale information wherein the time stamp information is provided in a representation related to the time scale information.

As another optional feature, the apparatus 1100, e.g. packet provision unit 1120, is configured to provide the scene configuration packets, such that the scene configuration packets are conformant to a MPEG-H MHAS packet definition.

As another optional feature, the apparatus 1100, e.g. packet provision unit 1120, is configured to provide the scene configuration packets, such that the scene configuration packets each comprise a packet type identifier, a packet label, a packet length information and a packet payload.

As another optional feature, the apparatus 1100, e.g. bitstream provider 1120, is configured to provide a bitstream 1102 comprising a plurality of MPEG-H packets including packets representing one or more audio channels to be rendered and the one or more scene configuration packets.

Accordingly, packets 1122 may comprise said MPEG-H packets, which may, for example, be provided by packet provision unit 1120.

As another optional feature, the apparatus 1100, e.g. bitstream provider 1110, is configured to provide a bitstream 1102 comprising a plurality of MPEG-H packets including packets representing one or more audio channels to be rendered and the one or more scene configuration packets in an interleaved manner.

As another optional feature, the apparatus 1100 is configured to periodically repeat the scene configuration packet.

As another optional feature, the apparatus 1100 is configured to periodically repeat the scene configuration packet, with one or more scene payload packets and one or more packets representing one or more audio channels to be rendered in between two subsequent scene configuration packets.

Hence, packet provision unit 1120 may optionally be configured to provide scene payload packets, for an encoding thereof using the bitstream provider 1110.

As another optional feature, the apparatus 1100 is configured to periodically repeat the scene configuration packet, with one or more packets representing one or more audio channels to be rendered in between two subsequent scene configuration packets. Furthermore, the apparatus 1100 is configured to provide one or more scene payload packets at request.

Therefore, apparatus 1100 comprises, as an optional feature, a request unit 1150, which is configured to receive such a request 1108. Request unit 1150 may hence provide an information about the request to the packet provision unit 1120 in order to provide the one or more scene payload packets, and optionally to bitstream provider 1110 in order to encode the same in bitstream 1102.

As another optional feature, the apparatus is configured to provide a plurality of otherwise identical scene configuration packets differing in the timestamp information.

As another optional feature, the apparatus 1100, e.g. time information unit 1140, is configured to adapt the timestamp information to a playout time. Optionally, encoder 1100 may receive the information about the playout time as an input signal, or may deduce or determine a playout time based on the audio signal, e.g. using analysis unit 1130.

As another optional feature, the apparatus 1100 is configured to adapt the timestamp information to a playout time of rendering scene information included in packets which are provided by the apparatus in a temporal environment of a respective scene configuration packet in which the respective timestamp information is included.

Figure 12:
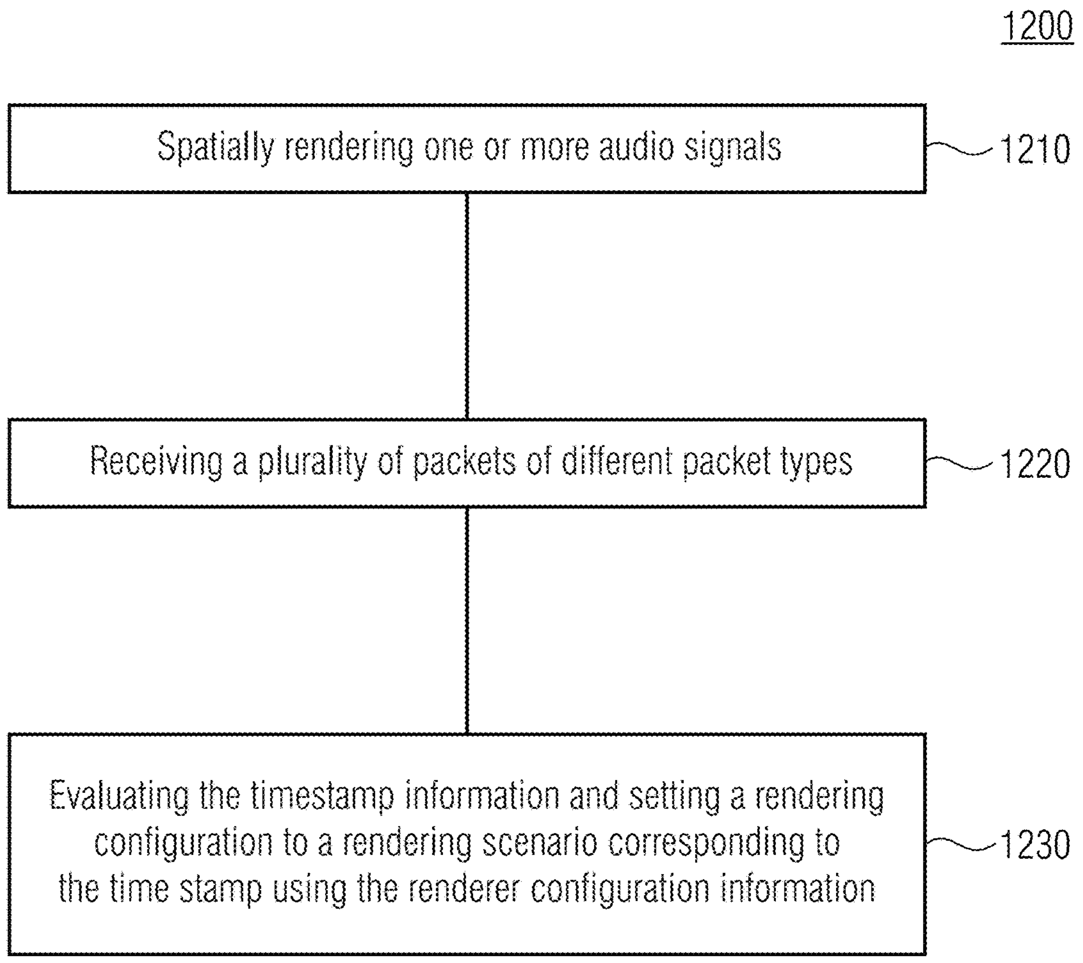
FIG. 12 shows a schematic block diagram of a method for providing a decoded audio representation on the basis of an encoded audio representation according to embodiments of the third aspect of the invention.

FIG. 12 shows a schematic block diagram of a method for providing a decoded audio representation on the basis of an encoded audio representation according to embodiments of the third aspect of the invention. Method 1200 comprises spatially rendering, 1210, one or more audio signals and receiving, 1220, a plurality of packets of different packet types, the packets comprising a plurality of scene configuration packets providing a renderer configuration information defining a temporal evolution of a rendering scenario and comprising a timestamp information. The method further comprises evaluating, 1230, the timestamp information and setting a rendering configuration to a rendering scenario corresponding to the time stamp using the renderer configuration information.

Figure 13:
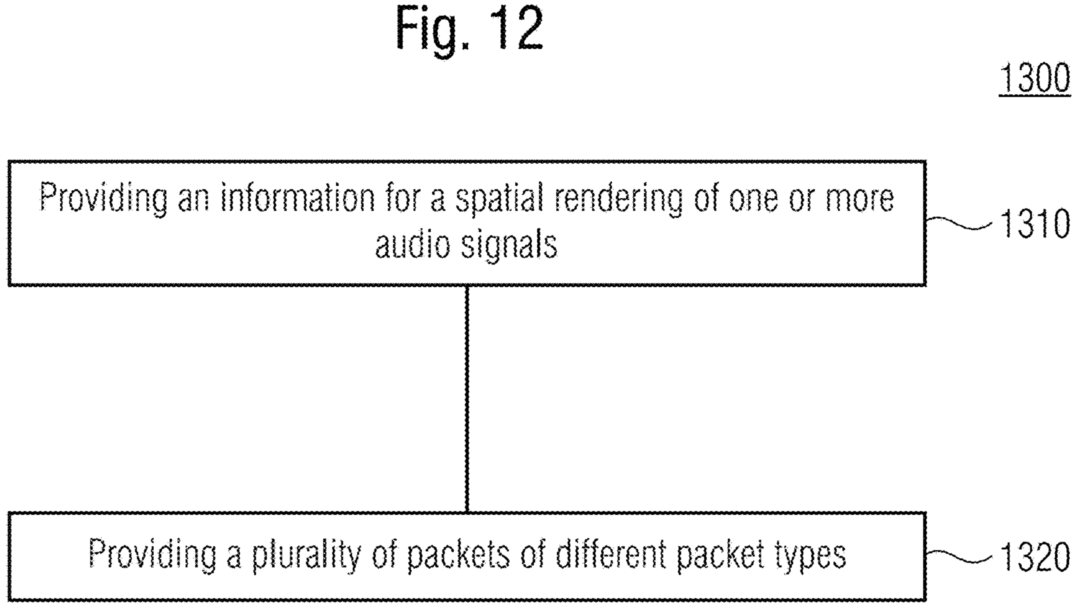
FIG. 13 shows a schematic block diagram of a method for providing an encoded audio representation, according to embodiments of the third aspect of the invention.

FIG. 13 shows a schematic block diagram of a method for providing an encoded audio representation, according to embodiments of the third aspect of the invention. The method 1300 comprises providing, 1310, an information for a spatial rendering of one or more audio signals and providing 1320 a plurality of packets of different packet types, the packets comprising a plurality of scene configuration packets providing a renderer configuration information defining a temporal evolution of a rendering scenario and comprising a timestamp information.

In the following, reference is made to FIG. 11. Bitstream 1102 of FIG. 11 represents an audio content. Embodiments according to the invention comprise bitstreams such as the above bitstream. To sum up, such a bitstream comprises a plurality of packets of different packet types, the packets comprising a plurality of scene configuration packets providing a renderer configuration information defining a temporal evolution of a rendering scenario and comprising a timestamp information.

Figure 14:
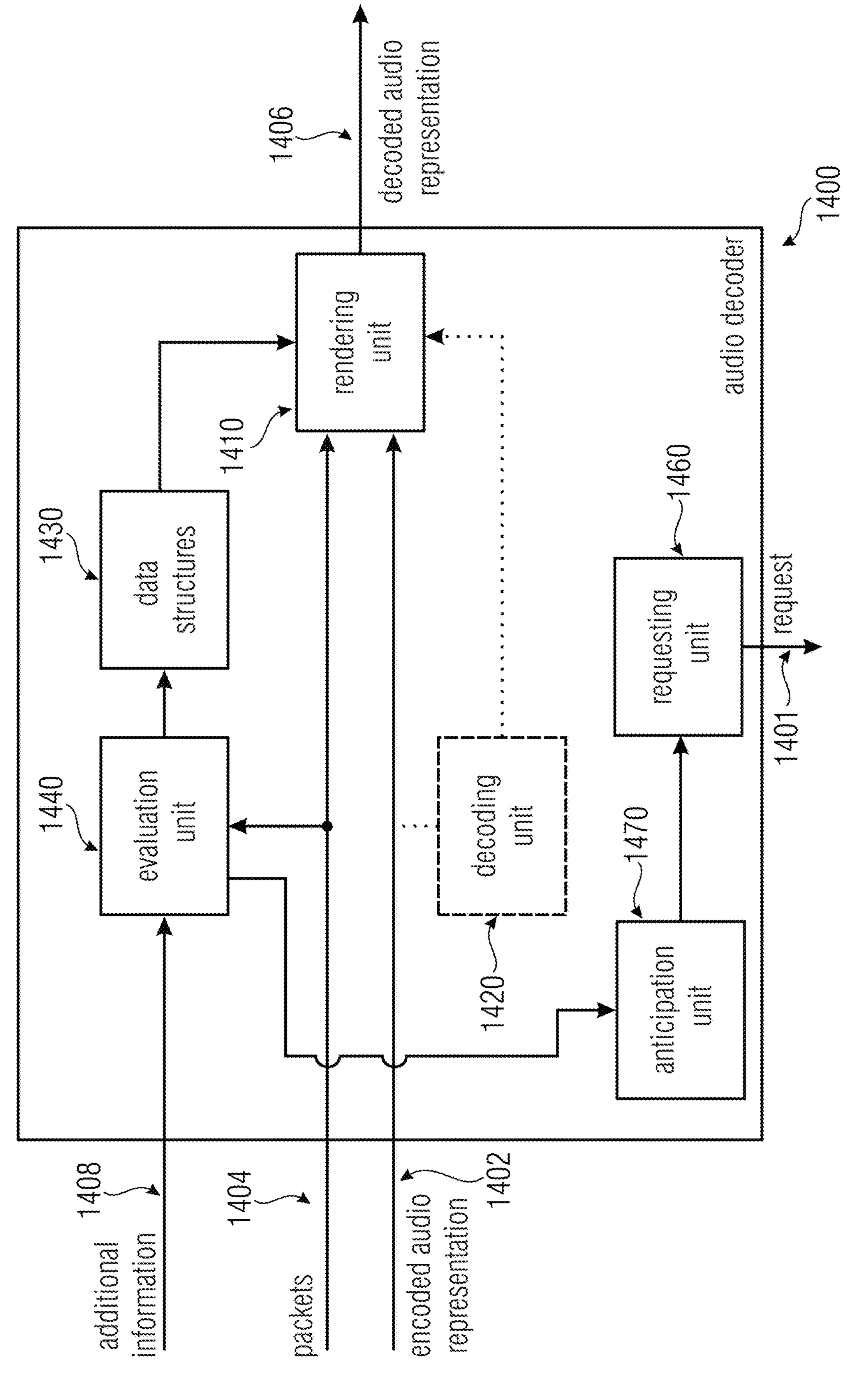
FIG. 14 shows a schematic view of an audio decoder according to embodiments of a fourth aspect of the invention.

FIG. 14 shows a schematic view of an audio decoder according to embodiments of a fourth aspect of the invention. FIG. 14 shows audio decoder 1400 for providing a decoded audio representation 1406 on the basis of an encoded audio representation 1402. Decoder 1400 comprises, as an optional feature, a rendering unit 1410 which is configured to spatially render one or more audio signals. Therefore, rendering unit 1410 may optionally comprise a decoding unit, which may be configured to decode the encoded audio representation in order to obtain the one or more audio signals. However, as another option, as shown with dotted and dashed lines, audio decoder 1400 may comprise a decoding unit 1420, which may be provided with the encoded audio representation 1402 and which may provide the one or more audio signals to the rendering unit 1410.

Furthermore, the audio decoder 1400 is configured to receive packets 1404, the packets 1404 comprising a scene configuration packet providing a renderer configuration information, wherein the scene configuration packet comprises a subscene cell information defining one or more cells, wherein the cell information defines an association between the one or more cells and respective one or more data structures 1430 associated with the one or more cells and defining a rendering scenario.

Hence, based on the scene configuration packets, a renderer configuration of the rendering unit 1410 may be set and/or adjusted. Furthermore, the audio decoder 1400, e.g. using the shown optional evaluation unit 1440, is configured to evaluate the cell information in order to determine which data structures 1430 should be used for the spatial rendering in rendering unit 1410.

Hence, in other words and as an example, the decoder 600 may receive an encoded audio representation 1402 which is decoded, e.g. using decoding unit 1420, and rendered using rendering unit 1410. The rendering is performed based on a renderer configuration, which is defined based on the scene configuration packet which is provided to the decoder 1400 in addition to the audio representation 4102.

Moreover, using evaluation unit 1440 a cell information may be extracted from the configuration information, such that based on the cell information, for example, defining a portion of the audio scene or rendering scene or rendering scenario in space and/or time, data structures, relevant for the rendering of the audio signal, may be selected for and/or provided to the rendering unit 1410.

Hence, optionally, the evaluation unit 1440 may cause an adaptation in the rendering unit to choose other data structures, e.g. via a direct signal path to the rendering unit 1410.

Again, it is to be noted that a separation of the incoming signals in packets 1404 and encoded audio representation 1402 is an example. The encoded audio representation may be provided as part of the packets 1404, e.g. as an MPEGH3DAFRAME, for example in the form of a packet, e.g. comprising an information about spectral audio coefficients and/or audio channels to be rendered. On the other hand, decoder 1400 may, for example, receive only an encoded audio representation, comprising, in addition to the audio information or audio signal, the packets 1404, as explained above, comprising configuration data and optionally in addition update data and metadata, wherein the metadata may be an example of data structures, for example, defining acoustically relevant objects and/or characteristics of an audio scene that is to be rendered. Furthermore, accordingly, an optional decoding unit 1420 may be configured to decode encoded packets alternatively or in addition.

As an optional feature, the cell information comprises a temporal definition of a given cell and the audio decoder 1400, e.g. using evaluation unit 1400, is configured to evaluate the temporal definition of the given cell, in order to determine whether the one or more data structures associated with the given cell should be considered (e.g. used) in the spatial rendering, e.g. in rendering unit 1410.

As another optional feature, the cell information comprises a spatial definition of a given cell and the audio decoder 1400, e.g. using evaluation unit 1440, is configured to evaluate the spatial definition of the given cell, in order to determine whether the one or more data structures associated with the given cell should be considered (e.g. used) in the spatial rendering, e.g. in rendering unit 1410.

As another optional feature, the audio decoder 1400, e.g. using evaluation unit 1400, is configured to evaluate a number-of-cells information which is included in the scene configuration packet, in order to determine a number of cells.

As another optional feature, the cell information comprises a flag indicating whether the cell information comprises a temporal definition of the cell or a spatial definition of the cell and the audio decoder 1400 is configured to evaluate, e.g. using evaluation unit 1400, the flag indicating whether cell information comprises a temporal definition of the cell or a spatial definition of the cell.

As another optional feature, the cell information comprises a reference of a geometric structure in order to define the cell and the audio decoder, e.g. using evaluation unit 1440, is configured to evaluate the reference of the geometric structure, in order to obtain the geometric definition of the cell.

As another optional feature, the audio decoder 1400 is configured to obtain, e.g. using evaluation unit 1440, a definition of the geometric structure, which defines a geometric boundary of the cell, from a global payload packet. Hence, packets 1404 may comprise such a global payload packet, which may be provided via a broadcast bitstream.

As another optional feature, the audio decoder 1400 is configured to identify, e.g. using evaluation unit 1440, one or more current cells and the audio decoder 1400 is configured to perform the spatial rendering, e.g. using rendering unit 1410, using one or more data structures, e.g. from a plurality of data structures, e.g. 1430, associated with the one or more identified current cells.

As another optional feature, the audio decoder 1400 is configured to identify, e.g. using evaluation unit 1440, one or more current cells and the audio decoder 1400 is configured to perform the spatial rendering, e.g. using rendering unit 1410, using one or more scene objects and/or scene characteristics associated with the one or more identified current cells. As an example, a set of data objects may be associated with the current cell or cells, the data structures for example comprising metadata defining acoustically relevant objects and or characteristics of the scene to be rendered.

As another optional feature, the audio decoder 1400 is configured to select, e.g. using evaluation unit 1440, scene objects and/or scene characteristics to be considered in the spatial rendering in dependence on the cell information.

As another optional feature, the audio decoder 1400 is configured to determine, e.g. using evaluation unit 1440, in which one or more spatial cells a current position lies and the audio decoder is configured to perform the spatial rendering, e.g. using rendering unit 1410, using one or more scene objects and/or scene characteristics associated with the one or more identified current cells.

As optionally shown, decoder 1400 may be configured to receive an additional information 1408. The additional information may comprise an information about a current position. Optionally, the decoder 1400 may alternatively be configured to deduce or to determine an information about a current position, e.g. of a listener or user for which the rendering scenario, e.g. acoustic scene is rendered, internally, e.g. without receiving a dedicated input therefore.

As another optional feature, the audio decoder 1400 is configured to determine one or more payloads, e.g. payloads describing scene objects and/or scene characteristics, associated with one or more current cells on the basis of an enumeration of payload identifiers included in a cell definition of a cell; and the audio decoder 1400 is configured to perform the spatial rendering, e.g. using rendering unit 1410, using the determined one or more payloads.

Optionally, the payloads may be provided as payload packets, such that packets 1404 may optionally comprise the same. As an example, payloads of payload packets may be associated with or may define metadata, an information of which may be represented by the data structures 1430.

As another optional feature, the audio decoder is configured to perform the spatial rendering, e.g. using rendering unit 1410, using information from one or more scene update packets which are associated with one or more current cells. Hence, packets 1404 may additionally comprise scene update packets.

As another optional feature, the audio decoder 1400 is configured to update a rendering scene, e.g. audio scenario to be rendered, using information from one or more scene update packets associated with a given cell in response to a finding that the given cell becomes active. As an example, a cell may become active when its associated metadata information and/or associated data structures are acoustically significantly relevant, which may be the case if a spatial location of a listener is at or within the cell.

As another optional feature, the cell information comprises a reference of a and/or to a scene update packet defining an update of scene metadata, e.g. describing or comprising or being data structures 1430, for the rendering and the audio decoder 1400 is configured to selectively perform the update of the scene metadata defined in a given scene update packet in response to a detection that a cell comprising a link to the given scene update packet becomes active.

In other words and as an example, evaluation unit 1440 may determine that a cell is active, e.g. because a user is spatially located in the rendered audio scene within geometric bounds of the cell, and may hence perform an update of scene metadata associated with the active cell based on an update packet that is references by the cell information corresponding to the active cell.

As another optional feature, the one or more scene update packets comprise a representation of one or more update conditions, and the audio decoder, e.g. using evaluation unit 1440, is configured to evaluate whether the one or more update conditions are fulfilled and to selectively update one or more scene metadata, e.g. data structures 1430, in dependence on a content of the one or more scene update packets if the one or more update conditions are fulfilled.

As another optional feature, the audio decoder 1400 is configured to evaluate, e.g. using evaluation unit 1440, a temporal condition, which is included in a scene update packet, in order to decide whether one or more scene metadata, e.g. data structures 1430, should be updated in dependence on a content of the one or more scene update packets, which may, for example, be included in packets 1404.

The temporal condition optionally defines a start time instant, or the temporal condition alternatively and optionally defines a time interval.

The audio decoder 1400 is, for example, configured to effect an update of one or more scene metadata, e.g. data structures 1430, in response to a detection that a current playout time has reached the start time instant or lies after the start time instant.

Alternatively, the audio decoder 1400 is optionally configured to effect an update of one or more scene metadata, e.g. data structures 1430, in response to a detection that a current playout time lies within the time interval.

Alternatively or in addition, the audio decoder is optionally configured to evaluate, e.g. using evaluation unit 1440, a spatial condition, which is included in a scene update packet, in order to decide whether one or more scene metadata should be updated in dependence on a content of the one or more scene update packets.

As another optional feature, the spatial condition in the scene update packet, e.g. included in packets 1404, defines a geometry element and the audio decoder 1400 is configured to effect an update of one or more scene metadata, e.g. represented, at least partially using data structures 1430, in response to a detection that a current position has reached the geometry element, or in response to a detection that a current position lies within the geometry element As another optional feature, the audio decoder 1400 is configured to evaluate, e.g. using evaluation unit 1440, whether an interactive trigger condition is fulfilled, in order to decide whether one or more scene metadata, e.g. describing data structures 1430, should be updated in dependence on a content of the one or more scene update packets, e.g. included in packets 1404.

As another optional feature, the audio decoder 1400 is configured to evaluate, e.g. using evaluation unit 1440, the cell information, in order to determine at which time and/or in which area of a listener position which data structures are required.

As another optional feature, the audio decoder 1400 is configured to spatially render, e.g. using rendering unit 1410, one or more audio signals using a first set of scene objects and/or scene characteristics, when a listener position lies within a first spatial region, and the audio decoder is configured to spatially render the one or more audio signals using a second set of scene objects and/or scene characteristics when a listener position lies within a second spatial region.

The first set of scene objects and/or scene characteristics optionally provides for a more detailed spatial rendering when compared to the second set of scene objects and/or scene characteristics.

The data structures 1430 may comprise or describe or represent an information about scene objects and/or scene characteristics and may comprise or describe or represent such an information with different levels of details regarding their acoustic influence on a scene. For example, based on a spatial distance of a listener position from certain scene objects and/or scene characteristics, a different level of detail thereof may be considered for the rendering.

As another optional feature, the audio decoder 1400 is configured to request the one or more scene payload packets from a packet provider. Therefore, encoder 1400 comprises, as an optional feature, requesting unit 1460 for providing a request 1401.

As another optional feature, the audio decoder 1400 is configured to identify, e.g. using evaluation unit 1440, one or more data structures to be used for the spatial rendering using a payload identifier which is included in the cell information.

As another optional feature, the audio decoder 1400 is configured to request, e.g. using requesting unit 1460, one or more scene payload packets from a packet provider, e.g. an encoder according to embodiments.

As another optional feature, the audio decoder 1400 is configured to request, e.g. using requesting unit 1460, one or more scene payload packets from a packet provider using a payload ID, which is included in the cell information or the audio decoder is configured to request, e.g. using requesting unit 1460, the one or more scene payload packets from a packet provider using a packet ID. Optionally, a respective payload ID and/or packet ID may be determined by the evaluation unit 1440 and provided to the requesting unit 1460.

As another optional feature, the audio decoder 1400 is configured to anticipate, e.g. using the optionally shown anticipation unit 1470, which one or more data structures will be required, or are expected to be required using the cell information, e.g. using an evaluation result of the cell information of the evaluation unit 1440, and to request the one or more data structures, or one or more scene payload packets comprising said one or more data structures, before the data structures are actually required, for example by transmitting a request 1401 using requesting unit 1460.

As another optional feature, the audio decoder 1400 is configured to extract payloads identified by the cell information from a bitstream. Therefore, decoder 1400 may optionally comprise an extraction unit, e.g. as shown in FIG. 2, which may be provided with an extraction instruction from the evaluation unit 1440, based on an evaluation result of the cell information.

As another optional feature, the audio decoder 1400 is configured to keep track of required data structures using the cell information, e.g. based on an evaluation result of evaluation unit 1440.

As another optional feature, the audio decoder 1400 is configured to selectively discard one or more data structures 1430, in dependence on the cell information. As an example discarded data structures out of a plurality of data structures may not be considered for the rendering or may even be deleted, e.g. in a memory of the decoder 1400.

As another optional feature, the cell information defines a location-based and/or time-based subdivision of a rendering scene (audio scene, rendering scenario).

As another optional feature, the audio decoder 1400 is configured to obtain a definition of cells on the basis of a scene configuration data structure, e.g. based on an evaluation thereof using evaluation unit 1440.

As another optional feature, the audio decoder 1400 is configured to request, e.g. using requesting unit 1460, one or more data structures and the audio decoder 1400 is configured to derive the data structure identifiers of data structures to be requested using the cell information, e.g. using evaluation unit 1440.

As anther optional feature, the audio decoder 1400 is configured to anticipate, e.g. using anticipation unit 1470, which one or more data structures will be required, or are expected to be required and to request the one or more data structures, e.g. using requesting unit 1460, before the data structures are actually required.

As another optional feature, the audio decoder 1400 is configured to extract one or more data structures using respective data structure identifiers, e.g. using evaluation unit 1440, and the audio decoder 1400 is configured to derive the data structure identifiers of data structures to be extracted using the cell information.

As another optional feature, the audio decoder 1400 is configured to extract metadata required for a rendering from a payload packet, e.g. using evaluation unit 1440. Hence, packets 1404 may optionally comprise such payload packets. However it is to be noted that decoder 1400 may be configured to receive a plurality of bitstreams, e.g. from broadcast and/or unicast channels, In the following reference is made to FIG. 15. For the sake of brevity, and as explained before, it is to be noted that embodiments according to the invention comprise encoders with corresponding features according to the decoder as shown in FIG. 14. Hence, an encoder may only comprise the needed features, to provide the non-optional signals as received by decoder 1400 in FIG. 14 and to process the same in order to provide a decoded audio representation 1406, without any optional features. However, any of the optional features, functionalities and details as disclosed above may be present correspondingly in an encoder according to embodiments, individually or taken in combination. The same applies for features, functionalities and details of decoders and/or encoders of other aspects of the invention.

Figure 15:
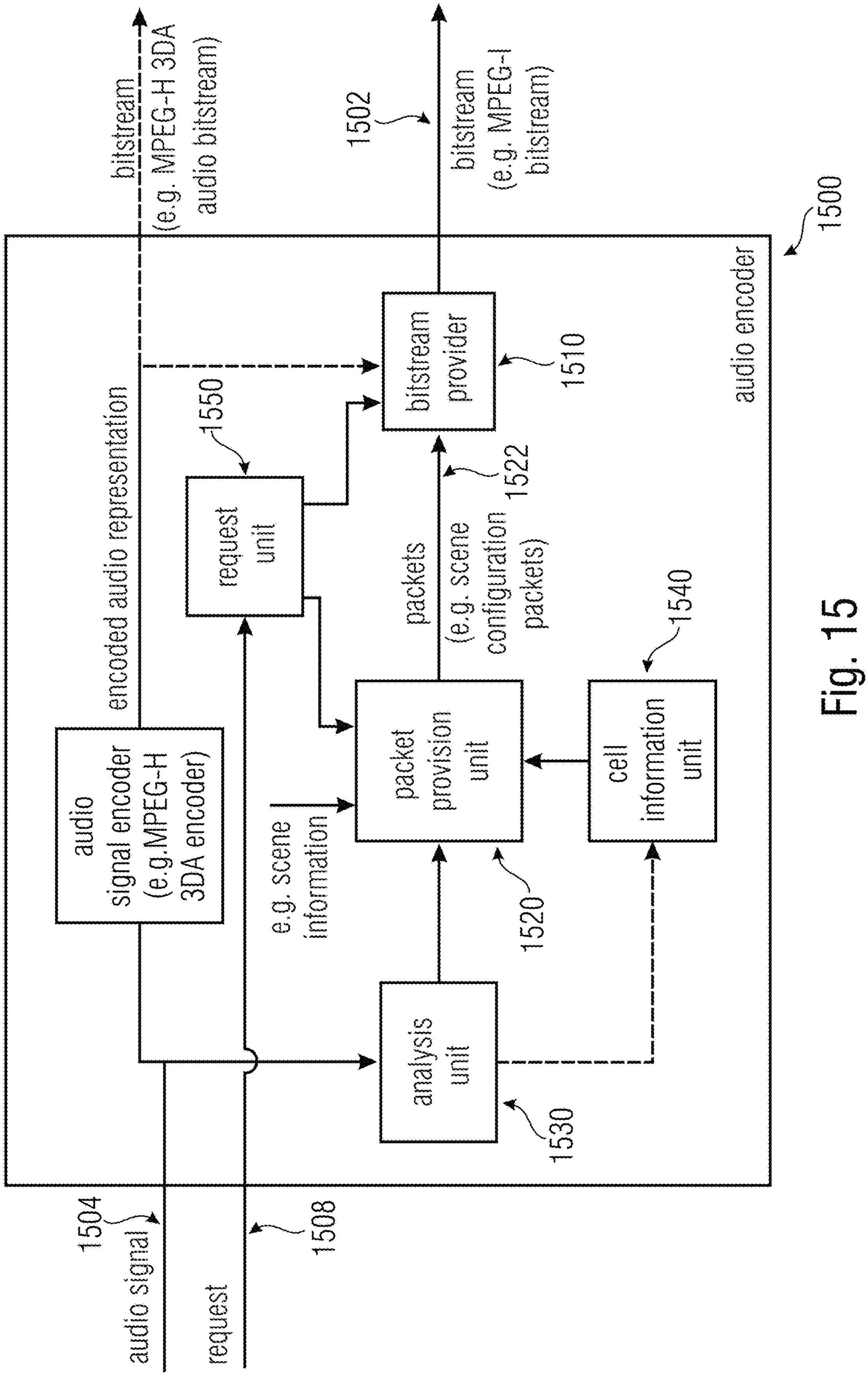
FIG. 15 shows a schematic view of an encoder according to embodiments of the third aspect of the invention.

FIG. 15 shows a schematic view of an encoder according to embodiments of the fourth aspect of the invention. Encoder 1500 is configured to provide a bitstream 1502, wherein the bitstream may, for example, comprise an encoded audio representation. In particular, the encoder 1500 is configured to provide an information for a spatial rendering of one or more audio signals which is included into the bitstream 1502. Therefore, bitstream 1502 comprises a plurality of packets 1522 of different packet types.

For a provision of the bitstream 1502, and hence the above information entities, encoder 1500 comprises an bitstream provider 1510 to which optionally the packets 1522 are provided.

As shown, encoder 1500 may comprise a packet provision unit 1520 for providing the packets 1522. The packets 1522 comprise a scene configuration packet providing a renderer configuration information. Furthermore, the scene configuration packet comprises a cell information defining one or more cells, wherein the cell information defines an association between the one or more cells and respective one or more data structures associated with the one or more cells and defining a rendering scenario.

As an example, an audio signal 1504 to be encoded may be provided to the encoder 1500. The audio signal may comprise time domain samples and/or spectral values, for example of a speech and/or music signal. Optionally (not shown), if this signal is already encoded, this signal may be directly provided to the bitstream provider 1510, in order to be included into a bitstream, for example, together with packets 1522.

The packets 1522 may be provided by the packet provision unit in different ways. For example, the packet provision unit 1520 may provide the packets 1522 on the basis of a scene information which defines an acoustic scene and which may be predefined or which may be obtained by the packet provision unit.

For example for virtual reality applications, based on a virtual model (e.g. of the acoustic scene), acoustically relevant virtual objects may be determined, in order to model or represent the acoustic scene (the acoustic scene for example comprising the virtual model with acoustically relevant virtual objects and the audio signal), using the packets. Optionally, the (optional) analysis unit 1530 may support the determination of acoustically relevant virtual objects, or of characteristics thereof (such that, for example, characteristics of the audio signal may be used to supplement and/or refine the virtual model of the acoustic scene, e.g. by providing information about a position of a sound source).

Hence, an information for supporting the determination of respective packets 1522 may be provided from the optional analysis unit 1530 to the packet provision unit 1520. For example, the packet provision unit 1520 may manage the virtual model, or may be provided with an information about the virtual model.

As another example, in the context of augmented reality applications, the audio signal 1504 to be encoded may be provided to the encoder 1500 and may comprise time domain samples and/or spectral values, for example of a speech and/or music signal. However, optionally, audio signal 1504 may additionally comprise (or carry) spatial information (e.g. in an implicit form) of a real audio scene that is to be augmented, e.g. position information of a measured audio source within the scene, e.g. of a user that is speaking. Such an information, and optionally in addition virtual overlay information (e.g. information for adding acoustically relevant virtual objects to a real scene, in order to augment the real scene), may be extracted and/or analyzed and/or applied by optional analysis unit 1530, in order to model or represent the scene using the packets. Hence, as explained before, an information for determining respective packets 1522 may be provided to the packet provision unit 1520. As an example, the analysis unit 1530 may determine, based on a spatial information in the audio signal 1504, which acoustically relevant objects of the scene are to be considered or updated or rendered, in order to provide a desired hearing experience.

However, it is to be noted, that encoder 1500 may optionally not comprise an analysis unit, such that, for example, an information about the packets 1522 may be provided to the encoder 1500 from an external unit, e.g. a unit managing the virtual or augmented scene.

To further explain the above example, the audio signal 1504 may be an audio signal from a spatial audio scene and may optionally additionally comprise spatial information about the audio scene. Therefore, optionally, encoder 1500 may comprise an analysis unit 1530. The analysis unit 1530 may be configured to analyze the information provided from the audio scene in order to determine or approximate a representation of the audio scene. As an example, the audio scene may be represented using metadata and/or data structures (e.g. data structures comprising or being metadata), e.g. describing scene objects and/or scene characteristics, which may be used together with spectral coefficients of the audio signal to provide an immersive representation of the audio scene for a listener.

It should be noted that the metadata may, for example, be based on a digital model of an audio scene (e.g. for a case of virtual reality application cases) and/or on an analysis of an actual scene in which the audio signal is recorded (e.g. for a case of augmented reality application cases).

Based thereon, as an example, corresponding scene configuration packets, scene update packets and scene payload packets may, for example, be determined and provided.

As an example, the packet provision unit 1520 may hence additionally provide packets comprising said spectral information of the audio signal, e.g. in the form of packets representing one or more audio channels to be rendered (e.g. optionally packets such as MPEGH3DAFRAMEs), which may be part of packets 1522.

As another optional feature, encoder 1500 comprises a cell information unit 1540, which is configured to define or determine the information about the association between the one or more cells and respective one or more data structures and to provide the same to the packet provision unit 1520. As optionally shown, such an association may be performed based on an analysis for the audio signal 1504, using analysis unit 1530. However, such an information may optionally be provided to the encoder 1500.

Optionally, audio signal 1504 may be provided directly to packet provision unit 1520 and/or bitstream provider 1510. As an example, audio signal 1504 may already comprise defined packets 1522, such that these packets may only be extracted in packet provision unit 1522, in order to be encoded in bitstream provider 1510. The audio signal information, e.g. apart from metadata information, may be, for example, be provided in the form of packets or directly based on audio signal 1504 to the bitstream provider 1510.

Furthermore, it is to be noted that analysis unit 1530 may as well determine or approximate a virtual acoustic scene, with the audio signal 1504, for example, only representing an acoustic signal itself, wherein further spatial characteristics of the scene may be based on a virtual model of the surrounding in the virtual acoustic scene and, for example based on a position of a user in the virtual surrounding. For example, in a virtual conference room, reflection characteristics of virtual walls, or damping characteristics of a virtual carpet may be incorporated as metadata based on a virtual acoustic model of the wall or carpet, e.g. with respect to a position of a listener, and not based on a real measurement.

Again, it is to be noted that the audio encoder 1500 may optionally provide any of the packets disclosed herein, also with respect to any of the audio decoders and/or encoders disclosed herein, both individually and taken in combination. Moreover, the cell information may, for example, comprise any of the characteristics disclosed herein, also with respect to the audio decoder, both individually and taken in combination.

As an optional feature, the apparatus 1500 is configured to repeat a provision of the scene configuration packet periodically, and/or to provide one or more scene payload packets at request.

Therefore, encoder 1500 optionally comprises request unit 1550 which is configured to receive a request 1508. Request unit 1550 may hence instruct packet provision unit 1520 to provide packets 1522 including scene payload packets and as optionally shown bitstream provider 1510 to encode the same to bitstream 1502. As explained before, encoder 1500 may as well be configured to provide a plurality of bitstreams, e.g. broadcast and unicast bitstreams, wherein global header data may be repeated in a broadcast bitstream, and requested data structures, payload packets, metadata or whatever information entity individually needed for a rendering may be provided via a unicast bitstream.

As another optional feature, the apparatus 1500, e.g. using packet provision unit 1520, is configured to provide one or more scene payload packets, which comprise one or more data structures referenced in the cell information.

As another optional feature, the apparatus 1500 is configured to provide the scene payload packets, taking into account when the data structures included in the scene payload packets are needed by an audio decoder in accordance with the cell information.

As another optional feature, the audio encoder 1500 is configured to provide a first cell information defining a first set of scene objects and/or scene characteristics for a rendering of a scene, when a listener position, e.g. optionally provided to encoder 1500 as an additional input signal or implicitly determined by the encoder based on the audio signal, lies within a first spatial region (e.g. as determined by analysis unit 1530), and the audio encoder is configured to provide a second cell information defining a second set of scene objects and/or scene characteristics for a rendering of a scene when a listener position lies within a second spatial region. Furthermore, the first set of scene objects and/or scene characteristics provides for a more detailed spatial rendering when compared to the second set of scene objects and/or scene characteristics As another optional feature, the apparatus 1500 is configured to use different cell definitions in order to control a spatial rendering with different level of detail.

Figure 16:
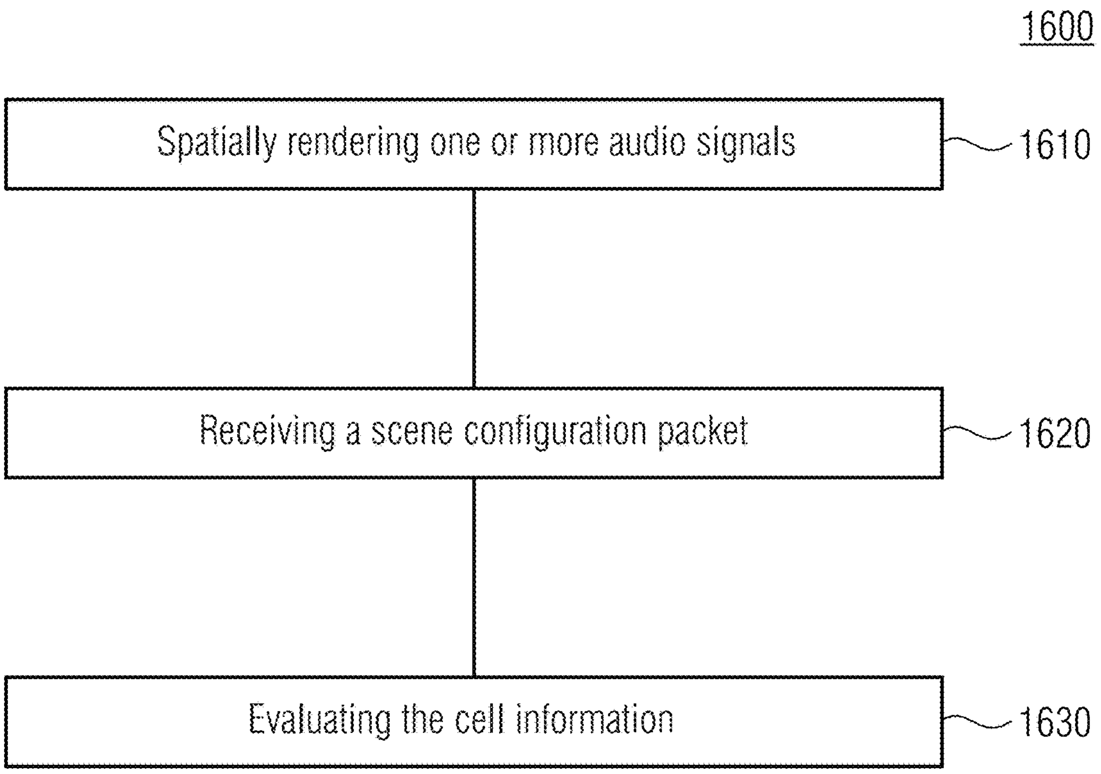
FIG. 16 shows a schematic block diagram of a method for providing a decoded audio representation on the basis of an encoded audio representation according to embodiments of the fourth aspect of the invention.
Figure 17:
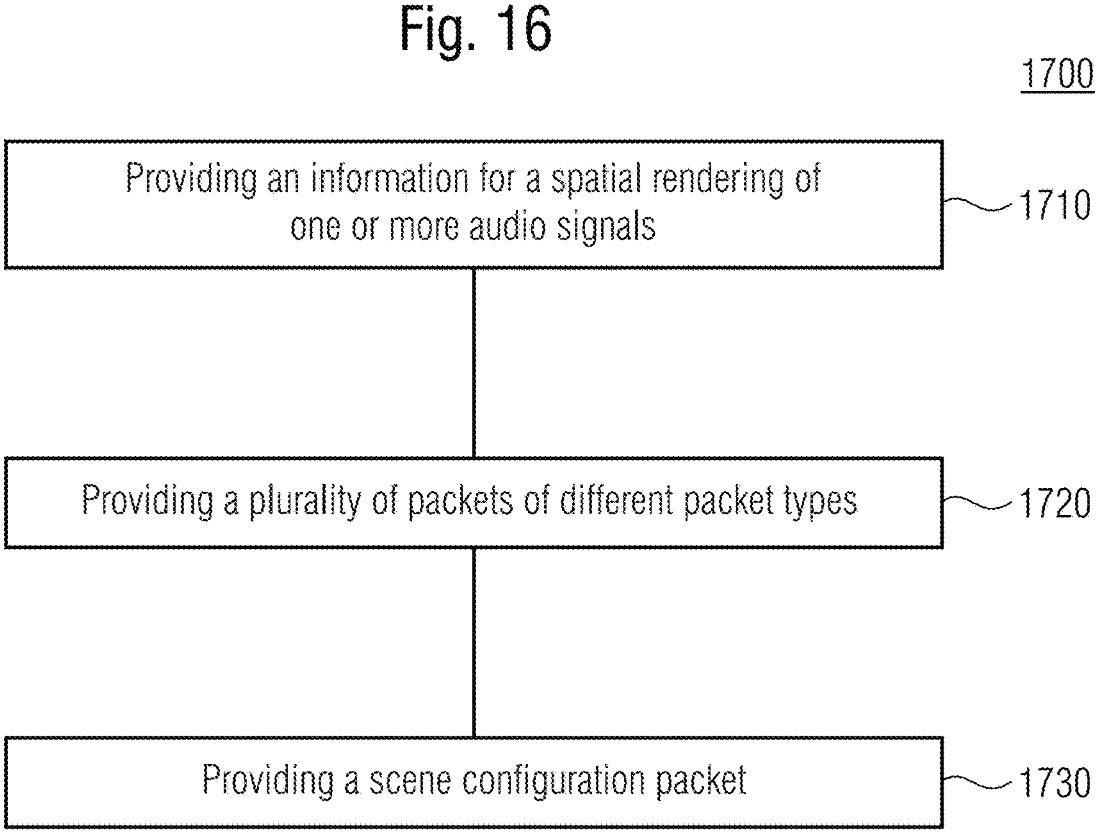
FIG. 17 shows a schematic block diagram of a method for providing an encoded audio representation, according to embodiments of the fourth aspect of the invention.

FIG. 16 shows a schematic block diagram of a method for providing a decoded audio representation on the basis of an encoded audio representation according to embodiments of the fourth aspect of the invention. Method 1600 comprises spatially rendering, 1610, one or more audio signals and receiving, 1620, a scene configuration packet providing a renderer configuration information wherein the scene configuration packet comprises a cell information defining one or more cells wherein the cell information defines an association between the one or more cells and respective one or more data structures associated with the one or more cells and defining a rendering scenario. Furthermore, the method comprises evaluating, 1630, the cell information in order to determine which data structures should be used for the spatial rendering FIG. 17 shows a schematic block diagram of a method for providing an encoded audio representation, according to embodiments of the fourth aspect of the invention. The method 1700 comprises providing, 1710, an information for a spatial rendering of one or more audio signals, providing, 1720, a plurality of packets of different packet types and providing a scene configuration packet and providing, 1730, a renderer configuration information wherein the scene configuration packet comprises a cell information defining one or more cells wherein the cell information defines an association between the one or more cells and respective one or more data structures associated with the one or more cells and defining a rendering scenario.

In the following, reference is made to FIG. 15. Bitstream 1502 of FIG. 15 represents an audio content. Embodiments according to the invention comprise bitstreams such as the above bitstream. To sum up, such a bitstream comprises a plurality of packets of different packet types, a scene configuration packet, providing a renderer configuration information, wherein the scene configuration packet comprises a cell information defining one or more cells wherein the cell information defines an association between the one or more cells and respective one or more data structures associated with the one or more cells and defining a rendering scenario.

Again, it is to be noted that embodiments according to the invention have been described partitioned in four inventive aspects. It is to be noted that such a subdivision of the invention serves to facilitate understanding the spirt of the invention and to limit redundancy. Hence, it is to be highlighted that any functionality, feature and/or detail of an embodiment according to any aspect of the invention can be incorporated in any other embodiment of the same or another aspect of the invention both in combination or taken individually. In the same spirit, it is to be noted that features, functionalities and details of encoders may be used interchangeably for inventive decoders and vice versa. The same applies to details of inventive bitstreams and methods.

Furthermore, it is to be noted that embodiments according to the invention comprise decoders and/or renderer. A decoder according to embodiments may comprise a functionality of a renderer, however, embodiments may comprise architectures wherein these two functionalities are realized in different entities. In the above explanation some embodiments were discussed where decoders are used interchangeably with renderers, e.g. providing such a functionality in addition. However, it is to be noted that this is to be understood as an example. Functionalities that were explained in the above in one entity, e.g. the rendering units of decoders may be split into two separate entities, namely a decoder and a renderer, with the renderer, as an example comprising the rendering units. Accordingly input and output signals may be divided.

In the following, further embodiments of the invention will be disclosed. The following embodiments may be used in the context of or for Dynamic VR/AR Audio Bitstreams, e.g. using three packet types, e.g. using scene update packets with update condition, e.g. using a time stamp, e.g. using cell information.

REMARKS

In the following, different inventive embodiments and aspects will be described in “Overview-Summary”, in a chapter “New Approach” and in a chapter “Embodiment” and in a chapter “Application examples” and in a chapter “Aspects of the Invention”. Moreover, further optional details are described in an appendix.

Also, further embodiments will be defined by the enclosed claims.

It should be noted that any embodiments as defined by the claims can optionally be supplemented by any of the details (features and functionalities) described in the above mentioned chapters and the rest of the description.

Also, the embodiments described in the above mentioned chapters can optionally be used individually, and can also be supplemented by any of the features in another chapter, or by any feature included in the claims or by any feature as disclosed in rest of the description.

Also, it should be noted that individual aspects described herein can be used individually or in combination. Thus, details can be added to each of said individual aspects without adding details to another one of said aspects.

Moreover, features and functionalities disclosed herein relating to a method can optionally also be used in an apparatus (configured to perform such functionality). Furthermore, any features and functionalities disclosed herein with respect to an apparatus can optionally also be used in a corresponding method. In other words, the methods disclosed herein can optionally be supplemented by any of the features and functionalities described with respect to the apparatuses.

Also, any of the features and functionalities described herein can be implemented in hardware or in software, or using a combination of hardware and software, as will be described in the section “implementation alternatives”.

Moreover, it should be noted that the audio bitstream [or, equivalently, encoded audio representation] may optionally be supplemented by any of the features, functionalities and details disclosed herein, both individually and taken in combination.

Furthermore, as mentioned before, it is to be noted that embodiments as disclosed in the context of a decoder may comprise corresponding features, functionalities and details of a corresponding encoder, individually or taken in combination, and vice versa.

In addition, in general, embodiments according to the invention may comprise payload packets, comprising one or more payloads, wherein payload packets and payloads may be examples of data structures. Data structures may as well be packets of other types.

Payload information may comprise metadata, e.g. information for an audio scene that is not directly related to a timeline of a corresponding audio stream, such as acoustically relevant geometry, parametric rendering instructions and information about audio elements.

As an example metadata may comprise or may be information about acoustically relevant objects and/or characteristics.

Hence, payload packets and respectively payloads may comprise definitions of one or more of the scene objects and/or definitions of one or more of the scene characteristics and hence definitions of metadata.

1. Overview—Summary

An aspect of the invention is directed to a bitstream design, e.g. for six degrees of freedom (6DoF) audio applications, such that, for example, the transmission of the bitstream packets can be flexibly adapted to the application use case, e.g. on-site stand-alone rendering, streaming, broadcast or a client-server scheme.

Other aspects of the invention are also disclosed herein.

2. Conventional Solutions and its Disadvantage

Conventional solutions are bitstream designs found in MPEG audio codecs such as MPEG-H. In such bitstreams, data packets are, for example, mainly transmitted from a sender ("encoder") to the decoder/renderer. On the renderer site, user interactivity might generate additional packets that are used in a static way for rendering the audio content. Examples are head tracking data or level values for a customized audio mix.

It has been found that six degrees of freedom (6DoF) audio applications sometimes require dynamic interactivity in VR/AR audio applications. It has been found that transmitting 6DoF metadata should (or sometimes has to) account for this to be efficient.

It has been found that transmitting all needed metadata from a sender to a receiver/renderer beforehand as upfront bulk data would be a simple and easy way of operation but comes with a huge data rate peak and some transmission delay before the actual rendering can start.

It has been found that in certain application, this simple solution is even impossible if e.g. the further evolution of the scene is unknown at initial time of rendering start.

According to an aspect, embodiments according to the invention can be used in such scenarios and applications.

However, according to another aspect, embodiments of the invention can also be used in different scenarios and applications.

3. New Approach

According to an aspect, the inventive bitstream concept accounts, for example, for the increased level of interactivity that is inherent in six degrees of freedom (6DoF) audio applications and, for example, especially for the massive dynamic interactivity in VR/AR audio applications, where, for example, the required rendering metadata is strongly dependent on the user local position, user interaction (e.g. pressing virtual buttons, etc.), and/or on the timeline of the virtual scene. Therefore, according to an aspect, it is beneficial to design the bitstream in a flexible way such that, for example, the transmission of the bitstream packets can be flexibly adapted to the application use case, e.g. on-site stand-alone rendering, streaming, broadcast or a client-server scheme.

4. Embodiment

4.1. Packet Types

According to an aspect of the invention, the inventive bitstream is an extension of MHAS—the MPEG-H Audio Stream. In addition to the existing MHAS packet types, for example, three new packet types are specified which, for example, allow to store and transmit metadata for complex and dynamic 6DoF audio scenes.

Scene Config

The Scene Config packet is, for example, the "header" of the MPEG-I bitstream and can, for example, be repeated periodically in a bitstream for random access. It provides, for example, all relevant information for the renderer to configure itself. In particular, it may, for example, contain instructions, which Scene Payload packets are required at any given point in space and time and (optionally) where they can be retrieved from.

Scene Update

Scene updates (i.e. changes to the scene metadata that occur during playback) can, for example, be communicated using the Scene Update packet. It allows, for example, to specify the condition at which the update is executed (e.g. time-based, and/or location-based and/or interactive triggers) and the change(s) made to the scene.

Scene Payload

The Scene Payload packet is, for example, a container for all bulk metadata in the bitstream.

Bulk metadata is, for example, all metadata that cannot directly be related to the timeline of an audio stream, but is required (or useful) for the rendering, for example, of complex and dynamic 6DoF audio scenes, including, for example, (acoustically relevant) geometry, parametric rendering instructions and audio element metadata. The packet can contain for example Directivities, Geometries and special metadata for individual audio effects like Reverb, Early Reflections or Diffraction.

The distribution of payloads into Scene Payload packets can, for example, be organized by the encoder, taking into account, for example, when and where metadata is needed by the renderer, which metadata is essential for rendering, as well as maximum size of the packet, etc.

In addition, an (optional) "level of detail" concept of individual modules would allow to spread larger payloads (e.g. geometry) over a longer period in a broadcast scenario. In an (optional) server-client scenario, payloads can, for example, be loaded via a separate channel.

4.2. Packet Syntax (Details are Optional)

TABLE 1

Syntax of Scene Config Packet (example)

| Syntax | No. of bits (example) | Mnemonic |
|---|---|---|
| mpegiSceneConfig ( ) | | |
| { | | |
| isARScene; (optional) | 1 | |
| sceneSize; (optional) | 2 | |
| timeScale; (optional) | ? | |
| currentTime; (optional) | 32 | |
| numSceneObjects; (optional) | 12? | |
| globalPayloadId; (optional) | 8? | |
| numAudioStreams; (optional) | 8? | |
| for (i = 0; i < numAudioStreams; i++) { | | |
| numChannels; (optional) | 7? | |
| isLocallyCaptured[i]; (optional= | 1 | |
| for (ch = 0; ch < numChannels; ch++) { | | |
| if (isLocallyCaptured[i]) { | | |
| localInputChannel[i][ch]; (optional) | 7? | |
| } | | |
| else { | | |
| // TODO | | |
| } | | |
| } | | |
| } | | |
| numCells; (example) | 8? | |
| for (i = 0; i < numCells; i++) { | 8? | |
| numPayloads[i]; (optional) | 8? | |
| for (j = 0; j < numPayloads[i]; j++) { | 1 | |
| payloadId[i][j]; (optional) | 32 | |
| } | 32 | |
| isTimed[i]; (optional) | | |
| if (isTimed[i]) { | 12? | |
| startTimestamp[i]; (optional) | 12? | |
| (endTimestamp[i];) (optional) | | |
| } else { | | |

TABLE 1-continued

Syntax of Scene Config Packet (example)

| Syntax | No. of bits (example) | Mnemonic |
|---|---|---|
| geometryId[i]; (optional) | | |
| } | | |
| updateId[i]; (optional) | | |
| } | | |
| } | | |

TABLE 1

Syntax of mpegiSceneUpdate ( ) (example)

| Syntax | No. of bits (example) | Mnemonic |
|---|---|---|
| mpegiSceneUpdate ( ) | | |
| { | | |
| id; (optional) | X | Uimsbf |
| index; (optional) | X | Uismbf |
| hasTemporalCondition; (example) | 1 | |
| if (hasTemporalCondition) { | | |
| startTimestamp; (example) | 32 | |
| } | | |
| hasSpatialCondition; (example) | 1 | |
| if (hasSpatialCondition) { | | |
| geometryId; (example) | 12? | |
| fireOn; (optional) | 1 | |
| } | | |
| hasDelay; (optional) | 1 | |
| if (hasDelay) { | | |
| delay; (example) | 16? | |
| } | | |
| numOfModifications; (optional) | | |
| for (m = 0; i < numOfModifications; m++) { | | |
| targetId; (example) | X | Uismbf |
| attribute; (example) | X | Uismbf |
| isTrajectory; (optional) | | |
| if (isTrajectory) { | | |
| interpolationType; (optional) | X | |
| numPoints; (optional) | X | |
| for (n = 0; n < numPoints; n++) { | | |
| time[n]; (optional) | 32 | |
| value[n]; (optional) | X | |
| } | | |
| } | | |
| else { | | |
| isParameterIndicator; (optional) | 1 | Uismbf |
| if (isParameterIndicator) { | | |
| parameterIndicatorIndex; (optional) | X | |
| } | | |
| else { | | |
| newValue; (optional) | X | |
| } | | |
| } | | |
| } | | |
| } | | |

Notes:

- An Encoder Input Format (EIF) update with duration is just a special case of linear interpolation (optional)
- Optional interpolationType can e.g. be linear, sample-and-hold, cubic, etc.
- Optional "ListenerProximityCondition" from the EIF is, for example, expressed as a spatial condition
- For example, Combinations of spatial conditions and temporal conditions cover all
- Optional: Temporal conditions can be updated to time ranges at a later stage
- The parameter indicators can optionally be removed entirely (e.g. after CfP), as the update can, for example, just be constructed to contain the modified entity and the new value.

TABLE 3

Syntax of Scene Payload Packet (example)

| Syntax | No. of bits (example) | Mnemonic |
|---|---|---|
| mpegiScenePayload ( ) | | |
| { | | |
| Num elements; (example) | X | Uimsbf |
| ID; (optional) | | |
| for (m = 0; m < Num__elements −1; m++) { | | |
| Type; (example) | 5 | Uimsbf |
| ID; (example) | | |
| Payload size (example) | | |
| mpegiPayloadElement (Type) | | |
| } | | |
| } | | |

TABLE 4

Syntax of mpegiPayloadElement ( ) (example)

| Syntax | No. of bits | Mnemonic |
|---|---|---|
| mpegiPayloadElement (Type) | | |
| { | | |
| switch (Type) { | | |
| case 0x00 | | |
| AcousticEnvironment ( ) | | |
| break; | | |
| case 0x01 | | |
| AcousticMaterial ( ) | | |
| break; | | |
| case 0x02 | | |
| Anchors ( ) | | |
| break; | | |
| case 0x03 | | |
| AudioStream ( ) | | |
| break; | | |
| case 0x04 | | |
| ChannelSource ( ) | | |
| break; | | |
| case 0x05 | | |
| ConditionalUpdate ( ) | | |
| break; | | |
| case 0x06 | | |
| Conditions ( ) | | |
| break; | | |
| case 0x07 | | |
| Directivity ( ) | | |
| break; | | |
| case 0x08 | | |
| DynamicUpdate ( ) | | |
| break; | | |
| case 0x09 | | |
| HoaSource ( ) | | |
| break; | | |
| case 0x0a | | |
| Meshes ( ) | | |
| break; | | |
| case 0x0b | | |
| ObjectSource ( ) | | |
| break; | | |
| case 0x0c | | |
| TimedUpdates ( ) | | |
| break; | | |
| case 0x0d | | |
| Transform ( ) | | |
| break; | | |
| case 0x0e | | |
| TriggeredUpdate ( ) | | |
| break; | | |
| case 0x0f | | |
| Diffraction ( ) | | |
| break; | | |
| case 0x10 | | |
| EarlyReflection ( ) | | |
| break; | | |

TABLE 4-continued

| Syntax of mpegiPayloadElement ( ) (example) | | |
|---|---|---|
| Syntax | No. of bits | Mnemonic |
| case 0x11 | | |
| Portals ( ) | | |
| break; | | |
| case 0x12 | | |
| HoaGroups ( ) | | |
| break; | | |
| case 0x13 | | |
| MPHOA ( ) | | |
| break; | | |
| case 0x14 | | |
| LateReverb ( ) | | |
| break; | | |
| } | | |

4.3. Payloads, Cells and Subscene Decomposition (Optional Aspects and Examples)

The Scene Payload packet ("Payload packet" in the following) is, for example, a container for all bulk metadata that cannot directly be related to the timeline of an audio stream, but is, for example, required (or useful), for example, for the rendering of complex and dynamic 6DoF audio scenes, including, for example, (acoustically relevant) geometry, parametric rendering instructions and audio element metadata.

In the simplest case, the entire bulk metadata for a scene can, for example, be contained in a single Payload packet that is, for example, transmitted to the decoder before the start of scene playback. This is, for example, the method for file-based transmission, where the Payload packet can, for example, be located at the beginning of the file.

In a streaming scenario, however, it may, for example, be beneficial to split the bulk metadata into multiple Payload packets, for example, to avoid a large transmission before scene playback can start.

Metadata can, for example, become required (a) at a specific point in time, or (b) at a specific location in space. The optional "Cell" concept provides, for example, a method to specify at which time and/or location certain payload packets are required for rendering the scene.

For example, all Cells of the scene are defined in the Scene Config packet that is, for example, either located at the beginning of the file or repeated periodically in an MHAS stream, for example, to allow random access. The decoder may (or even has to, in some cases), for example, parse the Scene Config packet first to determine, for example, which Payload packets are required before the scene playback can start.

The geometry that specifies, for example, the volume in which a location-based Cell is active is called the "Cell bounds". The Cell is, for example, active, when the listener is inside the Cell bounds. Cell bounds can, for example, be arbitrary geometry, but primitive geometries (like axis-aligned bounding boxes) are advantageous for efficient implementation.

Optionally, a set of zero or more globally required payloads contains, for example, the bulk metadata that is, for example, needed for proper rendering of the scene (e.g. containing the geometries that specify the Cell bounds).

For example, depending on rendering profiles, different payloads may be required for a given Cell. This way, e.g. simplified geometry can be provided for low-complexity profiles.

This document does not specify (or does not require) how the payload packets reach the decoder. Multiple possibilities exist (which may, for example, be used in combination with the embodiments of the invention):

a) According to an optional aspect, the decoder can request Payload packets by ID, for example, from a separate channel (e.g. TCP/IP-based). In this case, it is, for example, the decoder's responsibility to fetch Payload packets so that the contained metadata is available when it becomes required for scene playback.

b) According to an optional aspect, the Payload packets are interleaved with the MHAS stream, for example, in a broadcast scenario. Payloads that become required at a later point in time after the scene start can, for example, be embedded in the stream before they become required. However, when random access is allowed, this may, for example, require repeated transmission of required Payload packets in regular intervals, making this method unsuitable for scenes with large amounts of bulk metadata in some cases.

c) According to an optional aspect, in a "personalized" unicast stream, the sender can, for example, make sure that Payloads packets are embedded in the MHAS stream before they become required.

(Maybe: According to an optional aspect, the decoder can keep track of which Payloads are obsolete by observing the end timestamp of time-based Cells, as well as location-based Cells that are no longer active.)

To illustrate the conceptual possibilities of Cells, for example, in an extreme case, each acoustically relevant geometry and audio element can be packetized into a separate Payload packet, for example, with a separate, possibly overlapping location-based Cell, for example, based on perceptual relevance in the scene. For example, this way, each geometry is only considered for geometrical acoustic effects and/or every audio element is only active, when it is actually perceptually relevant, for example, at the current listener position.

According to an optional aspect, the concept can also be leveraged for a level-of-detail (LOD) decomposition of the scene: For example, far away from a geometric structure, a coarse geometric representation of the structure may be sufficient (e.g. with a small number of reflective surfaces), whereas close to the same structure, reflections on the geometric structure and other effects related to geometrical acoustics should be rendered with a higher LOD (e.g. with a large number of reflective surfaces). This can, for example, be achieved, by specifying one Cell for the vicinity of the considered geometry including a high LOD geometric representation, and one Cell for the remaining scene, including a low LOD geometric representation.

There are, for example, two options for subscene decomposition (i.e. deactivating certain elements when they are perceptually irrelevant):

a) The rendering of scene objects (for example, audio elements and geometry) should be done only if they are in a currently relevant Payload Packet;

b) The corresponding scene update allows, for example, to activate and deactivate scene objects. For this, in addition to the EIF spec, geometries may, for example, need an "isActive" flag.

For example, acoustic environments (for example, for the parametric description of late reverb) can be congruent with location-based Cells, but they don't have to.

4.4. Notes on Scene Update Packet (Optional Aspects and Examples)

For each parameter with a continuous value range, an interpolation type can optionally be specified. The interpolation type can e.g. be linear, sample-and-hold, cubic, etc. and a corresponding interpolation curve is, for example, constructed from the given support points.

4.5. Notes on Scene Config Packet (Optional Aspects and Examples; Payloads are Optional)

sceneSize (optional)—Configures the scaling of positions in the scene. This allows, for example, to change the number of bits required to encode a position when the highest expected value for any coordinate is smaller.

timeScale (optional)—Configures the interpretation of timestamp in relation to the clock source of the renderer.

currentTime (optional)—The timestamp of this config in the given time scale. In a streaming scenario, this can be used to set the time for a new receiver.

numSceneObjects (optional)—Number of scene objects (for example, audio elements+anchors/transforms+geometry) in total, for example, including all subscenes. This can, for example, be used to derive the ID range for scene objects and to preallocate resources in the renderer.

globalPayloadId (optional)—MHAS packet ID of a Payload packet that contains the artifacts that are globally required for configuring the renderer and rendering the scene. It includes for example the geometries to describe the Cell bounds. Can also be "none".

Audio Streams (optional)—Mapping from MPEG-I internal stream IDs to a source, which can, for example, either be a physical PCM input channel (for "locally captured audio") or some kind of addressing of MPEG-H 3D Audio Frame channels. The optional "isLocallyCaptured" branch can, for example, be used for the CfP channel configuration. Channel numbers should, for example, leave enough space for HOA. Furthermore, an audio stream can, for example (optionally), be marked as "dynamic playback". In this case, the whole audio content should, for example, be loaded and decoded beforehand, so that a dynamic playback trigger can be executed without delay. Also, the data for each audio stream may optionally contain information about a possibly required delay compensation.

Cells (optional)—Cells allow the location—and/or time-based subdivision of the scene. For example, each cell (a) references a geometry by ID, which describes the volume, in which one or multiple payloads become required, and/or (b) references a timestamp at which the payload(s) become required. In addition, the ID of a corresponding, optional SceneUpdate can optionally be referenced, that bundles all modifications to the scene that should happen when the cell trigger is executed. The geometry of location-based cells can optionally be overlapping. See also Section 4.3.

5. Application Examples (Details are Optional)

In the following, three examples are presented that are based on the embodiment of the bitstream syntax. The examples address three different use cases where the MHAS packets of the inventive MPEG-I metadata bitstream are combined with MHAS packets that contain the MPEG-H Audio Stream ("MPEGH3DAFRAME"). For example, the MPEG-H Audio Stream transports the audio material (channels, objects and HOA signals) that is rendered by an MPEG-I decoder/renderer using the MPEG-I metadata into a 6DoF audio scene.

In the following embodiments addressing File-based MHAS streams (disclosing examples, details are optional) are discussed.

Figure 18:
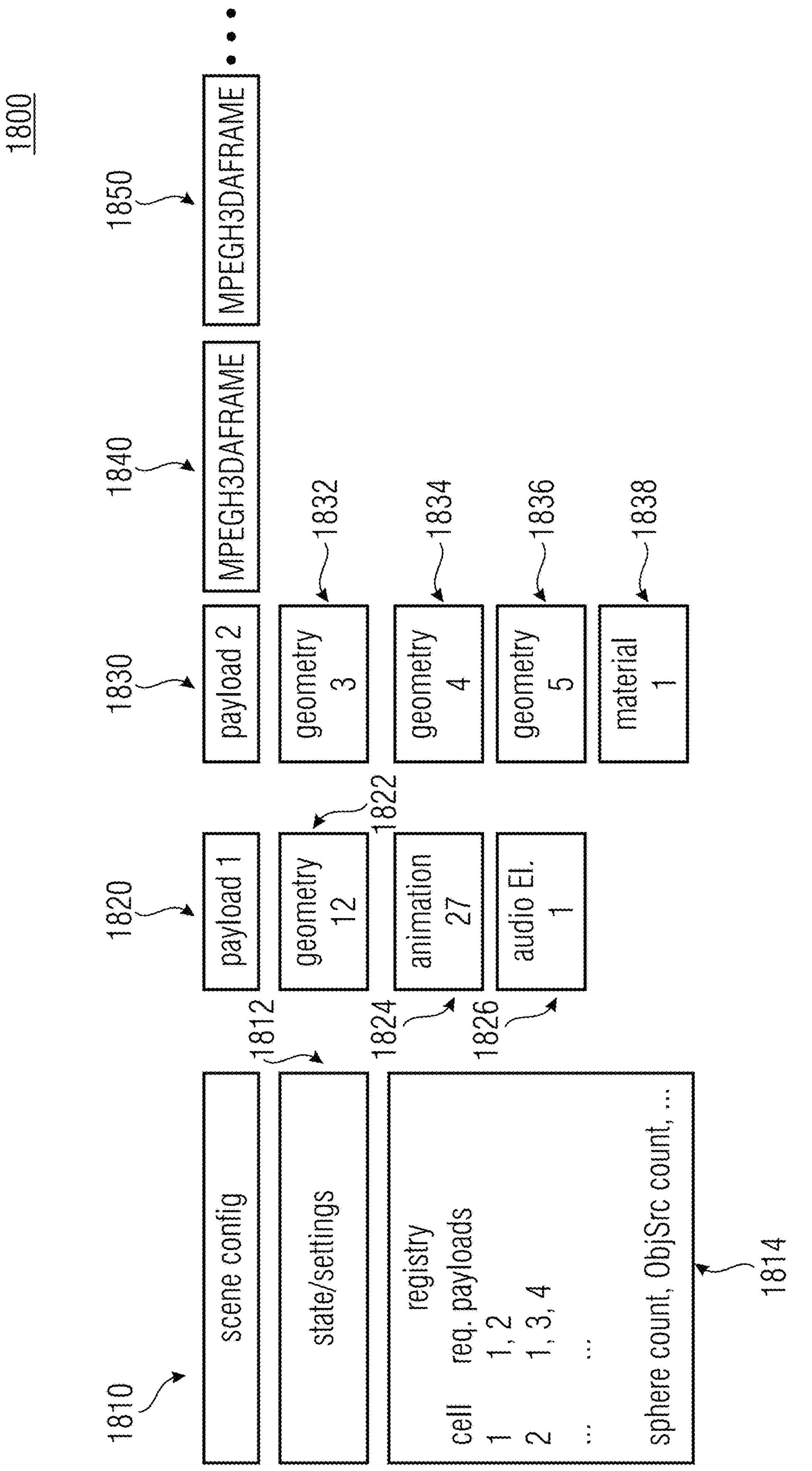
FIG. 18 shows a schematic view of a first bitstream according to embodiments of the invention.

Reference is made to FIG. 18. FIG. 18 shows a schematic view of a first bitstream according to embodiments of the invention. Bitstream 1800 comprises a scene configuration packet 1810, a plurality of scene payload packets 1820, 1830 and a plurality of packets 1840, 1850 comprising a portion of an audio stream or an audio stream, e.g. MPEG-H Audio Stream. As shown in FIG. 18, the scene configuration packet 1810 may optionally comprise an information about a state and/or settings 1812, for a respective decoder or renderer and further information 1814, comprising a cell information, indicating (e.g. using a payload packet identifier) which scene payload packets are needed for which cell, and information such as Sphere count, and ObjSrc count, etc.

The first scene payload packet 1820 comprises, as an example, an information about a geometry 1822, an animation information 1824 and an information about an audio element 1826. The second scene payload packet 1830 comprises, as an example, an information 1832, 1834, 1836 about three geometries, and a material information 1838.

Hence, cell 1, as indicated in the scene configuration packet 1810 may be associated with a plurality of acoustically relevant information, e.g. geometry information as identified by indices 12, 3, 4, and 5, animation information as identified by index 27, audio element information, as identified by index 1 and material information as identified by index 1. Hence, in order to render the audio scene correctly, if cell 1 is active, payload packets 1820 and 1830 comprising information about these elements may be needed. For example, an audio decoder may use the payload packet identifiers associated with a respective cell to determine which payload packets should be evaluated (or retrieved and/or requested from a data source).

As another optional feature, payload packet 1, 1820, may comprise a coarse description of a geometry of a cell element, which may be refined by the geometry information of payload packet 1830.

Accordingly, the decoder may only use the refined geometry information in some cases (e.g. in case a certain cell is active). For example, when cell 1 is active, the information of information packets 1820 and 1830 may be used, but when cell 2 is active the decoder may use the information of payload packet 1820 but neglect the information of payload packet 1830. As another example, the payload packets may, for example define a geometry of the cell and hence the geometric structure of the cell, e.g. as defined by information 1822, 1832, 1834, 1836.

In the stream application, the data is, for example, received from a single stream or read from a file. For example, the MPEG-I scene config packet and the payload packets are transmitted first, followed by a number of MPEG-H Audio Stream packets. In periodic intervals, for example reflected in the updated time stamps contained in the config packet, this packet sequence might optionally be repeated to allow for random access or "tune in" into an MPEG-I scene. This application enables, for example, broadcast, since all needed data is transmitted. As a downside, the broadcast bitstream data rate is, in some cases, rather large since the large payload packets are send and repeated periodically.

In the following embodiments addressing Broadcast MHAS streams (e.g. with client-server channel for Payload packets) (examples thereof, details are optional) are discussed.

Figure 19:
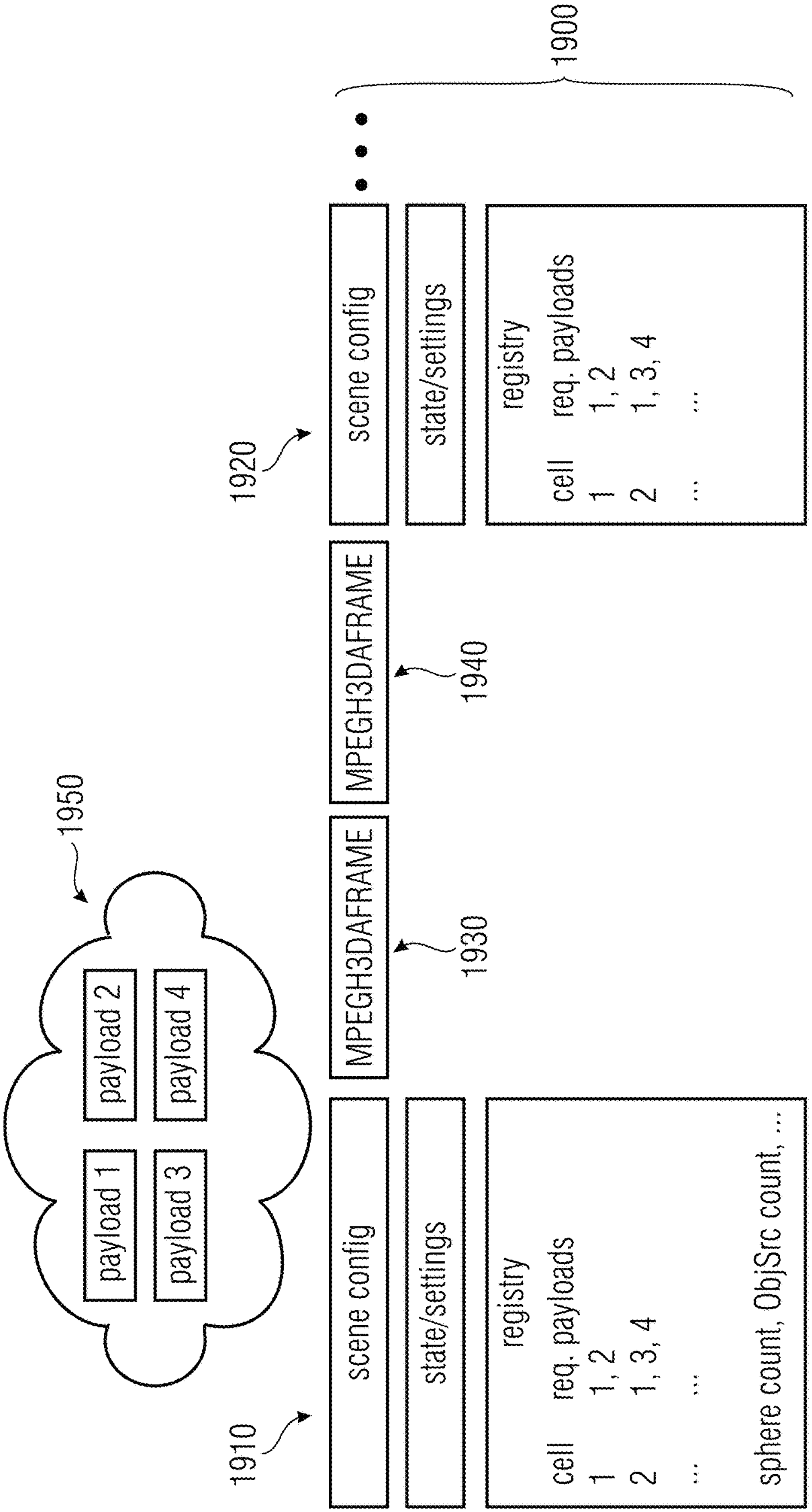
FIG. 19 shows a schematic view of a second bitstream according to embodiments of the invention.

Reference is made to FIG. 19. FIG. 19 shows a schematic view of an inventive bitstream 1900 comprising a plurality of scene configuration packets 1910, 1920 and a plurality of packets 1930, 1940 comprising an audio stream, e.g. MPEG-H Audio Stream.

In the client-server application, just the, for example, small scene config packets, e.g. 1910, 1920, and the MPEG-H Audio Stream packets, e.g. 1930, 1940, are, for example, received from a broadcast stream or read from a file.

Consequently, for example, just the small MPEG-I scene config packet is sent and repeated in periodic intervals, for example, with updated time stamps (e.g. packet 1910 equals 1920 apart from the timestamp information). The MPEG-I decoder/renderer can, for example, determine from the registry contained, for example, in the scene config packet which payload packets, 1950, are needed to enter the scene at a given time stamp or virtual location and, for example, request just these payload packets via a back-channel from the server, e.g. encoder, just once. Thereby, the broadcast bitstream data rate is, for example, kept low compared to the first scenario.

In the following embodiments addressing Broadcast MHAS stream (e.g. with client-server channel for Payload packets) and with dynamic changes in the scene (example thereof, details are optional) are discussed.

Figure 20:
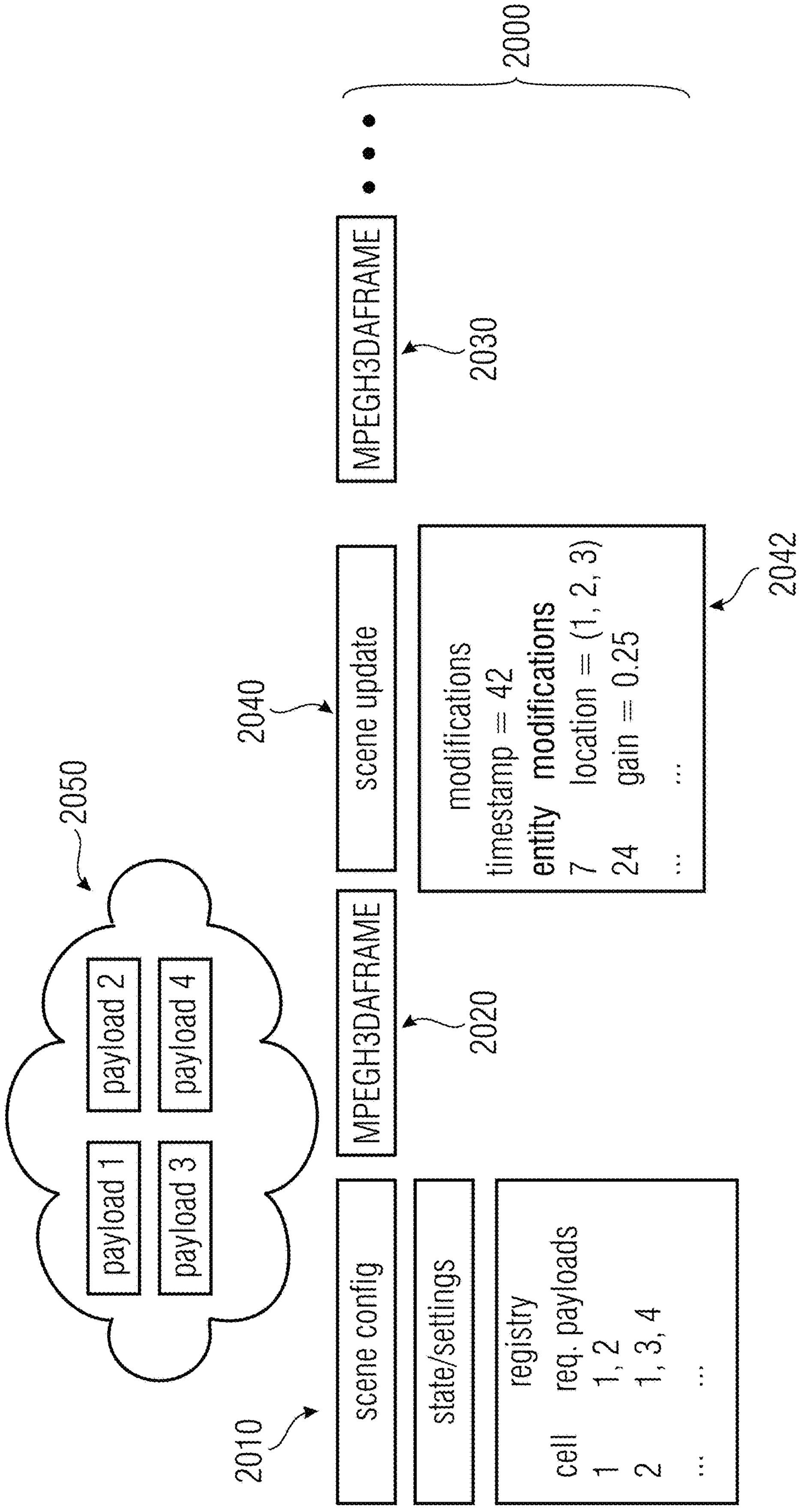
FIG. 20 shows a schematic view of a third bitstream according to embodiments of the invention.

Reference is made to FIG. 20. FIG. 20 shows a schematic view of an inventive bitstream 2000 comprising a scene configuration packets 2010, a plurality of packets 2020, 2030 comprising an audio stream, e.g. MPEG-H Audio Stream and a scene update packet 2040, comprising, as an example, a timestamp information, e.g. for indicating a point in time when the update itself e.g. an association of an entity index and a modification, is to be performed.

Furthermore, payload packets 2050 are shown, that may, for example, be requested via a back-channel.

For example, the broadcast streams of both types can additionally contain Scene Update packets, e.g. 2040, at any point in the packet sequence. The update packet itself contains, for example, information about its execution, e.g. the time at which it should be applied (for example, immediately if the timestamp is smaller or equal to the receiving scene time), or if any other trigger (e.g. user interaction like manipulating virtual objects or entering a certain location in virtual space) can activate this update.

All streams may, for example, contain MPEG-H Audio Stream MHAS synchronization packets at selected points in time or at regular time intervals, for example, to allow for cutting a bitstream at arbitrary points and find the next valid scene config packet to start the decoding/rendering process.

6. Aspects of the Invention

An/a apparatus/method for transmitting, for example, six degrees of freedom (6DoF) metadata for audio applications

- Three different packet types that separate
  - Configuration
  - Dynamic Updates
  - Data Payload.
- The packet types being conformant to MPEG-H MHAS packet definition (optional aspect, also useable independently).
- Scheme to align these packets as upfront bulk data (optional aspect, also useable independently)
- Scheme to repeat a sequence of these packet periodically for broadcast applications (optional aspect, also useable independently)
- Scheme to send config packets only in a low-bitrate broadcast stream and to supply the high-bitrate payload packets on request via a backchannel (optional aspect, also useable independently)
- Scheme to send config packets only in a low-bitrate broadcast stream and to supply the high-bitrate payload packets dependent on scene time and user position (optional aspect, also useable independently)
- Scheme to send config packets only in a low-bitrate broadcast stream and to supply the high-bitrate payload packets on demand for subscenes of the VR/AR scene (optional aspect, also useable independently)
- Scheme to interleave audio (MPEG-H packets) and six degrees of freedom (6DoF) metadata in a common bitstream (optional aspect, also useable independently)
- Scheme to separate bulk metadata into separate chunks (payload packets) that are relevant at different points in time or different locations in space of the scene (optional aspect, also useable independently)
- Scheme to provide different metadata for different level of detail requirements in separate payload packets (optional aspect)
- Scheme to change a 6DoF audio scene with dynamic updates embedded in a broadcast stream that change one or multiple metadata values (optional aspect)
- Scheme to decompose a 6DoF audio scene into volumes of arbitrary shape in which different metadata is valid (optional aspect)

Further aspects of the invention are defined by the above examples and comprise, for example, a bitstream comprising one or more of the features mentioned above and an audio decoder comprising one or more of the features mentioned above.

Appendix: MPEG-I 6DoF MHAS stream packet definition (example, details are optional)

Overview

This clause defines a packet of MPEG-I scene data to fit the MPEG-H 3DA MHAS stream format that has been standardized to transport MPEG-H 3D audio data.

Syntax

Main MHAS syntax elements

TABLE 2

Syntax of mpeghAudioStream( ) (example, details are optional)

| Syntax | No. of bits | Mnemonic |
|---|---|---|
| mpeghAudioStream( )<br>{<br>  while (bitsAvailable( ) != 0) {<br>    mpeghAudioStreamPacket( );<br>  }<br>} | | |

TABLE 3

Syntax of mpeghAudioStreamPacket( ) (example, details are optional)

| Syntax | No. of bits example | Mnemonic |
|---|---|---|
| mpeghAudioStreamPacket( ) | | |
| { | 3,11,19 | uimsbf |
| MHASPacketType = escapedValue(3,8,8); (example) | | |
| MHASPacketLabel = escapedValue(2,8,32); (example) | 2,10,42 | uimsbf |
| MHASPacketLength = escapedValue(11,24,24); (example) | 11,35,59 | uimsbf |
| MHASPacketPayload(MHASPacketType); (example) | | |
| } | | |

NOTE
With the given bit allocation, MHASPacketPayload( ) is byte-aligned.

Semantics

MHASPacketLabel This (optional) element provides an indication of which packets belong together. For example, with using different labels, different MPEG-H 3D audio configuration structures may be assigned to particular sequences of MPEG-H 3D audio access units.

MHASPacketLength This (optional) element indicates the length of the MHASPacketPayload ( ) in Bytes.

MHASPacketPayload ( ) The (optional) payload for the actual MHASPacket.

According to an aspect of the invention, MPEG-I introduces, for example, three additional MHASPacketType as MHASPacketPayload for the existing MPEG-H 3DA MHAS stream to transport the data needed for 6DoF rendering of MPEG-H audio content (for example, channels, objects, HOA signals). The MHASPacketLabel of this packet is, for example, used to connect MPEG-H 3DA Audio content to its associated 6DoF scene data.

TABLE 4

Value of MHASPacketType (examples)

| MHASPacketType | Value |
|---|---|
| PACTYP_MPEGI_CFG | 23 |
| PACTYP_MPEGI_UPD | 24 |
| PACTYP_MPEGI_PLD | 25 |

| | |
|---|---|
| mpegiSceneConfig ( ) | MPEG-I data structure for configuration |
| mpegiSceneUpdate ( ) | MPEG-I data structure for update |
| mpegiScenePayload ( ) | MPEG-I data structure for parameter payload |

Syntax of escapedValue( ) as defined in ISO/IEC 23003-3:

TABLE 5

Syntax of escapedValue( ) (example)

| Syntax | No. of bits | Mnemonic |
|---|---|---|
| escapedValue(nBits1, nBits2, nBits3) | | |
| { | | |
| value; | nBits1 | uimsbf |
| if (value == $2^{nBits1}-1$) { | | |
| value += valueAdd; | nBits2 | uimsbf |
| if (valueAdd == $2^{nBits2}-1$) { | | |
| value += valueAdd; | nBits3 | uimsbf |
| } | | |
| } | | |
| return value; | | |
| } | | |

In the following, embodiments according to the invention are further discussed.

In general, embodiments according to the invention may address Immersive Audio reproduction, e.g. MPEG-I Immersive Audio, for example with 6 degrees of freedom (6DoF) movement of the listener in an audio scene enabling the experience of virtual acoustics in a Virtual Reality (VR) and/or Augmented Reality (AR) simulation. Audio effects and phenomena known from real-world acoustics like, for example, localization, distance attenuation, reflections, reverb, occlusion, diffraction and the Doppler effect may, for example, be modelled by a decoder or renderer that is controlled through metadata transmitted in a bitstream with additional input of interactive listener position data.

Along with other parts of MPEG-I (i.e., Part 4, "Immersive Video", Part 5, "Visual Volumetric Video-based Coding (V3C) and Video-based Point Cloud Compression" and Part 2, "Systems Support"), embodiments may support a, for example, complete audio-visual VR or AR presentation in which the user, can, for example, navigate and interact with the simulated environment using 6DoF, that being spatial navigation (x, y, z) and user head orientation (yaw, pitch, roll).

While VR presentations may impart the feeling that the user is actually present in the virtual world, AR may enable the enrichment of the real world by virtual elements that are perceived seamlessly as being part of the real world. The user can, for example, interact with the virtual scene or virtual elements and, in response, cause sounds that are perceived as realistic and matching the users' experience in the real world.

Embodiments according to the invention provide means for rendering a real-time interactive audio presentation, e.g. audio scene, e.g. rendering scenario, e.g. audio scenario, while permitting the user to have 6DoF movement. Embodiments may therefore comprise usage of metadata and/or data structures to support this rendering and a bitstream syntax that enables efficient storage and streaming of the Immersive Audio content.

It is to be noted that according to embodiments, in general, dynamic scene updates may comprise an update triggered by external entity that includes the values of the attributes to be updated. Metadata may comprise input and state parameters, e.g. even all input and state parameters that are used to calculate the acoustic events of a virtual environment. A renderer may be software, e.g. the entire software used for the rendering. A triggered scene update may be a scene update triggered, for example manually, e.g. event based, from an external entity and executed by the renderer or for example considered by the decoder, immediately after receiving the trigger.

As an example, the following mnemonics may be defined to describe the different data types used in a coded bitstream payload according to embodiments.

bslbf Bit string, left bit first, where "left" is the order in which bit strings are written in ISO/IEC 14496 (all parts). Bit strings may be written as a string of 1s and 0s within single quote marks, for example '1000 0001'. Blanks within a bit string are for ease of reading and have no significance.

uimsbf Unsigned integer, most significant bit first.

vlclbf Variable length code, left bit first, where "left" refers to the order in which the variable length codes are written.

tcimsbf Two's complement integer, most significant (sign) bit first. New mnemonics have been added. These mnemonics are temporary and only used during the development period of the MPEG-I bitstream. The intent is to remove these in the future. The following mnemonics have been added.

cstring A C style string; a sequence of ascii characters, in bytes, terminated with a null byte (0x00).

float An IEEE 754 floating single point precision number.

Figure 21:
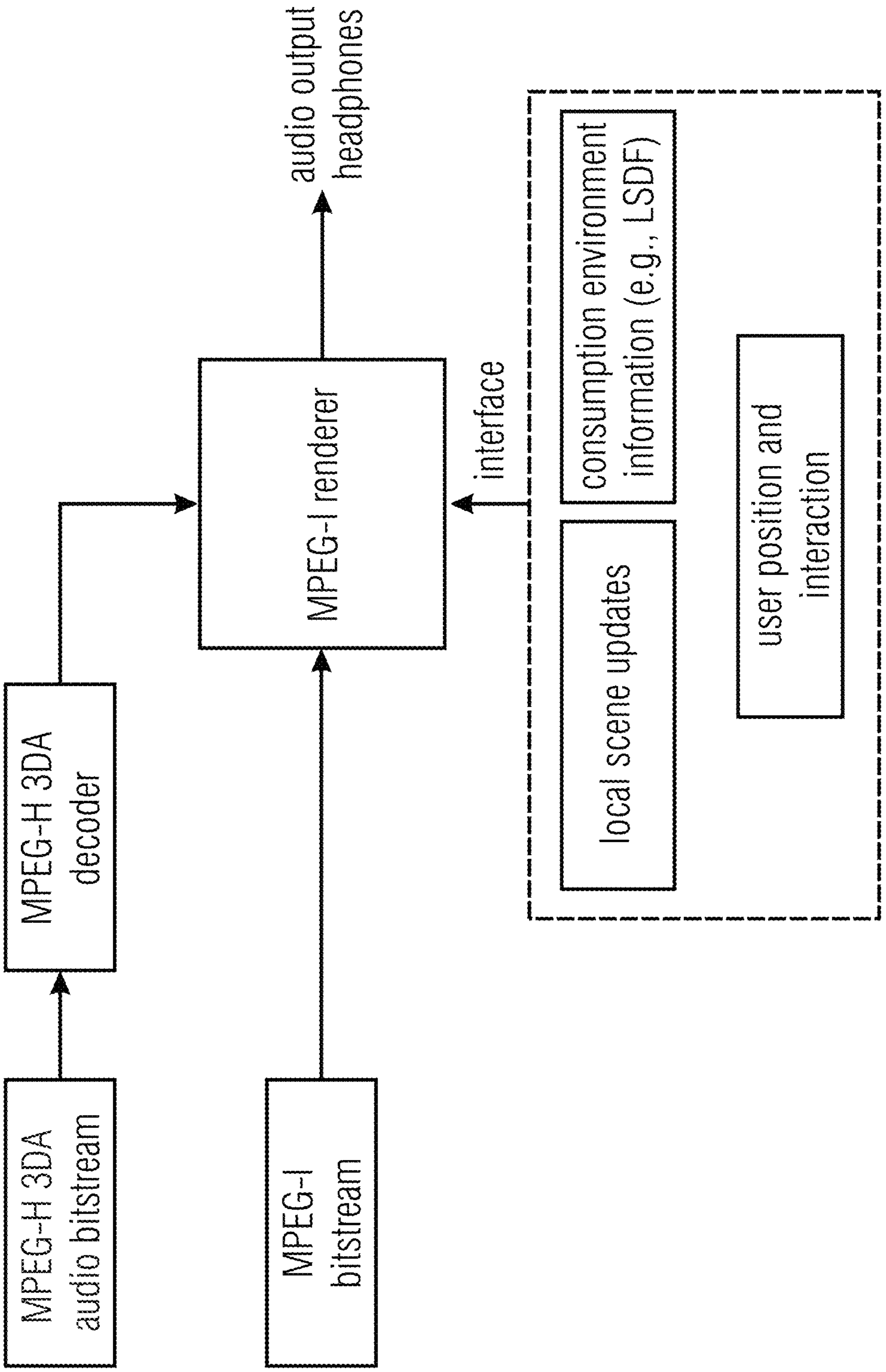
FIG. 21 shows a schematic block diagram of an architecture overview according to embodiments of the invention.

A Renderer or decoder according to embodiments may, for example, operate with a global sampling frequency, e.g. of 48 KHz. Input PCM audio data with other sampling frequencies has to be or may, for example, be resampled to 48 KHz before processing. A block diagram of the architecture overview according to embodiments, e.g. of an MPEG-I architecture overview is shown in FIG. 21. The schematic overview illustrates how the Renderer is optionally connected to external units like MPEG-H 3DA coded Audio Element bitstreams, the metadata MPEG-I bitstream and other interfaces. The MPEG-H 3DA coded Audio Elements are decoded by the MPEG-H 3DA Decoder. It is to be noted the Decoder may optionally comprise the Renderer or may comprise, in other words, the functionality of the Renderer. The decoded audio is subsequently rendered together with the MPEG-I bitstream, which is described in the following. The MPEG-I bitstream may carry the Audio Scene description and other metadata optionally used by the Renderer. In addition, the Renderer has optionally interfaces are available to access consumption environment information, scene updates during playback, user interactions and user position information.

In the following reference is made to embodiments addressing MPEG-I Immersive Audio transport. Hence, the following section may be titled 'MPEG-I Immersive Audio transport'

Overview

Embodiments addressing MPEG-I Audio may, for example, comprise three additional MHASPacketType values and associated MHASPacketPayload for the existing MPEG-H 3DA MHAS stream to transport the data, e.g. the data needed, for 6DoF rendering of MPEG-H audio content (for example channels, objects, HOA signals). The MHASPacketLabel of this packets may, for example be used to connect MPEG-H 3DA Audio content to its associated 6DoF scene data. MHAS Packets of the MHASPacketType PACTYP_MPEGI_CFG, PACTYP_MPEGI_UPD and PACTYP_MPEGI_PLD embed MPEG-I 6DoF scene data, mpegiSceneConfig, mpegiSceneUpdate and mpegiScenePayload in the MHASPacketPayload( ).

The mpegiSceneConfig packet may, for example, be a lightweight packet for the MPEG-I bitstream. It may, for example, provide all relevant information for the renderer to configure itself for initialization. It may, for example, provides a mapping between identifiers for all entities within a scene such that the renderer can translate integer identifiers transmitted from the Update and Payload packets into human readable string identifiers. In scenarios where side-channels are present, the config packet may, for example, or shall detail the side-channel locations and what Payload packets are available via said side-channels or back-channel, e.g. via a unicast bitstream.

The mpegiSceneUpdate packet communicates L1, L2 (i.e. changes to the entities in a scene which are known when the stream starts), and L3 updates (i.e. changes to the entities in a scene that are unknown when the stream starts).

The mpegiScenePayload packet may, for example, be the main container for all "bulk" metadata in the MPEG-I Audio bitstream. It can contain or comprise, for example, Directivities, Geometries and other metadata for individual audio effects like Reverb, Early Reflections or Diffraction. The distribution of payloads into Scene Payload packets can, for example, be organized by the encoder, taking into the account when and where the metadata is needed by the renderer, which metadata is essential for rendering, as well as maximum size of the packet, etc. In a server-client scenario, payloads can, for example, be loaded via a separate channel, e.g. a back-channel. For pure broadcast scenarios, Payload sizes can, for example, be restricted to save bandwidth.

In a server-client application, the MHASPacketType PACTYP_MPEGI_CFG may, for example, be or shall be interleaved periodically with the MHAS audio packets in the broadcast stream, but the large PACTYP_MPEGI_PLD packets would be sent, or may, for example, be sent on request only.

To sync to the broadcast stream an MHAS sync packet PACTYP_SYNC may, for example, be or shall be inserted before each mpegiSceneConfig( ) packet. The MPEG-I scene payload can, for example, be packaged into one or more mpegiScenePayload ( ) packets. Fine granular interleaving between MPEG-I metadata and audio content can, for example, be achieved by distributing MPEG-I metadata into Interleaving MPEG-I metadata over multiple payload packets.

In the following definitions for and according to embodiments of the invention are given. Hence the following section may be titled 'Definitions'

Reference is made to Syntax according to embodiments

First, general information is provided, e.g. regarding syntax.

The bitstream syntax according to embodiments may be based on ISO/IEC ISO/IEC 23008-3 (MPEG-H Part 3), Clause 5. Examples of modifications and amendments to the existing bitstream syntax are listed below.

In environments that require byte alignment, MPEG-I Immersive audio configuration elements or payload elements that are not an integer number of bytes in length may, for example, be padded at the end to achieve an integer byte count. This is indicated by the function ByteAlign( ).

Hence, embodiments according to the invention, e.g. encoders and/or decoders may comprise or use the following syntax:

MHAS Syntax

TABLE 6

Syntax of mpegiAudioStream ( ) (example)

| Syntax | No. of bits | Mnemonic |
|---|---|---|
| mpegiAudioStream( ) | | |
| { | 48 | cstring |
| bitstreamIdentifier; | 16 | uimsbf |
| bitstreamVersion; | | |
| while (bitsAvailable( ) != 0) { | | |

TABLE 6-continued

| Syntax of mpegiAudioStream ( ) (example) | | |
|---|---|---|
| Syntax | No. of bits | Mnemonic |
| mpegiAudioStreamPacket( ); | | |
| } | | |
| } | | |

TABLE 7

| Syntax of mpegiAudioStreamPacket( ) (example) | | |
|---|---|---|
| Syntax | No. of bits | Mnemonic |
| mpegiAudioStreamPacket( ) | | |
| { | | |
| MHASPacketType; | 11 | uimsbf |
| MHASPacketLabel; | 2 | uimsbf |
| MHASPacketLength; | 59 | uimsbf |
| switch (MHASPacketType) { | | |
| case PACTYP_MPEGI_CFG: { | | |
| mpegiSceneConfig( ); | | |
| break; | | |
| } | | |
| case PACTYP_MPEGI_UPD: { | | |
| mpegiSceneUpdate( ); | | |
| break; | | |
| } | | |
| case PACTYP_MPEGI_PLD: { | | |
| mpegiScenePayload( ); | | |
| break; | | |
| } | | |
| } | | |
| ByteAlign( ); | | |
| } | | |

Scene Configuration

TABLE 8

| Syntax of mpegiSceneConfig ( ) (example) | | |
|---|---|---|
| Syntax | No. of bits | Mnemonic |
| mpegiSceneConfig( ) | | |
| { | | |
| entityCount; | 16 | uimsbf |
| for (int i = 0; i < entityCount; i++) { | | |
| integerId; | 16 | uimsbf |
| stringId; | 8..* | cstring |
| } | | |
| delayBufferSize; | 3 | uimsbf |
| gainCullingThreshold; | 3 | uimsbf |
| overrideSpeedOfSound; | 1 | bslbf |
| if (overrideSpeedOfSound) { | | |
| speedOfSound; | 13 | uimsbf |
| } | | |
| overrideTemperature; | 1 | bslbf |
| if (overrideTemperature) { | | |
| temperature; | 5 | uimsbf |
| } | | |
| overrideHumidity; | 1 | bslbf |
| if (overrideHumidity) { | | |
| humidity; | 45 | uimsbf |
| } | | |
| } | | |

Scene Update

TABLE 9

| Syntax of mpegiSceneUpdate( ) (example) | | |
|---|---|---|
| Syntax | No. of bits | Mnemonic |
| mpegiSceneUpdate( ) | | |
| { | | |
| updatesCount; | 16 | uimsbf |
| for (int i = 0; i < updatesCount; i++) { | | |
| modificationsCount; | 16 | uimsbf |
| for (int j = 0; j < modificationsCount; j++) { | | |
| targetId; | 16 | uimsbf |
| hasDuration; | 1 | bslbf |
| if (hasDuration) { | | |
| duration; | 17 | uimsbf |
| } | | |
| changesCount; | 5 | uimsbf |
| for (int k = 0; k < changesCount; k++) { | | |
| targetAttribute; | 4 | uimsbf |
| switch (targetAttribute) { | | |
| case 0: { | | |
| for (int l = 0; l < 3; l++) { | | |
| isPositionParameterVariable; | 1 | bslbf |
| if (isPositionParameterVariable) { | | |
| positionParameterVariableIndex; | 4 | uimsbf |
| } | | |
| else { | | |
| newPositionValue; | 32 | float |
| } | | |
| } | | |
| break; | | |
| } | | |
| case 1: { | | |
| for (int l = 0; l < 3; l++) { | | |
| isOrientationParameterVariable; | 1 | bslbf |
| if (isOrientationParameterVariable) { | | |
| orientationParameterVariableIndex; | 4 | uimsbf |
| } | | |
| else { | | |
| newOrientationValue; | 32 | float |
| } | | |
| break; | | |
| } | | |
| case 2: { | | |
| newCoordSpaceValue; | 1 | bslbf |
| break; | | |
| } | | |
| case 3: { | | |
| newActiveValue; | 1 | bslbf |
| break | | |
| } | | |
| case 4: { | | |
| isGainDbParameterVariable; | 1 | bslbf |
| if (isGainDbParameterVariable){ | | |
| gainDbParameterVariableIndex; | 4 | uimsbf |
| } | | |
| else { | | |
| newGainValue; | 12 | uimsbf |
| } | | |
| break; | | |
| } | | |
| case 5: { | | |
| newSignalId; | 16 | uimsbf |
| break; | | |
| } | | |
| case 6: { | | |
| newExtentId; | 16 | uimsbf |
| break; | | |

TABLE 9-continued

Syntax of mpegiSceneUpdate( ) (example)

| Syntax | No. of bits | Mnemonic |
|---|---|---|
| } | | |
| case 7: { | | |
| newDirectivityId; | 16 | uimsbf |
| break; | | |
| } | | |
| case 8: { | | |
| newDirectivenessValue; | 8 | uimsbf |
| break; | | |
| } | | |
| case 9: { | | |
| newPlayValue; | 1 | bslbf |
| break; | | |
| } | | |
| case 10:{ | | |
| newGroupId; | 16 | uimsbf |
| break; | | |
| } | | |
| case 11: { | | |
| newRegionId; | 16 | uimsbf |
| break; | | |
| } | | |
| case 12: { | | |
| newSizeXValue; | 32 | float |
| newSizeYValue; | 32 | float |
| newSizeZValue; | 32 | float |
| break; | | |
| } | | |
| } | | |
| } | | |
| } | | |
| updateType; | 2 | uimsbf |
| switch (updateType) { | | |
| case 0: { | | |
| timedUpdateHasId; | 1 | bslbf |
| if (timedUpdateHasId) { | | |
| timedUpdateId; | 16 | uimsbf |
| } | | |
| timedUpdatedHasIndex; | 1 | bslbf |
| if (timedUpdateHas Index) { | | |
| timedUpdateIndex; | 16 | uimsbf |
| } | | |
| time; | 16 | uimsbf |
| break; | | |
| } | | |
| case 1: { | | |
| conditionalUpdateHasId; | 1 | bslbf |
| if (conditionalupdateHasId) { | | |
| conditionalUpdateId; | 16 | uimsbf |
| } | | |
| conditionalHasIndex; | 1 | bslbf |
| if (conditionalHasIndex) { | | |
| conditionalUpdateIndex; | 16 | uimsbf |
| } | | |
| fireOn; | 1 | bslbf |
| conditionalHasDelay; | 1 | bslbf |
| if (conditionalHasDelay) { | | |
| conditionalDelay; | 9 | uimsbf |
| } | | |
| conditionalUpdateId; | 16 | uimsbf |
| break; | | |
| } | | |
| case 2: { | | |
| triggeredUpdateId; | 16 | uimsbf |
| triggeredUpdateIndex; | 16 | uimsbf |
| break; | | |
| } | | |
| case 3: { | | |
| dynamicUpdateId; | 16 | uimsbf |
| dynamicUpdateIndex; | 16 | uimsbf |
| break; | | |
| } | | |
| } | | |
| } | | |
| } | | |

Scene Payload

TABLE 10

Syntax of mpegiScenePayload( ) (example)

| Syntax | No. of bits | Mnemonic |
|---|---|---|
| mpegiScenePayload( ) | | |
| { | | |
| payloadId; | 16 | uimsbf |
| payloadCount; | 16 | uimsbf |
| for (int i = 0; i < payloadCount; i++) { | | |
| payloadType; | 11 | uimsbf |
| payloadLabel; | 2 | uimsbf |
| payloadLength; | 59 | uimsbf |
| switch (payloadType) { | | |
| case PLD_DIRECTIVITY: { | | |
| payloadDirectivity( ); | | |
| break; | | |
| } | | |
| case PLD_DIFFRACTION: { | | |
| payloadDiffraction( ); | | |
| break; | | |
| } | | |
| case PLD_EARLY_REFLECTIONS: { | | |
| payloadEarlyReflections( ); | | |
| break; | | |
| } | | |
| case PLD_PORTAL: { | | |
| payloadPortal( ); | | |
| break; | | |
| } | | |
| case PLD_REVERB: { | | |
| payloadReverb( ); | | |
| break; | | |
| } | | |
| case PLD_AUDIO_PLUS: { | | |
| payloadAudioPlus( ); | | |
| break; | | |
| } | | |
| case PLD_DISPERSION: { | | |
| payloadDispersion( ); | | |
| break; | | |
| } | | |
| case PLD_VOX_DATA: { | | |
| payloadVoxData( ); | | |
| break; | | |
| } | | |
| case PLD_SCENE: { | | |
| payloadScene( ); | | |
| break; | | |
| } | | |
| } | | |
| } | | |
| } | | |

Semantics

Embodiments according to the invention may comprise or utilize the following semantics:

bitstreamIdentifier This integer may, for example, represent "MPEGI" in the form of a C string. It may, for example, be used for development purposes to verify MPEG-I bitstreams. This is a prevention mechanism for reading other files by accident.

bitstreamVersion This integer may, for example, represent the version number for this bitstream. The integer may change with alongside the syntax to ensure that the renderer can correctly decode this bitstream. It may, for example, be primarily used for development purposes whilst the syntax is in flux.

MHASPacketLabelThis element may, for example, provide an indication of which packets belong together. For example, with using different labels, different MPEG-H 3D audio configuration structures may be assigned to particular sequences of MPEG-H 3D audio access units.

MHASPacketLength This element may, for example, indicate the length of the packet in bytes.

TABLE 11

| Value of MHASPacketType (example) | |
|---|---|
| MHASPacketType | Value |
| PACTYP_MPEGI_CFG | 23 |
| PACTYP_MPEGI_UPD | 24 |
| PACTYP_MPEGI_PLD | 25 |

| | |
|---|---|
| mpegiSceneConfig ( ) | MPEG-I data structure for configuration |
| mpegiSceneUpdate ( ) | MPEG-I data structure for update |
| mpegiScenePayload ( ) | MPEG-I data structure for parameter payload |

payloadId This integer may, for example, be the unique identifier of the payload packet. This may, for example, be to distinguish it from other payload packets.

payloadCount This integer may, for example, indicate how many payloads are currently present in this packet.

payloadType This integer may, for example, denote the type of the current payload.

Payload elements listed in Table 18, as shown hereinafter may, for example, be defined according to the following optional syntax:

Directivity Payloads Syntax

TABLE 12

Syntax of payloadDirectivity( ) (example)

| Syntax | No. of bits | Mnemonic |
|---|---|---|
| payloadDirectivity( ) | | |
| { | | |
| directivitiesCount; | 8 | uimsbf |
| for (int i = 0; i < directivitiesCount; i++) { | | |
| directivityId; | 16 | uimsbf |
| directivityCodedLength; | 32 | uimsbf |
| coverSet( ); | directivityCodedLength | bslbf |
| } | | |
| } | | |

TABLE 13

Syntax of coverSet( ) (example)

| Syntax | No. of bits | Mnemonic |
|---|---|---|
| coverSet( ) | | |
| { | | |
| direcCoverCount; | 6 | uimsbf |
| direcFreqQuantType; | 2 | uimsbf |
| for (int i = 0; i < direcCoverCount; i++) { | | |
| covers[i] = directivityCover( ); | | vlclbf |
| } | | |
| frdFinish( ); | | vlclbf |
| } | | |

TABLE 14

Syntax of directivityCover( ) (example)

| Syntax | No. of bits | Mnemonic |
|---|---|---|
| directivityCover( ) | | |
| { | | |
| direcUseRawBaseline; | 1 | uimsbf |
| freq = readQuantFrequency( ); | | vlclbf |
| dbStepIdx = frdReadUniform(12); | | vlclbf |
| dbStep = (dbStepIdx + 1) * 0.25; | | |
| intPer90 = frdReadUniform(45); | | vlclbf |
| intPer90 += 1; | | |
| minPosVal = round(−128.0 / dbStep); | | |
| maxPosVal = round(127.0 / dbStep); | | |
| posValCount = maxPosVal − minPosVal + 1; | | |
| elCnt, aziCntPerEl, coverWidth = generateSphereGrid(intPer90); | | |
| if (direcUseRawBaseline) { | | |
| cover = rawCover( ); | | vlclbf |
| } | | |
| else { | | |
| cover = optimizedCover( ); | | vlclbf |
| } | | |
| for (int ei = 0; ei < elCnt; ei++) { | | |
| for (int ai = 0; ai < aziCntPerEl[ei]; ai++) { | | |
| cover[ei][ai] *= dbStep; | | |
| } | | |
| } | | |
| } | | |

TABLE 15

Syntax of readQuantFrequency( ) (example)

| Syntax | No. of bits | Mnemonic |
|---|---|---|
| readQuantFrequency( ) | | |
| { | | |
| freq1oIdxMin = −5; | | |
| freq1oIdxMax = 4; | | |
| freq3oIdxMin = −17; | | |
| freq3oIdxMax = 13; | | |
| freq6oIdxMin = −34; | | |
| freq6oIdxMax = 26; | | |
| if (direcFreqQuantType == 0) { | | |
| alphaSize = freq1oIdxMax − freq1oIdxMin + 1; | | |
| freqIdx = frdReadUniform(alphaSize); | | vlclbf |
| freqIdx += freq1oIdxMin; | | |
| freq = 1000 * pow(2, freqIdx); | | |
| } | | |
| else if (direcFreqQuantType == 1) { | | |
| alphaSize = freq3oIdxMax − freq3oIdxMin + 1; | | |
| freqIdx = frdReadUniform(alphaSize); | | vlclbf |
| freqIdx += freq3oIdxMin; | | |
| freq = 1000 * pow(2, freqIdx / 3); | | |
| } | | |
| else if (direcFreqQuantType == 2) { | | |
| alphaSize = freq6oIdxMax − freq6oIdxMin + 1; | | |
| freqIdx = frdReadUniform(alphaSize); | | vlclbf |
| freqIdx += freq6oIdxMin; | | |
| freq = 1000 * pow(2, freqIdx / 6); | | |
| } | | |
| else { | | |
| freqIdx = frdReadUniform(24000); | | vlclbf |
| freq = freqIdx + 1; | | |
| } | | |
| } | | |

TABLE 16

Syntax of rawCover( ) (example)

| Syntax | No. of bits | Mnemonic |
|---|---|---|
| rawCover( ) | | |
| { | | |
| minVal = frdReadUniform(posValCount); | | vlclbf |

TABLE 16-continued

Syntax of rawCover( ) (example)

| Syntax | No. of bits | Mnemonic |
|---|---|---|
| minVal += minPosVal; | | |
| maxVal = frdReadUniform(posValCount); | | vlclbf |
| maxVal += minPosVal; | | |
| valAlphabetSize = maxVal − minVal + 1; | | |
| for (int ei = 0; ei < elCnt; ei++) { | | |
| for (int ai = 0; ai < | | |
| aziCntPerEl[ei]; ai++) { | | |
| cover[ei][ai] = | | vlclbf |
| frdReadUniform(valAlphabetSize); | | |
| cover[ei][ai] += minVal; | | |
| } | | |
| } | | |
| } | | |

TABLE 17

Syntax of optimizedCover( ) (example)

| Syntax | No. of bits | Mnemonic |
|---|---|---|
| optimizedCover( ) | | |
| { | | |
| predictionOrder = frdReadUniform(5); | | vlclbf |
| predictionOrder += 1; | | |
| if (predictionOrder != 5) { | | |
| coverResiduals[0][0] = frdReadUniform(posValCount); | | vlclbf |
| } | | |
| minResidual = frdReadCompactUint(10); | | vlclbf |
| maxResidual = frdReadCompactUint(10); | | vlclbf |
| alph = maxResidual − minResidual + 1; | | |
| for (int ei = 0; ei < elCnt; ei++) { | | |
| for (int ai = 0; ai < aziCntPerEl[ei]; ai++) { | | |
| coverResiduals[ei][ai] = frdRead(alph); | | vlclbf |
| coverResiduals[ei][ai] += minResidual; | | |
| } | | |
| } | | |
| cover = unpredict(coverResiduals, predictionOrder, covers[−1]); | | |
| } | | |

TABLE 18

Value of payloadType (example)

| payloadType | Value |
|---|---|
| PLD_DIRECTIVITY | 6 |
| PLD_DIFFRACTION | 10 |
| PLD_EARLY_REFLECTIONS | 11 |
| PLD_PORTAL | 12 |
| PLD_REVERB | 14 |
| PLD_AUDIO_PLUS | 15 |
| PLD_DISPERSION | 17 |
| PLD_VOX_DATA | 18 |
| PLD_SCENE | 31 |

payloadLabel This element may, for example, be used to group multiple payloads together.

payloadLength This element may, for example, be the length of the payload in bytes.

entityCount This integer may, for example, represent the number of entities that exist with identifiers.

integerid This integer may, for example, represent the newly derived integer from the string identifier. All integerid values may, for example, be or shall be unique.

stringId This string may, for example, be the original string found from the Encoder Input Format for this entity. The intention may, for example, be to map strings to integers so that the rest of the bitstream can use integers as ids to the bitstream size. All stringId values may, for example, be or shall be unique.

delayBufferSize This element may, for example, set the size of the propagation delay buffers. The size may, for example, be or has to be large enough to handle the largest propagation delay that can occur in the scene.

TABLE 19

Value of delayBufferSize (example)

| Value | Buffer size (in samples) |
|---|---|
| 0 | 10000 |
| 1 | 20000 |
| 2 | 30000 |
| 3 | 50000 |
| 4 | 100000 |
| 5 | 200000 |
| 6 | 500000 |
| 7 | 1000000 |

gainCulling Threshold This element may, for example, set a threshold at which a render item with a large attenuation (e.g., due to large distance attenuation) may, for example, be deactivated. The deactivation threshold factor g can, for example, be calculated from the value v with $g=10^{v-10}$. With v ranging between 0 and 7, this may, for example, lead to a deactivation threshold between −100 dB and −30 dB in increments of 10 dB.

overrideSpeedOfSound This flag may, for example, indicate whether the default speed of sound (340 m/s), used for the calculation of propagation delay, is overridden for this scene.

speedOfSound This value may, for example, set the speed of sound.

override Temperature This flag may, for example, indicate whether the default temperature (20° C.), used for the calculation of medium attenuation, may, for example, be overridden for this scene.

temperature This value may, for example, set the temperature. The temperature T in ° C. may, for example, be calculated from the value v with T=5 v−50.

overrideHumidity This flag may, for example, indicate whether the default humidity (40%), used for the calculation of medium attenuation, may, for example, be overridden for this scene.

humidity This value may, for example, set the humidity. The humidity H in % may, for example, be calculated from the value v with $$H = \frac{20v}{3}.$$

updatesCount This integer may, for example, be the number of updates in this payload.

modificationsCount This integer may, for example, be the number of modifications in this update.

targetId This integer may, for example, be the unique identifier of the target entity which is being modified.

hasDuration This flag may, for example, indicate if the modification occurs over a period of time.

duration This value may, for example, be the total duration of the modification in seconds. The range may, for example, be in between 0.0 and 180.0. To dequantize it to a floating point value, the following equation may, for example, be used:

$$floatVal = 180 * \frac{\text{duration}}{2^{noOfBits-1}} \tag{1}$$

changesCount This integer may, for example, represent how many value changes there are in this modification.

targetAttribute This integer may, for example, indicate which attribute may, for example, be modified.

TABLE 20

Value of channelSourceMode (example)

| bits | channelSourceMode |
|---|---|
| 0b0000 | POSITION |
| 0b0001 | ORIENTATION |
| 0b0010 | COORDSPACE |
| 0b0011 | ACTIVE |
| 0b0100 | GAIN |
| 0b0101 | SIGNAL |
| 0b0110 | EXTENT |
| 0b0111 | DIRECTIVITY |
| 0b1000 | DIRECTIVENESS |
| 0b1001 | PLAY |
| 0b1010 | GROUP |
| 0b1011 | REGION |
| 0b1100 | SIZE |
| 0b1101 | RESERVED |
| . . . | . . . |
| 0b1111 | RESERVED |

isPositionParameterVariable This flag may, for example, indicate if the value is coming from the evaluation platform.

positionParameterVariableIndex This integer may, for example, be the update value channel index which is supplied from the evaluation platform.

newPositionValue This float may, for example, be the new position value in meters for the target entity.

isOrientationParameterVariable This flag may, for example, indicate if the value is coming from the evaluation platform.

orientationParameterVariableIndex This integer may, for example, be the update value channel index which is supplied from the evaluation platform.

newOrientation Value This float may, for example, be the new orientation value in degrees for the target entity.

newCoordSpaceValue This flag may, for example, be the new coordinated space value for the target entity.

TABLE 21

Value of newCoordSpaceValue (example)

| bits | newCoordSpaceValue |
|---|---|
| 0b0 | RELATIVE |
| 0b1 | USER |

newActiveValue This flag may, for example, de/activate the rendering of target entity.

isGainDbParameterVariable This flag may, for example, indicate if the value is coming from the evaluation platform.

gainDbParameterVariableIndex This integer may, for example, be the update value channel index which is supplied from the evaluation platform.

newGainValue This value may, for example, be the new gain value for the target entity. It ranges between −127.0 and 127.0. To dequantize it to a floating point value, the following equation may, for example be used:

$$floatVal = \left(254 * \frac{newGainValue}{2^{noOfBits-1}}\right) - 127 \tag{2}$$

newSignalId This integer may, for example, be the new unique audio stream identifier for the target entity.

newExtentId This integer may, for example, be the new unique geometry identifier for the extent attribute of the target entity.

newDirectivityId This integer may, for example, be the new unique directivity identifier for the source directivity of the target entity.

newDirectivenessValue This value may, for example, be new directiveness value for the target entity. It may, for example, range between 0.0 to 20.0. To dequantize it to a floating point value, the following equation may, for example, be used:

$$floatVal = 20 * \frac{newDirectivenessValue}{2^{noOfBits-1}} \tag{3}$$

newPlayValue This flag may, for example, indicate the new play value for the target entity.

newGroupId This integer may, for example, represent the new unique HOA Group for the target HOA source.

newRegionId This integer may, for example, represent the new unique geometry identifier for the region attribute of the target entity.

newSizeXValue This float may, for example, represent the new size (m) attribute in the X axis for the target primitive entity.

newSizeYValue This float may, for example, represent the new size (m) attribute in the Y axis for the target primitive entity.

newSizeZValue This float may, for example, represent the new size (m) attribute in the Z axis for the target primitive entity.

update Type This integer may, for example, indicate an update to be of the following types: timed, conditional, dynamic, or triggered.

TABLE 22

| Value of updateType (example) | |
|---|---|
| bits | updateType |
| 0b00 | TIMED |
| 0b01 | CONDITIONAL |
| 0b10 | TRIGGERED |
| 0b11 | DYNAMIC |

timedUpdateHasId This flag may, for example, indicate if the timed update has a unique identifier timedUpdateId This integer may, for example, indicate the unique identifier for this timed update.

timedUpdateHasIndex This flag may, for example, indicate if the timed update has an index value.

timedUpdateIndex This integer may, for example, be the index value for this timed update.

time This value may, for example, be the point in time in which the update begins. It may, for example, range between 0.0 and 180.0. To dequantize it to a floating point value, the following equation may, for example, be used:

$$floatVal = 180 * \frac{\text{time}}{2^{noOfBits-1}} \tag{4}$$

conditionalUpdateHasId This flag may, for example, indicate if this conditional update has a unique identifier.

conditonalUpdateId This integer may, for example, be the unique identifier for this conditional update.

conditionalUpdateIndex This integer may, for example, be the index value for this conditional update.

fireOn This flag may, for example, determine when this update is triggered. It may, for example, be triggered when the state of this value is reached.

conditonalHasDelay This flag may, for example, indicate if the conditional update is delayed after the trigger.

conditionalDelay This value may, for example, be the delay in seconds between the update trigger and the actualization of the update itself. It may, for example, range between 0.0 and 10.0. To dequantize it to a floating point value, the following equation may, for example, be used $$floatVal = 10 * \frac{conditionalDelay}{2^{noOfBits-1}} \tag{5}$$

conditonId This integer may, for example, be the unique listener proximity condition identifier that this update is triggered upon.

triggeredUpdateId This integer may, for example, be the unique identifier for this triggered update.

triggeredUpdateIndex This integer may, for example, be the index value for this triggered update.

dynamicUpdateId This integer may, for example, be the unique identifier for this dynamic update.

dynamicUpdateIndex This integer may, for example, be the index value for this dynamic update.

FURTHER REMARKS

As an example, decoders according to the invention may comprise a Scene Controller which may, for example, be a central component for maintaining a 6DoF scene representation including all audio elements and geometries. It may, for example, hold the Scene State and may, for example, handle all internal and external modifications to it through updates, which can, for example, be received via the bitstream or a local update interface. If the scene is an AR scene, the Scene Controller additionally reads the LSDF, describing the acoustic properties and anchor positions of the listening space, which are integrated into the Scene State.

As an example an evaluation unit as explained before may comprise or may be a scene controller.

As an example, decoders according to the invention may comprise a Scene State which may, for example, and optionally, reflect the current state of a plurality of entities or even of all entities in the scene, incorporating metadata from multiple sources, including the bitstream, an LSDF (Listening space description format) and local updates. The entities may, for example, be represented as Scene Objects (SOs). As an example, only the Scene Controller may, for example, be configured to modify the Scene State, whereas all other components in the Renderer, e.g. a rendering unit of a decoder, may have read-only access to the Scene State and all SOs.

Components may, for example, also subscribe to changes in the Scene State and of individual SOs, so that a callback is called when attributes are modified. For this, the component can, for example, be configured to implement the SceneStateObserver and SceneObjectObserver interfaces. The callback of a SceneStateObserver may, for example, be called when an SO is added or removed from the Scene State.

EXAMPLE

```
class SceneStateObserver {
public:
  virtual ~SceneStateObserver( ){ };
  virtual void sceneStateAttached(const SceneState* sceneState) =
0;
  virtual void sceneStateDetached( ) = 0;
  virtual void sceneObjectAdded(SceneObject* object) = 0;
  virtual void sceneObjectRemoved(SceneObject* object) = 0;
};
```

The SceneObjectObserver callback notifies about any modifications of individual SOs.

```
class SceneObjectObserver {
public:
  virtual ~SceneObjectObserver( ){ };
  enum class Property {
    Position,
    Activity,
    Directivity,
```

-continued

```
            Gain,
            DistanceModel,
            AudioStream,
            Extent,
            ReferenceDistance,
            Staticity
        };
        virtual void objectChanged(SceneObject* obj, Property
    modification) = 0;
    };
```

According to embodiments, any audio element, geometry, transform and the listener in the Scene may, for example, be represented as a Scene Object (SO). Every SO may, for example, have at least the attributes specified in Table 23.

TABLE 23

Scene Objects

| Field name | Data type | Description | Default value |
|---|---|---|---|
| id | uint | Unique identifier oft he SO | — |
| position | Position | The position (location and orientation) of the SO in global coordinates | — |
| velocity | Vector3 | The optional velocity of the SO | 0, 0, 0 |
| parent | SceneObject* | Reference to an optional parent SO | None |
| isStatic | bool | Whether or not the SO is allowed to be moved in the Scene | false |

Furthermore, an Update (e.g. as explained in the context of scene update packets) may be a collection of modifications to metadata of Scene Objects. A Scene Controller, e.g. implemented in or being an evaluation unit and/or a rendering unit, may allow Updates in the Scene State, for example, through the following means:

1. SceneUpdate Packets in the bitstream may, for example, contain information about changes to individual entities in the scene (e.g. as explained before). They may allow immediate, pre-defined, location- or time-based, and interpolated updates.
   a. Immediate updates: The Scene, e.g. using an evaluation unit, may, for example, update the Scene State, e.g. as soon as the SceneUpdate packet is received from the Bitstream interface.
   b. Pre-defined updates: A specified packet of modifications may, for example, be transmitted and triggered locally by a given identifier.
   c. Location- or time-based single updates: The Scene, e.g. using an evaluation unit, may, for example, evaluate previously received location- and time-based criteria and may update the Scene State if the criteria require a metadata change.
   d. Interpolated updates: the Scene, e.g. using an evaluation unit, may, for example, evaluate previously received and started metadata trajectories and may update the Scene State accordingly.
2. A Local Update API for other systems and components at the decoder (e.g. as explained in the following)

Evaluation of location- and time-based criteria, as well as interpolation may, for example, be done in a separate thread created by the Scene Controller. The thread may, for example, or even has to operate at a rate of at least 100 executions per second.

Temporal interpolations may, for example, be triggered by pre-defined, location-based or local updates when the update contains or comprises a duration and may, for example, be optionally linear interpolations. Temporal interpolations may, for example, be stopped when the scene is looped. Start value for a temporary interpolation may, for example, be, optionally, the metadata property value at the time the update is triggered, not considering delay.

The behavior may, for example, be undefined when a SO metadata property is changed with multiple types of updates simultaneously, e.g., when an Object Source is moving on a timed trajectory, its location can, for example, not be changed by a local update.

External components and subsystems of the decoder can, for example, construct local updates to change metadata of Scene Objects. An update (example):

```
struct Modification {
    std::string entityId;
    std::string attributeName;
    Variant targetValue;
    bool teleport = false;
};
struct Update {
    double timestamp = −1;
    std::vector<Modification> modifications;
};
```

The timestamp may, for example, be given in Scene time. If the current Scene time when the Update is received is larger than the Update timestamp, the Update may, for example, be executed optionally immediately. Furthermore, each Update may, for example, contain or comprise a list of Modifications, that each optionally consist of or comprise of. An entity Id that corresponds to the string identifier of an entity used in the EIF. The reserved identifier "listener" may, for example, be used to update e.g. the Listener position through the same API as other entities.

An attributeName, which may, for example, be or even has to be an attribute name as used in the EIF, A targetValue, whose data type may, for example, depend on the attribute, and A teleport flag to indicate non-interpolated modifications to the location of an entity, affecting e.g. the propagation delay.

Furthermore, decoders or renderers according to embodiments may comprise a Stream Manager (e.g. in an inventive evaluation unit or rendering unit) which may be configured to access to Audio Streams, for example, by or using an identifier that can be referenced in the bitstream or in external updates. The Audio Stream source may, for example, be variable and can either be a local PCM stream or a decoded MPEG-H audio stream from the bitstream.

Audio Stream access may, for example, be frame-based. Components in the Renderer can, for example, create a StreamAccessBuffer, that may be associated with a certain Audio Stream and a block of samples may, for example, be written into its memory buffer for each processed frame of the Audio Stream. Stream access may, for example, support seeking in the Audio Stream. The Stream Manager may, for example, crossfade between Audio Streams if the accessed stream changes.

Example

```
class StreamBuffer {
    RealFrame& getFrame( );
```

-continued

```
    const RealFrame& getFrame( ) const;
};
class StreamAccessBuffer : public StreamBuffer
{
    void setStream(const std::string& id, double t = 0.0);
    void play( );
    void stop( );
    void seekTo(double t);
    void setLoop(bool shouldLoop);
    std::size_t getReadPosition( ) const;
    inline const std::string& getStreamId( ) const;
};
```

Components may, for example, also create empty StreamBuffer instances, which may have the same properties as a StreamAccessBuffer, but the contents may be, or for example has to even be managed by the owning component.

Furthermore, decoders according to embodiments optionally comprise a Clock component (e.g. in an inventive evaluation unit), which may allow to synchronize the Scene time to an external timekeeper. In the stand-alone case, an InternalClock implementation of the Clock interface may, for example, use the CPU wallclock (e.g. std::chrono::steady_clock) to determine the time in seconds that has passed since the Scene has started. The current time of InternalClock may, for example, be synchronized with the audio thread by counting the number of samples that has been played out since the Scene started.

```
class Clock {
public:
    virtual ~Clock( ){ };
    virtual double getCurrentTime( ) = 0;
    virtual void start( ) = 0;
    virtual void stop( ) = 0;
    virtual bool isRunning( ) = 0;
    virtual void sync(double t) = 0;
};
```

Decoders according to the invention may be configured to perform multithreading, e.g. using an inventive evaluation unit. The Scene Controller may, for example, create a separate thread to handle time- and location-based updates, optionally as well as interpolations. The update routine in this thread may be, or for example, should be executed at a rate of at least 100 Hz. Observing the Scene State and SOs may, for example, be read-only. Observer callbacks may, for example, be called from the thread where the Update was triggered. The observing component may or even has to ensure thread-safety of the callback.

The Clock::sync( ) routine may or even has to be thread-safe with regard to concurrent calls to getCurrentTime( ).

StreamBuffers and StreamAccessBuffers may, for example, be only be accessed in the audio thread. The Stream Manager may, for example, ensure StreamAccessBuffers to contain the correct samples at the beginning of each audio thread callback.

According to further embodiments of the invention encoders may, for example, parse the Immersive Audio Encoder Input Format (EIF) scene description file into readable data structures and may, for example, generate different categories of side information as well as the scene description. Finally, encoders may, for example, code and serialize the data to create an MHAS bitstream file.

In this bitstream, the encoder may, for example, represent different categories of side information as separate payloads elements bundled in an MHAS payload packet. These payloads may, for example, be used to enrich renderer or decoder stages with extra data for higher quality rendering. The side information may, for example, often be represented as a pair—the identifier (ID) of the entity as authored in the scene description coupled with the side information itself. For example, the encoder generates reverb parameters and couples them with each AcousticEnvironment ID found in the scene description. An AcousticEnvironment may, for example, describe the acoustic conditions within the entire scene or a certain spatial zone, e.g. by means of room acoustic (reverberation) parameters.

As an example, a scene state, as explained before, may be stored in, determined by, and/or provided using an analysis unit and/or an evaluation unit according to embodiments of the invention.

Implementation Alternatives:

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

As a general remark, it should be noted that the prefix "mpegi", which is used, for example, in the designation of bitstream elements and the like, may optionally be replaced by the prefix "mpeghi" and vice versa, wherein, for example, the prefix "mpeghi" may be synonymous to the prefix "mpegi".

The invention claimed is:

1. An apparatus for providing a decoded audio representation on the basis of an encoded audio representation included in a bitstream that comprises a plurality of packets of different packet types, the apparatus comprising:

an audio decoder configured to spatially render one or more audio signals;

wherein the audio decoder is configured to receive the plurality of packets of different packet types, wherein the plurality of packets comprising a plurality of scene configuration packets and one or more scene update packets defining an update of scene metadata for the rendering, wherein the one or more scene update packets comprise a start-timestamp information, wherein the plurality of scene configuration packets provide a renderer configuration information, wherein the renderer configuration information defines an initialization information for the rendering scenario, and wherein the audio decoder is configured to evaluate a temporal condition, defined by the start-timestamp information, in order to decide whether one or more scene metadata should be updated in dependence on a content of the one or more scene update packets.

2. The apparatus according to claim 1, wherein the plurality of scene configuration packets define a temporal evolution of a rendering scenario and comprise a timestamp information, wherein the audio decoder is configured to evaluate the timestamp information and to set a rendering configuration to a rendering scenario corresponding to the timestamp information using the renderer configuration information.

3. The apparatus according to claim 2, wherein the audio decoder is configured to evaluate the timestamp information when the audio decoder has missed one or more preceding scene configuration packets of a stream, or when the audio decoder tunes in into a stream, and wherein the audio decoder is configured to set a playout time in dependence on the timestamp information comprised in the scene configuration packet.

4. The apparatus according to claim 2, wherein the audio decoder is configured to execute a temporal development of a rendering scene up to a playout time defined by the timestamp information when the audio decoder has missed one or more preceding scene configuration packets of a stream, or when the audio decoder tunes in into a stream.

5. The apparatus according to claim 2, wherein the audio decoder is configured to acquire a time scale information which is comprised in a packet; and wherein the audio decoder is configured to evaluate the timestamp information using the time scale information.

6. The apparatus according to claim 3, wherein the audio decoder is configured to determine, in dependence on the timestamp information, which scene objects should be used for the rendering.

7. The apparatus according to claim 3, wherein the audio decoder is configured to evaluate a scene configuration packet, which defines an evolution of a rendering scene starting from a point of time which lies before a time defined by the timestamp information; and wherein the audio decoder is configured to derive a scene configuration associated with a point in time defined by the timestamp information on the basis of the information in the scene configuration packet.

8. The apparatus according to claim 7, wherein the audio decoder is configured to derive the scene configuration associated with a point in time defined by the timestamp information using one or more scene update packets.

9. The apparatus according to claim 1, wherein the plurality of scene configuration packets are conformant to a MPEG-H MHAS packet definition.

10. The apparatus according to claim 1, wherein the plurality of scene configuration packets each comprise a packet type identifier, a packet label, a packet length information and a packet payload.

11. The apparatus according to claim 1, wherein the audio decoder is configured to extract the plurality of scene configuration packets from the bitstream, the bitstream comprising a plurality of MPEG-H packets, the MPEG-H packets comprising packets representing one or more audio channels to be rendered.

12. The apparatus according to claim 1, wherein the audio decoder is configured to receive the plurality of scene configuration packets via a broadcast stream.

13. The apparatus according to claim 12, wherein the audio decoder is configured to tune into the broadcast stream and to determine a playout time on the basis of a timestamp information of a first scene configuration packet identified by the audio decoder after the tune-in.

14. An encoding apparatus for providing an encoded audio representation and a plurality of packets of different packet types in a bitstream, the apparatus comprising:

an apparatus configured to provide an information for a spatial rendering of one or more audio signals;

wherein the apparatus is configured to provide the plurality of packets of different packet types, wherein the plurality of packets comprising a plurality of scene configuration packets and one or more scene update packets defining an update of scene metadata for the rendering, wherein the one or more scene update packets comprise a start-timestamp information, which defines a temporal condition, in order to enable a decoder-sided decision whether one or more scene metadata should be updated in dependence on a content of the one or more scene update packets, wherein the plurality of scene configuration packets provide a renderer configuration information, and wherein the renderer configuration information defines an initialization information for the rendering scenario.

15. The encoding apparatus according to claim 14, wherein the plurality of scene configuration packets provide a renderer configuration information defining a temporal evolution of a rendering scenario and comprise a timestamp information.

16. The encoding apparatus according to claim 15, wherein the apparatus is configured to provide, in one of the plurality of packets, a time scale information, wherein the timestamp information is provided in a representation related to the time scale information.

17. The encoding apparatus according to claim 14, wherein the apparatus is configured to provide the plurality of scene configuration packets such that the plurality of scene configuration packets are conformant to a MPEG-H MHAS packet definition.

18. The encoding apparatus according to claim 14, wherein the apparatus is configured to provide the plurality of scene configuration packets such that scene configuration packets of the plurality of scene configuration packets each comprise a packet type identifier, a packet label, a packet length information and a packet payload.

19. The encoding apparatus according to claim 14, wherein the apparatus is configured to provide the bitstream, the bitstream comprising a plurality of MPEG-H packets, the MPEG-H packets comprising packets representing one or more audio channels to be rendered and the plurality of scene configuration packets.

20. The encoding apparatus according to claim 14, wherein the apparatus is configured to provide the bitstream, the bitstream comprising a plurality of MPEG-H packets, the MPEG-H packets comprising packets representing one or more audio channels to be rendered and the plurality of scene configuration packets in an interleaved manner.

21. The encoding apparatus according to claim 14, wherein the apparatus is configured to periodically repeat a scene configuration packet.

22. The encoding apparatus according to claim 14, wherein the apparatus is configured to periodically repeat a scene configuration packet, with one or more scene payload packets and one or more packets representing one or more audio channels to be rendered in between two subsequent scene configuration packets.

23. The encoding apparatus according to claim 14, wherein the apparatus is configured to periodically repeat a scene configuration packet, with one or more packets representing one or more audio channels to be rendered in between two subsequent scene configuration packets; and wherein the apparatus is configured to provide one or more scene payload packets at request.

24. The encoding apparatus according to claim 15, wherein the apparatus is configured to provide a plurality of otherwise identical scene configuration packets differing in the timestamp information.

25. The encoding apparatus according to claim 15, wherein the apparatus is configured to adapt the timestamp information to a playout time.

26. The encoding apparatus according to claim 15, wherein the apparatus is configured to adapt the timestamp information to a playout time of rendering scene information comprised in packets which are provided by the apparatus in a temporal environment of a respective scene configuration packet in which the respective timestamp information is comprised.

27. A method for providing a decoded audio representation on the basis of an encoded audio representation included in a bitstream, the bitstream comprising a plurality of packets of different packet types, the method comprising:

spatially rendering one or more audio signals; and receiving the plurality of packets of different packet types, wherein the plurality of packets comprising a plurality of scene configuration packets and one or more scene update packets defining an update of scene metadata for the rendering, wherein the one or more scene update packets comprise a start-timestamp information, wherein the plurality of scene configuration packets provide a renderer configuration information, wherein the renderer configuration information defines an initialization information for the rendering scenario, wherein the method further comprises evaluating a temporal condition, defined by the start-timestamp information, in order to decide whether one or more scene metadata should be updated in dependence on a content of the one or more scene update packets.

28. A method for providing an encoded audio representation and a plurality of packets of different packet types in a bitstream, the method comprising:

providing an information for a spatial rendering of one or more audio signals; and providing the plurality of packets of different packet types, wherein the plurality of packets comprising a plurality of scene configuration packets and one or more scene update packets defining an update of scene metadata for the rendering, wherein the one or more scene update packets comprise a start-timestamp information, which defines a temporal condition, in order to enable a decoder-sided decision whether one or more scene metadata should be updated in dependence on a content of the one or more scene update packets, wherein the plurality of scene configuration packets provide a renderer configuration information, wherein the renderer configuration information defines an initialization information for the rendering scenario.

29. A non-transitory digital storage medium having a computer program stored thereon to perform a method for providing a decoded audio representation on the basis of an encoded audio representation included in a bitstream, the bitstream comprising a plurality of packets of different packet types, wherein the method comprises spatially rendering one or more audio signals;

wherein the method comprises receiving the plurality of packets of different packet types, wherein the plurality of packets comprising a plurality of scene configuration packets and one or more scene update packets defining an update of scene metadata for the rendering, wherein the one or more scene update packets comprise a start-timestamp information, wherein the plurality of scene configuration packets provide a renderer configuration information, wherein the renderer configuration information defines an initialization information for the rendering scenario, wherein the method comprises evaluating a temporal condition, defined by the start-timestamp information, in order to decide whether one or more scene metadata should be updated in dependence on a content of the one or more scene update packets, when said computer program is run by a computer.

30. A non-transitory digital storage medium having a computer program stored thereon to perform a method for providing an encoded audio representation and a plurality of packets of different packet types in a bitstream, wherein the method comprises providing an information for a spatial rendering of one or more audio signals;

wherein the method comprises providing the plurality of packets of different packet types, the plurality of packets comprising a plurality of scene configuration packets and one or more scene update packets defining an update of scene metadata for the rendering, wherein the one or more scene update packets comprise a start-timestamp information, which defines a temporal condition, in order to enable a decoder-sided decision whether one or more scene metadata should be updated in dependence on a content of the one or more scene update packets, wherein the plurality of scene configuration packets provide a renderer configuration information, wherein the renderer configuration information defines an initialization information for the rendering scenario, when said computer program is run by a computer.

* * * * *